United States Patent
Uchikata

(10) Patent No.: US 6,676,236 B1
(45) Date of Patent: *Jan. 13, 2004

(54) INFORMATION PROCESSING SYSTEM INCLUDING THE PRINTING APPARATUS

(75) Inventor: Yoshio Uchikata, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/900,716

(22) Filed: Jul. 28, 1997

Related U.S. Application Data

(63) Continuation of application No. 08/182,564, filed on Jan. 18, 1994, now abandoned.

(30) Foreign Application Priority Data

Jan. 19, 1993 (JP) .............................. 5-007051

(51) Int. Cl.⁷ ................................. B41J 2/01
(52) U.S. Cl. ............................. 347/5; 347/23; 347/108; 714/57
(58) Field of Search ........................... 347/3, 5, 19, 23, 347/37, 108; 395/114, 155; 399/81, 13, 8; 400/74, 83; 714/57, 46; 345/347; 358/1.15; 710/15, 18, 19

(56) References Cited

U.S. PATENT DOCUMENTS

| | | | |
|---|---|---|---|
| 4,176,941 A | * 12/1979 | Breitenkam et al. | .......... 399/24 |
| 4,313,124 A | 1/1982 | Hara | |
| 4,345,262 A | 8/1982 | Shirato et al. | |
| 4,459,600 A | 7/1984 | Sato et al. | |
| 4,463,359 A | 7/1984 | Ayata et al. | |
| 4,558,333 A | 12/1985 | Sugitani et al. | |
| 4,608,577 A | 8/1986 | Hori | |
| 4,682,158 A | * 7/1987 | Ito et al. | ...................... 340/679 |
| 4,723,129 A | 2/1988 | Endo et al. | |
| 4,740,796 A | 4/1988 | Endo et al. | |
| 4,977,429 A | * 12/1990 | Tani et al. | ..................... 399/27 |
| 5,121,343 A | * 6/1992 | Faris | ......................... 358/1.12 |
| 5,136,309 A | * 8/1992 | Iida et al. | ....................... 347/7 |
| 5,303,005 A | * 4/1994 | Takano et al. | ................. 399/8 |
| 5,329,373 A | * 7/1994 | Hayashi et al. | ............. 358/296 |

FOREIGN PATENT DOCUMENTS

| | | |
|---|---|---|
| JP | 54-67439 | 5/1979 |
| JP | 54056847 | 5/1979 |
| JP | 59123670 | 7/1984 |
| JP | 59138461 | 8/1984 |

(List continued on next page.)

OTHER PUBLICATIONS

Cowert, Robert; "Mastering Windows 3.1 Special Edition", SYBEX Inc., pp 213–216 and 219–220, 1992.*

"Automatic Air Trap Purging", *IBM Technical Disclosure Bulletin*, vol. 23, No. 8, pp. 3777–3779, Jan. 1981.

(List continued on next page.)

*Primary Examiner*—Craig Hallacher
(74) *Attorney, Agent, or Firm*—Fitzpatrick, Cella, Harper & Scinto

(57) ABSTRACT

A host apparatus of an information processing system performs processing related to a printer operation. That is, the operation to be performed by a user is displayed on a display screen of the information processing system so the user performs the operation appropriately and easily. As a result, in the information processing system with an ink jet recording apparatus provided, the operation peculiar to the ink jet recording apparatus can be performed appropriately and easily by a user.

42 Claims, 42 Drawing Sheets

FOREIGN PATENT DOCUMENTS

| | | |
|---|---|---|
| JP | 60071260 | 4/1985 |
| JP | 64-31170 | 2/1989 |
| JP | 2-42568 | 2/1990 |
| JP | 3-160484 | 7/1991 |
| JP | 4-42165 | 2/1992 |
| JP | 4-93853 | 3/1992 |
| JP | 4-105101 | 4/1992 |
| JP | 4-148754 | 5/1992 |
| JP | 4-251333 | 9/1992 |
| JP | 4-356070 | 12/1992 |
| JP | 6-164812 | 6/1994 |
| WO | WO 87003115 | 5/1987 |
| WO | WO 94/11804 | 5/1994 |

OTHER PUBLICATIONS

"Display of Printer Status Information for a Typewriter Attached to a Personal Computer", *IBM Technical Disclosure Bulletin*, vol. 30, No. 6, p. 243, Nov. 1987.

SMART TEXTVERARBEITUNG, printed manual, chapter 7 pages "Drucken–3" to "Drucken–5" copyright 1988 (latest) Informix Software Inc., U.S.

D.G. Dologite, *Using Computers*, 1987, p. 44.

* cited by examiner

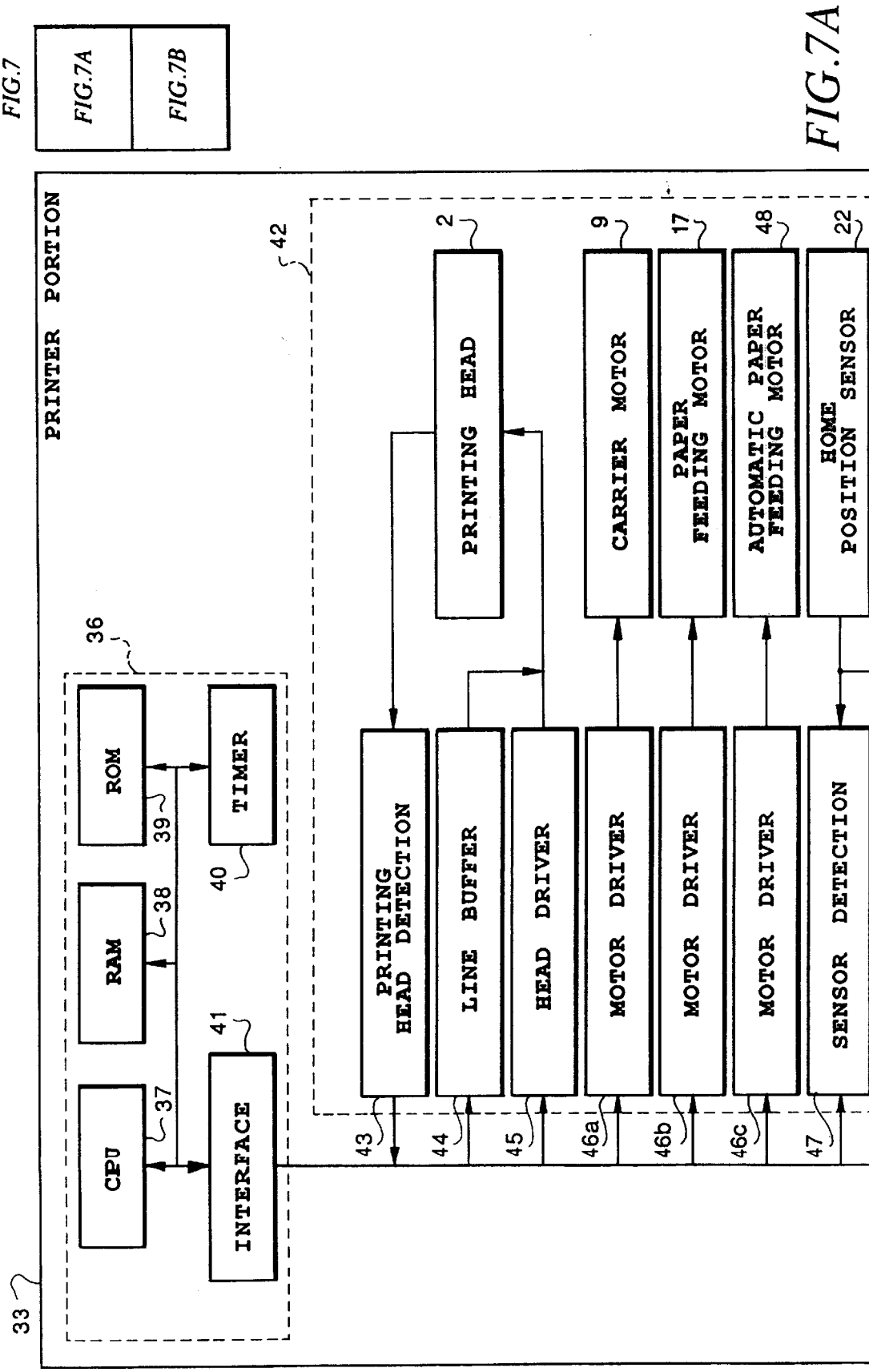

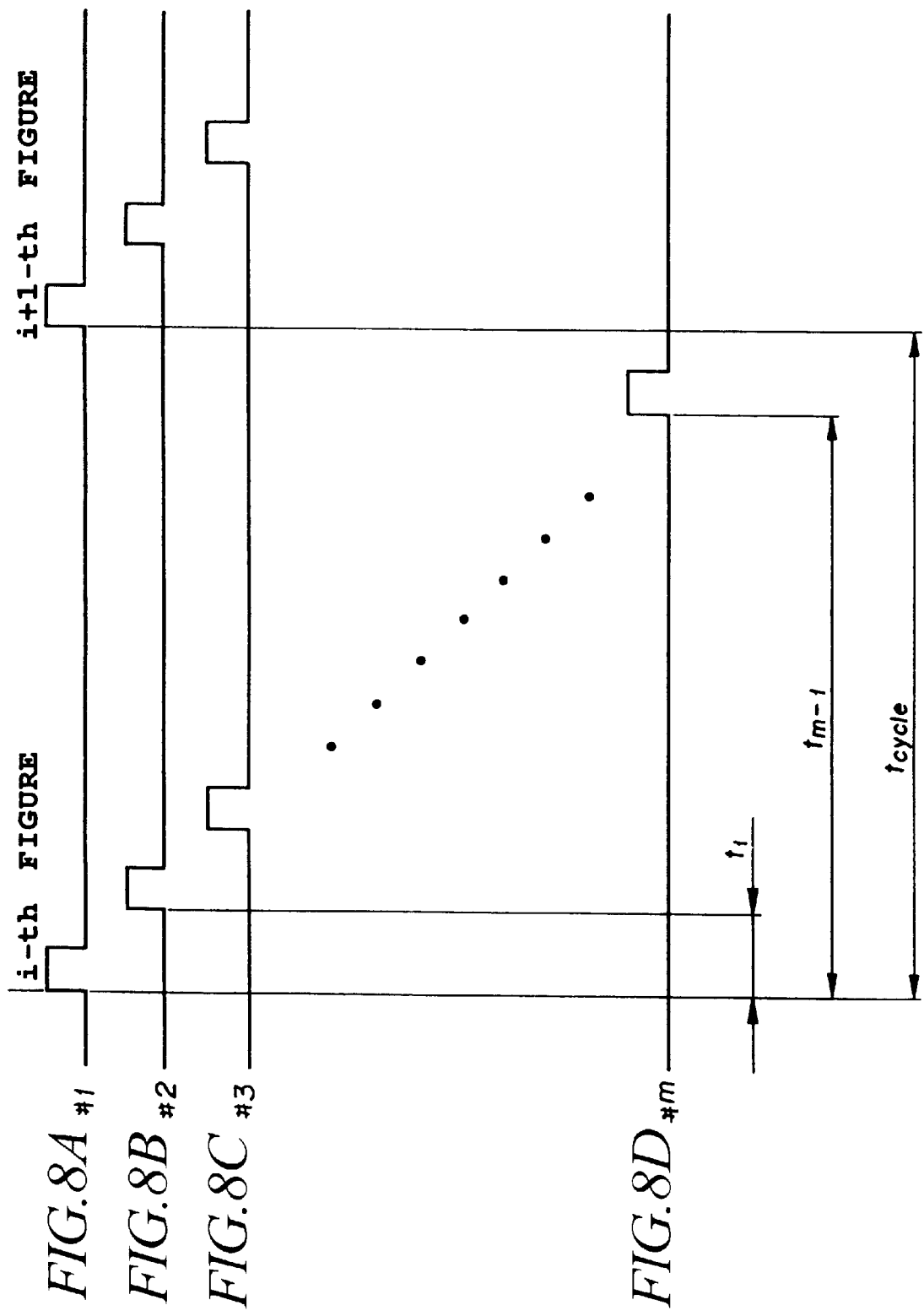

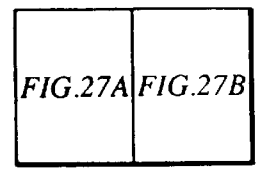
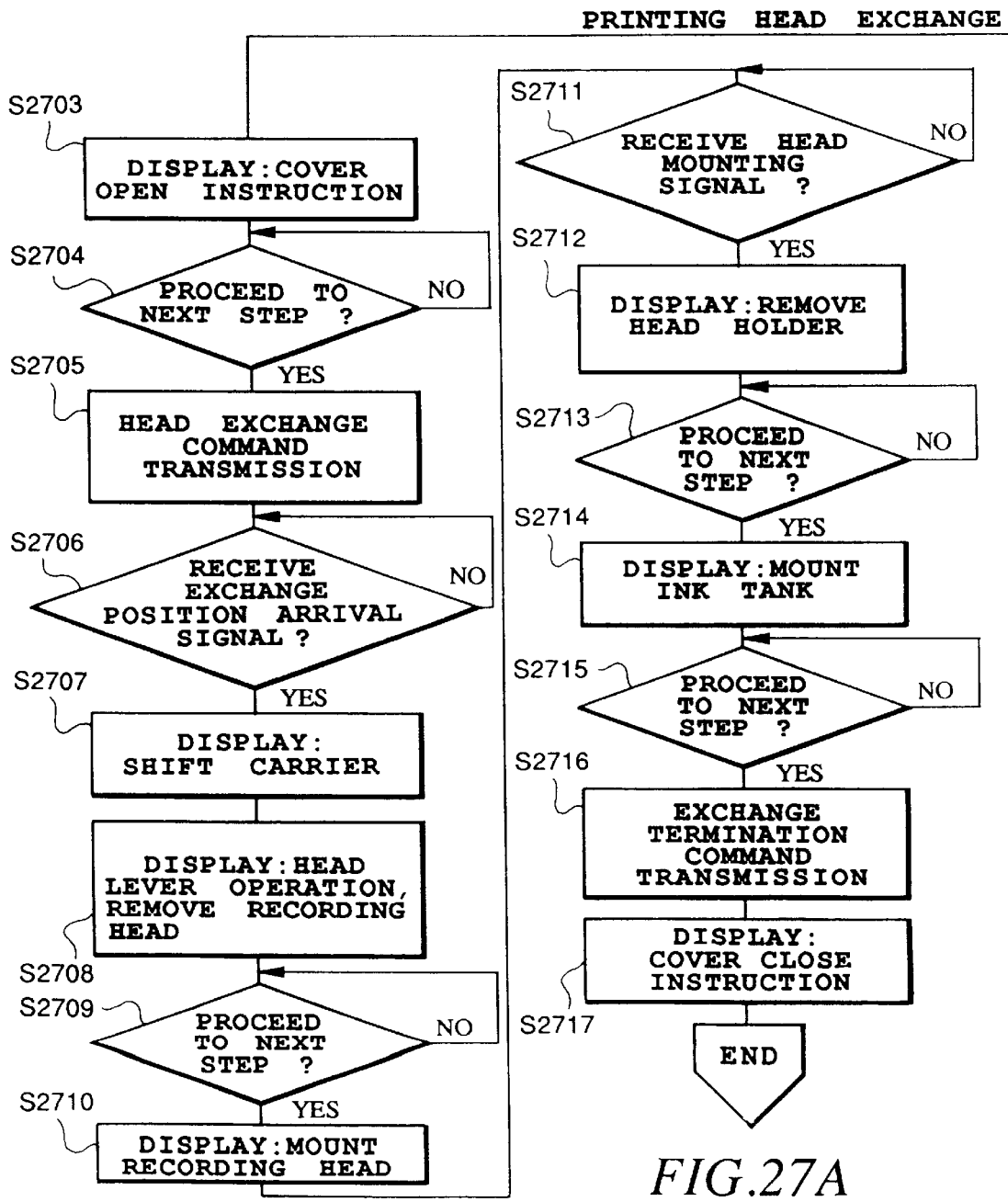
FIG.27A

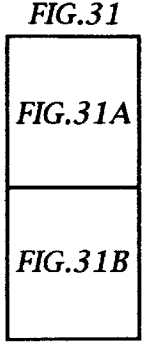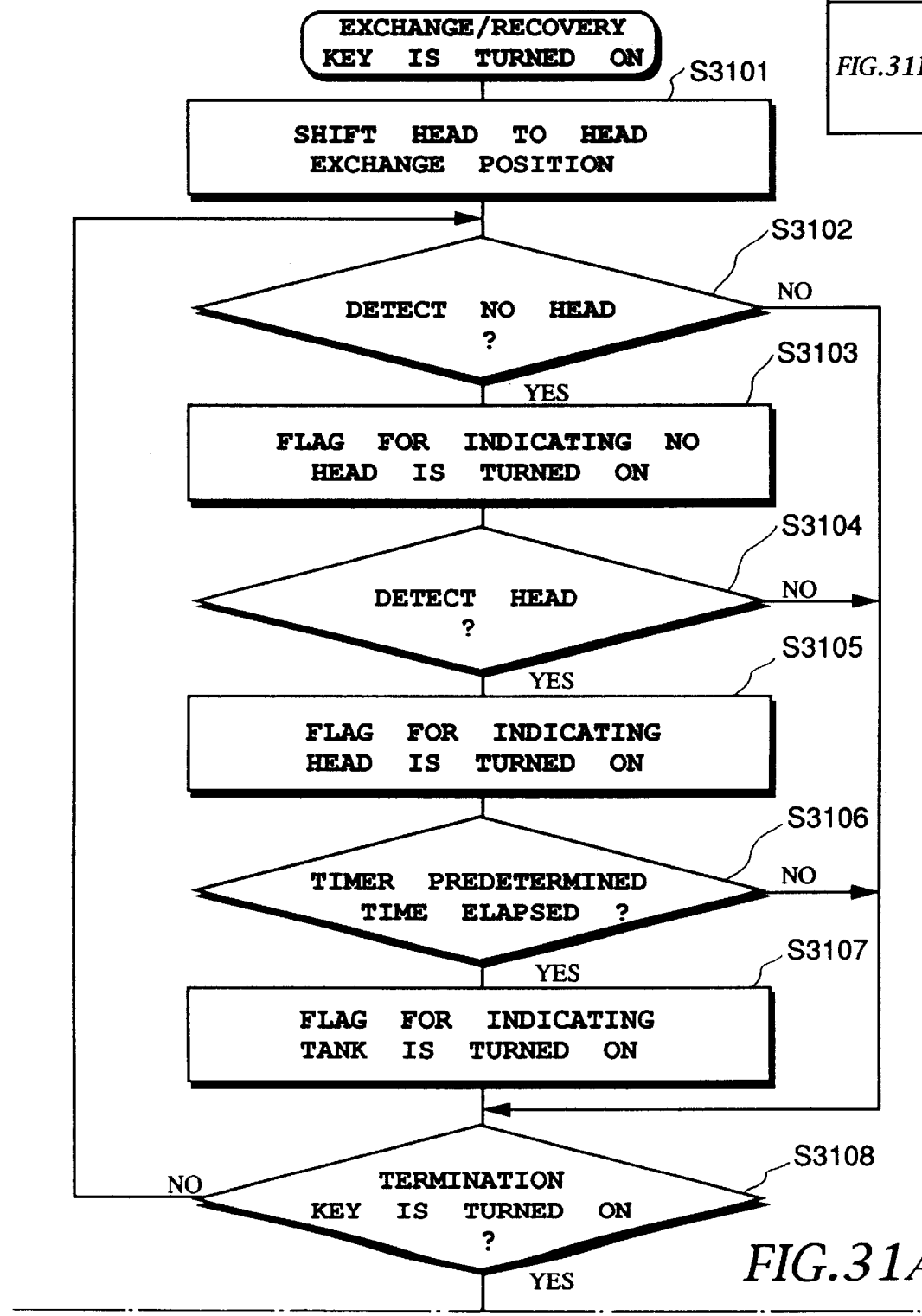
FIG.31A $\eta$ TABLE

| TIME (hour/day) | EVAPORATION COEFFICIENT $\eta$(%) |
|---|---|
| 0 hour | 100 |
| ⋮ | ⋮ |
| 12 hour | 97 |
| ⋮ | ⋮ |
| 24 hour | 95 |
| ⋮ | ⋮ |
| 2 day | 90 |
| ⋮ | ⋮ |
| 30 day | 21 |
| ⋮ | ⋮ |
| 60 day | 4 |

*FIG.36*

INFORMATION PROCESSING SYSTEM INCLUDING THE PRINTING APPARATUS

This application is a continuation of application Ser. No. 08/182,564 filed Jan. 18, 1994, now abandoned.

BACKGROUND OF THE INVENTION

1. Field of the Invention

The present invention relates to a printing apparatus and an information processing system including the printing apparatus.

2. Description of the Related Art

As one of the most general configurations of this kind of information processing systems, the configuration in which an ink jet printing apparatus (hereafter, it may also be referred to as "an ink jet printer") is connected to a so-called personal computer is known. The user of a personal computer system operates keys and the like confirming information indicated on a display thereof and gives instructions for executing information processing. Then, results processed in the system can be recorded by means of the aforementioned printer or can be indicated on the display thereof.

In conventional systems of this kind, between a personal computer as a host apparatus and a printer which are components constituting the system, only transmission and reception of data required for recording operation such as recording data and recording control data are often performed, and data related to the other operations of the printer mainly are inputted at the printer side.

For example, such as an instruction for ejection recovery operations proper to the ink jet printer often is performed by means of a key operation exclusive thereto or the like. Also, even when these operations are automatically performed at the printer side, these are performed independently of the host apparatus.

On the other hand, the ink jet printer serves to execute various operations being attendant on the printing operation thereof. The ejection recovery operation described above is a typical example thereof, as the various operations there are control of an ink amount in an ink tank and operation for exchange of the ink tank, control of a waste-ink tank storing waste-ink expelled on the ejection recovery operation described above, and further operation associated with exchange of a recording head.

In a case where the aforementioned ink jet printer independently performing processing is connected to an information various operations described above system as one component thereof, wherein the information processing system includes a computer as a host apparatus thereof, execution of these generations with the entire system might be convenient for the user of the system.

SUMMARY OF THE INVENTION

The object of the present invention is to provide a printing apparatus and an information processing apparatus using the printing apparatus in which a user of the apparatuses can appropriately perform an operation related to the printing apparatus by means of displaying operating information.

Another object of the present invention is to provide an ink jet printing apparatus and an information processing system including the ink jet printing apparatus these of which permit the user thereof to appropriately perform exchanging operation of an ink tank or an ink jet head, to execute appropriate processing associated with the exchanging operation thereof, and further to perform an appropriate control of a waste-ink tank.

A further object of the present invention is to provide an ink jet printing apparatus and an information processing system using the ink jet printing apparatus in which information for an exchanging operation of an ink tank or the like can be displayed on a display unit, and the ink jet apparatus can perform the operation according to the information displayed.

According to a first aspect of the present invention, there is provided an information processing apparatus generating and outputting output information by using a printing apparatus, comprising:

discrimination means for discriminating instruction information inputted from the outside the information processing apparatus in response to an operating procedure of the printing apparatus, the operating procedure being displayed on a display portion; and display control means for controlling the display of the operating procedure displayed on the display portion on the basis of a result of discrimination by the discrimination means.

According to a second aspect of the present invention, there is provided a printing apparatus outputting output information based on information inputted from an information processing apparatus, comprising:

detection means for detecting state information of the printing apparatus operated in accordance with an operating procedure of the printing apparatus, the operating procedure being displayed on a display portion of the information processing apparatus; and output means for outputting the state information to the information processing apparatus in order to control the display of the operating procedure of the printing apparatus on the basis of a result of detection by the detection means.

According to a third aspect of the present invention, there is provided an information processing system including a printing apparatus and an information processing apparatus, comprising:

discrimination means for discriminating instruction information inputted from the outside the information processing system in response to an operating procedure of the printing apparatus, the operating procedure being displayed on a display portion;

detection means for detecting state information of the printing apparatus operated in accordance with an operating procedure of the printing apparatus; and display control means for controlling the display of the operating procedure displayed on the display portion on the basis of a result of discrimination by the discrimination means and/or a result of detection of the detection means.

According to a fourth aspect of the present invention, there is provided an information processing method in an information processing apparatus generating and outputting output information by using a printing apparatus, comprising the steps of:

discriminating instruction information inputted from the outside the information processing apparatus in response to an operating procedure of the printing apparatus, the operating procedure being displayed on a display portion; and controlling the display of the operating procedure displayed on the display portion on the basis of a result of the discrimination.

According to a fifth aspect of the present invention, there is provided an information processing method in a printing apparatus outputting output information based on information inputted from an information processing apparatus, comprising the steps of:

detecting state information of the printing apparatus operated in accordance with an operating procedure of the printing apparatus, the operating procedure being displayed on a display portion of the information processing apparatus; and outputting the state information to the information processing apparatus in order to control the display of the operating procedure of the printing apparatus on the basis of a result of the detection.

According to a sixth aspect of the present invention, there is provided an information processing method in an information processing system including a printing apparatus and an information processing apparatus, comprising the steps of:

discriminating instruction information inputted from the outside the information processing system in response to an operating procedure of the printing apparatus, the operating procedure being displayed on a display portion;

detecting state information of the printing apparatus operated in accordance with an operating procedure of the printing apparatus; and controlling the display of the operating procedure displayed on the display portion on the basis of a result of discrimination and/or a result of the detection.

The above and other objects, effects, features and advantages of the present invention will become more apparent from the following description of embodiments thereof taken in conjunction with the accompanying drawings.

BRIEF DESCRIPTION OF THE DRAWINGS

FIGS. 7A and 7B are block diagrams illustrating a control circuit arrangement of the information processing apparatus;

FIGS. 8A–8D comprise a timing chart illustrating timing of ink ejection from a printing head of the embodiment;

FIGS. 27A and 27B are flowcharts showing the processing procedure in a host portion in printer operation processing of the embodiment;

FIGS. 31A and 31B are flowcharts showing the processing procedure peculiar to the printer portion of the embodiment;

FIG. 36 is a table used in waste ink amount control in the embodiment;

DETAILED DESCRIPTION OF THE PREFERRED EMBODIMENTS

Hereinafter, embodiments of the present invention will be concretely described with reference to the accompanying drawings.

Figure 1:
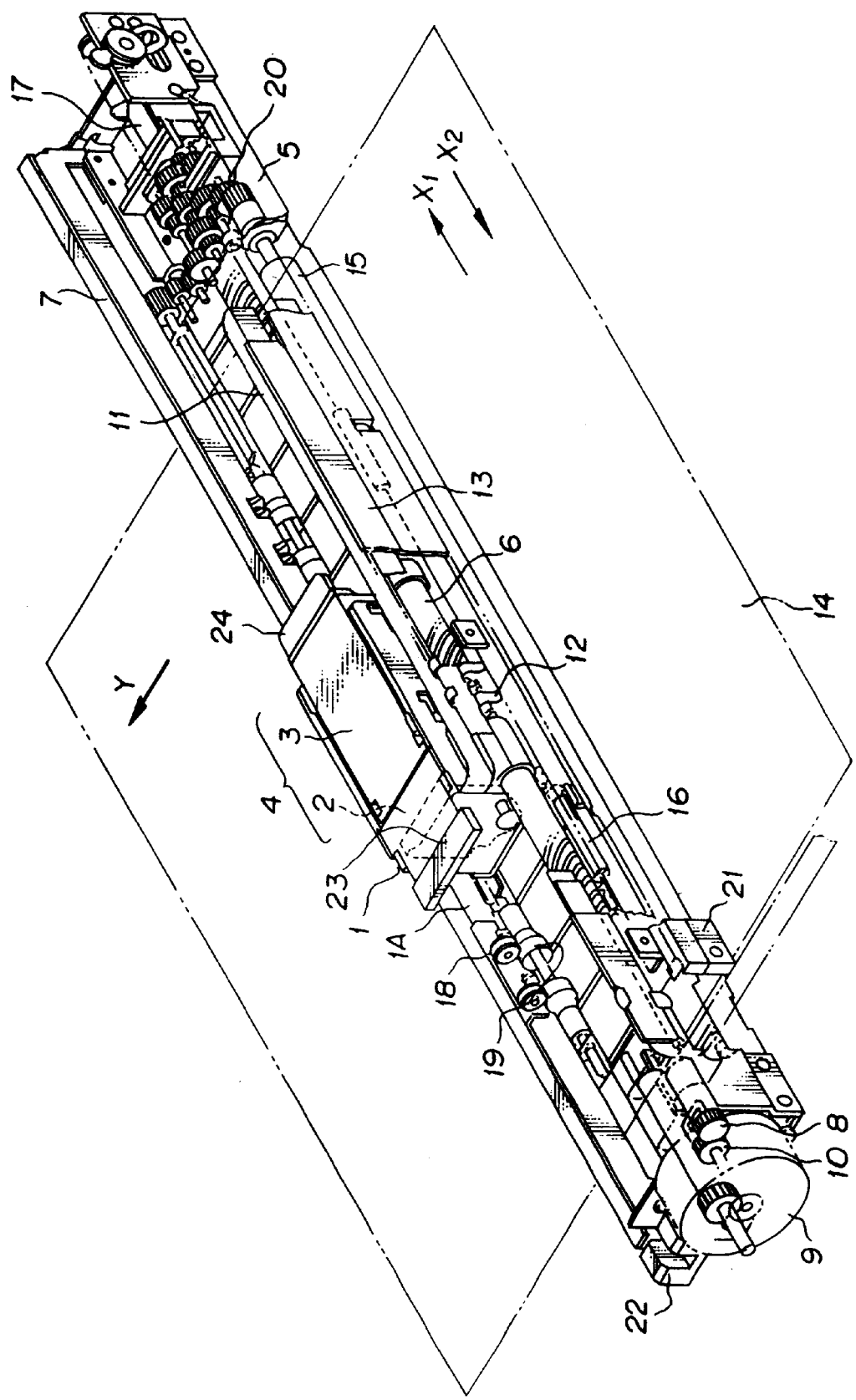
FIG. 1 is a perspective view showing an embodiment of an ink jet recording apparatus according to the present invention.

FIG. 1 is a perspective view showing an ink jet printing apparatus according to an embodiment of the present invention. In FIG. 1, a head cartridge 4 in which a printing head 2 is combined with an ink tank 3 to constitute a printing means, is mounted on a carrier 1. One end portion at the recording head 2 side of the carrier 1 is slidably engaged with a lead screw in the axial direction thereof, wherein the load screw is rotatably supported to a chassis 5 forming a frame of the ink jet printing apparatus. The other end portion of the carrier 1 is provided with a guide (not shown). The guide is fitted into a guide rail 7 formed on the chassis 5 such that it can move slidably along by the axis of the lead screw 6. Thus, the carrier 1 is constructed so that it enables to move to and fro continuously keeping in a fixed position in the axial direction of the lead screw 6 in accordance with the rotation thereof.

More specifically, with regard to the lead screw 6, a lead screw gear 8 secured to the left end thereof engaged with a pinion gear 10 secured to the output shaft of a carrier motor 9 as shown in FIG. 1, and a lead pin (not shown) fixed to the carrier 1 is fitted into a guide groove (not shown) being formed on the lead screw 6 with a predetermined pitch. Accordingly, as the carrier motor 9 is rotated in the normal direction or in the reverse direction, the lead screw 6 is rotated so as to allow the carrier 1 to move to or fro therewith.

Reference numeral 11 denotes a flexible cable which transmits a printing signal from an electric circuit as will be described to the printing head 2. The flexible cable 11 is located and held on a pinch roller frame 13 by a flexible cable holder 12.

Recording by a length of line on a recording medium 14 can be performed by ejecting or discharging ink thereon from the printing head 2 in synchronism with the afore-mentioned reciprocating motion (scanning) of the carrier 1. More specifically, the printing head 2 includes a fine liquid ejection orifice (hereafter, a liquid ejecting orifice may also be referred to as an orifice), a liquid path, an energy functioning portion provided in a liquid path, and an energy generating means which generates energy acting on liquid (hereafter, a liquid may also be referred to as an ink) in the energy functioning portion. An ink droplet is ejected from the orifice described above by utilizing energy generated by the energy generating means.

As such energy generating means for generating energy, there are some means, for example, means employing electromechanical transducer such as a piezoelectric crystal element, means which generates heat by irradiating electromagnetic waves such as a laser so as to eject a liquid droplet, and means which heats a liquid by an electrothermal converting element having a heat resistor.

Among them, a printing head of the system which has means for generating thermal energy used for ejecting liquid, can achieve high resolution recording because it enables to dispose liquid ejecting orifices thereof with high density. In particular, a printing head using an electrothermal converting element as energy generating means can be made compact in size and also can sufficiently utilize the merits of IC fabrication technology and micro-processing techniques these of which have made the remarkable progress in technology and the considerable improvement in reliability in the field of recent semiconductor manufacturing technology. As a result, the printing head of this kind has an advantage that packaging with high density can be achieved easily and that manufacturing cost thereof can be reduced.

When printing of a line has completed by the scanning of the carrier 1, then the recording medium 14 such as a printing paper is transported by a thickness of the line by transportation means and successive printing of next line is performed. This transportation of the printing medium 14 is carried out with a pair of rotors, that is, a transportation roller 15 and a pinch roller 16 pressure-contacting thereto and with a pair of rotors, that is, a discharging roller 19 and a spur 18 contacting thereto.

The printing medium 14 whose printing surface faces to a face of ejecting portion of the printing head 2 is pressure-contacted to the transportation roller 15 by the pinch roller 16 and the transportation roller 15 is appropriately rotated by a paper feeding motor 17, whereby the printing medium is transported by an amount required for performing next recording operation. After when the printing operation has completed, the printing medium 14 is pressure-contacted to the discharging roller 19 by the spur 18 and then transported by the rotation thereof so as to be discharged out of the apparatus.

The afore-mentioned transportation roller 15 and discharging roller 19 are driven by the paper feeding motor 17 and the transmission of driving force from the motor 17 to the rollers is performed by a reduction gear train 20.

Reference numeral 21 denotes a paper sensor for detecting the presence of the printing medium 14. Reference numeral 22 denotes a home position sensor made up of a photo-interrupter. The home position sensor 22 detects whether the carrier 1 is present at the home position (positioned at the left side in the figure) or not through opening/shutting of the home position sensor 22 by a shutter 1A which is attached to the carrier 1 and moves therewith.

Figure 2:
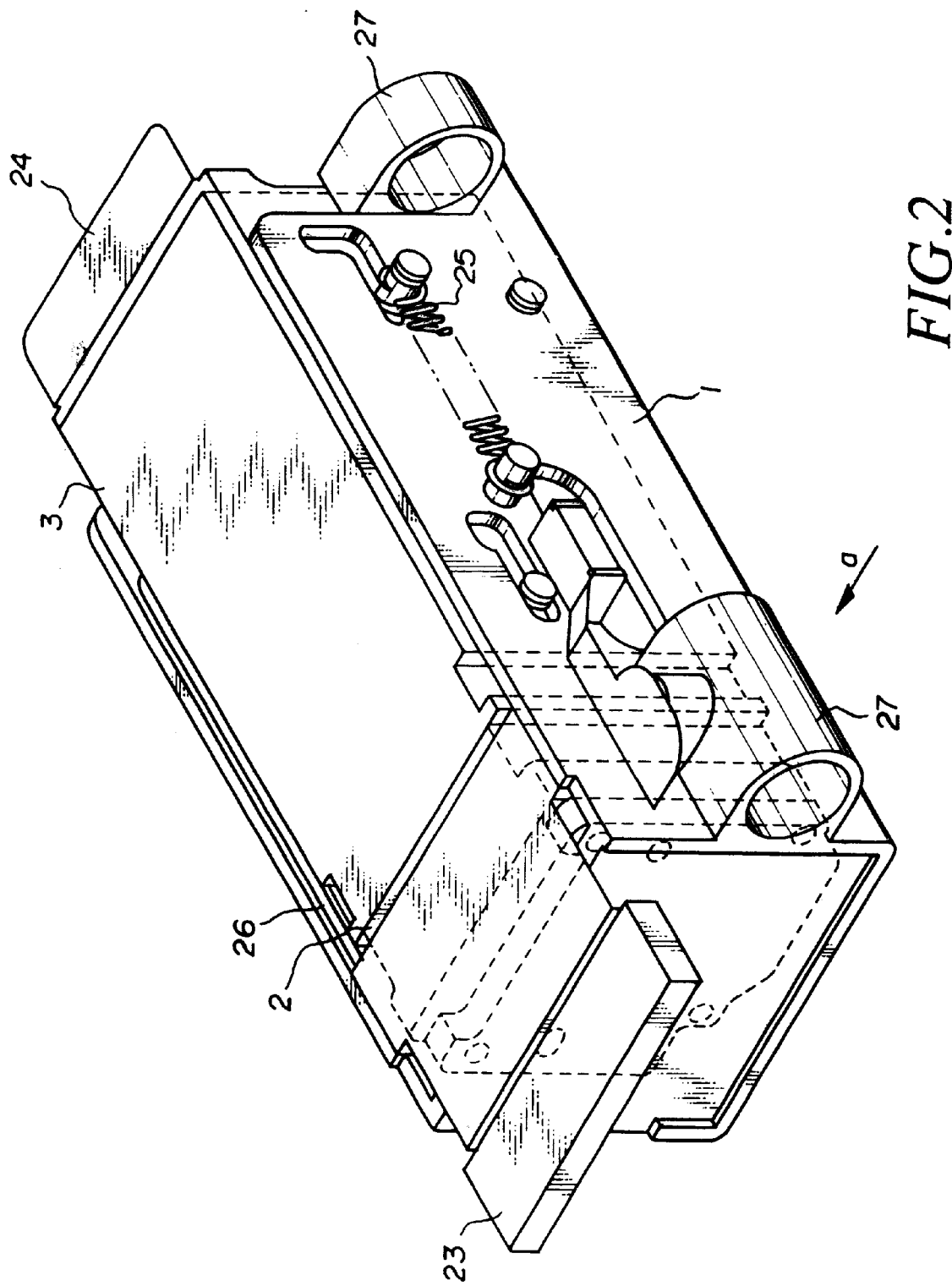
FIG. 2 is a perspective view showing a carrier portion of the above embodiment of FIG. 1.

FIG. 2 is a perspective view showing head cartridge and carrier portions of the ink jet recording apparatus shown in FIG. 1. In FIG. 2, reference numeral 23 denotes a head lever for holding the recording head 2 and for releasing it from the held state, reference numeral 24 denotes an ink tank lever for connecting the ink tank 3 to the printing head 2 and disconnecting the former from the latter, reference numeral 25 denotes a head holder spring for firmly holding the recording head 2 on the carrier 1, reference numeral 26 denotes an ink tank case for holding the ink tank 3, and reference numeral 27 denotes a connecting portion for engaging the carrier 1 with the lead screw 6. The head cartridge and carrier portions of the printing apparatus are constituted by the aforementioned components.

The printing head 2 includes a substrate on which a plurality of electrothermal converting elements for generating thermal energy to be utilized for ejecting ink and a driving circuit for driving the electrothermal converting elements are formed, a plurality of ejecting orifices and ink paths which are formed on the substrate corresponding to each of the plurality of electrothermal converting elements, and further a top plate which is layered on the substrate to form a common ink chamber communicating with the ink paths. In addition, the printing head 2 includes electrical contacts by which signals outputted from the printing apparatus body are transmitted to the driving circuit. Furthermore, to detect the operative state of the printing head 2 from the recording apparatus body side, a plurality of sensors may be arranged in the recording head 2. Specifically, a temperature detecting sensor for detecting a temperature in the vicinity of the electrothermal converting element, an ink remaining quantity detecting sensor for detecting that feeding of the ink is interrupted and that no ink is present in the common ink chamber, a head kind discriminating sensor for specifying the kind of a printing head cartridge when a different kind of printing head and a printing head cartridge having a different kind of ink stored therein are exchanged, and the like. In response to signals transmitted from these sensors, the printing apparatus body determines the present operative state of the printing head 2 in order to properly control a signal to be supplied to the electrothermal converting element to optimize each printing operation to be performed.

The printing head thus constructed is mounted on the printing apparatus in such a manner that a face of the discharging portion having a plurality of ink ejecting orifices of the printing head 2 arranged thereon faces to a printing medium.

Next, a method of mechanically and electrically connecting the printing head 2 with the carrier 1 in such a case as exchanging of a printing head or a head cartridge in which a printing head is connected with an ink tank will be described below.

Figure 3:
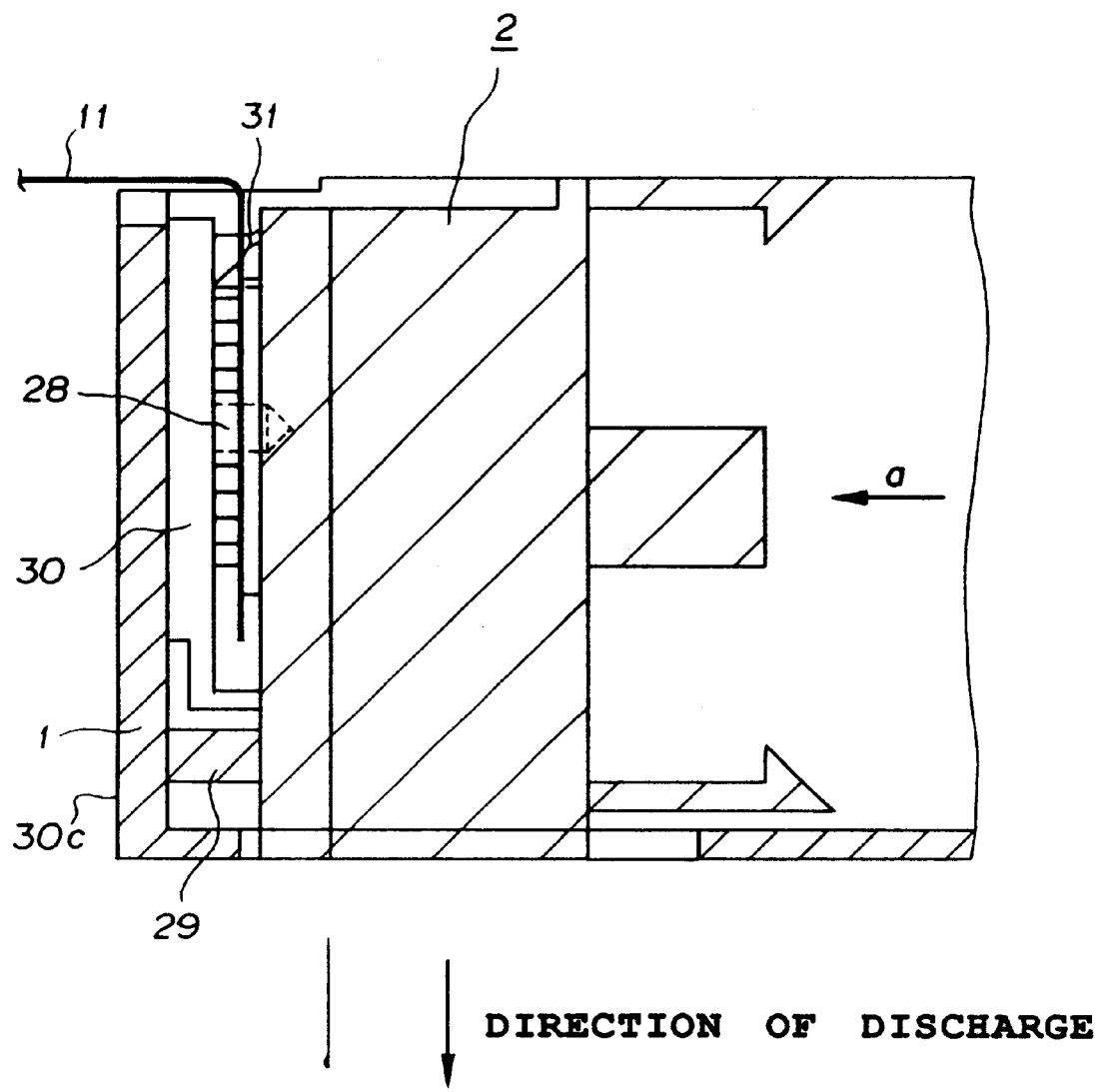
FIG. 3 is an enlarged cross-sectional view of a part of the carrier portion of the embodiment.
Figure 4:
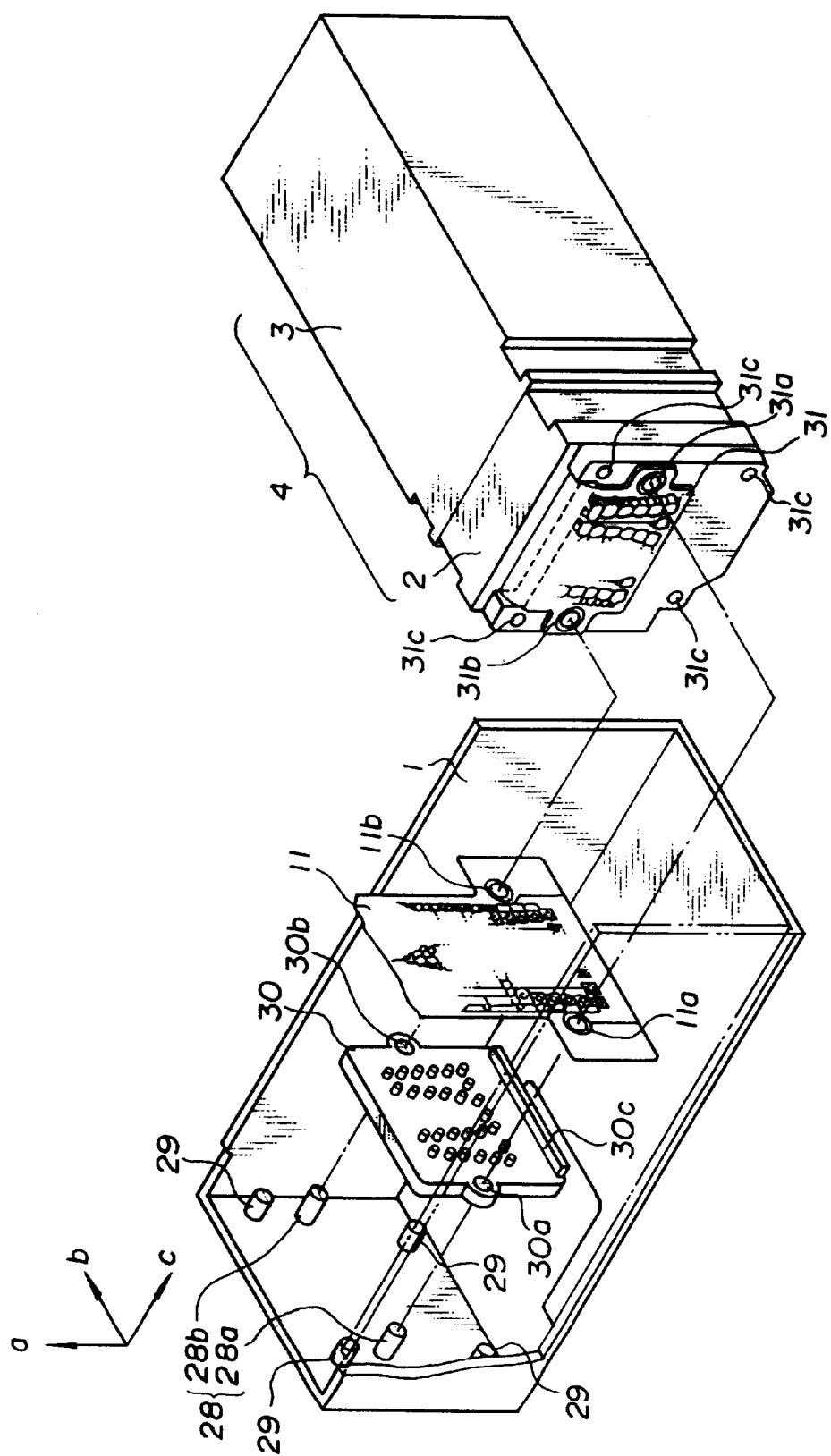
FIG. 4 is a perspective view illustrating a connection method between the carrier portion and a head cartridge portion of the embodiment.

FIG. 3 is a sectional view showing a connecting portion of the printing head 2 to the carrier as seen from the direction of the arrow a as shown in FIG. 2 and FIG. 4 is a perspective view partly broken away to show the order of attachment therebetween.

In FIGS. 3 and 4, reference numeral 28 denotes a locating pin secured to the carrier 1 to be fitted into a hole formed in the printing head 2 so as to locate the printing head 2 not only in the a arrow-marked direction but also in the b arrow-marked directions as seen in FIG. 4, reference numeral 29 denotes a stopper fixedly secured like the locating pin to the carrier 1 to support the printing head 2 thrusted in the a arrow-marked direction as seen in FIG. 3, reference numeral 11 denotes a flexible cable for electrically connecting the printing apparatus body to the printing head 2, reference characters 11a and 11b denote locating holes formed through the flexible cable 11, respectively, reference numeral 30 denotes a flexible cable pad held between the flexible cable 11 and the carrier 1 in the clamped state to elastically support the flexible cable 11, reference characters 30a and 30b denote locating holes formed through the flexible cable pad, respectively, reference character 30c denotes an ink barrier for preventing ink from invading in a contact portion, reference numeral 31 denotes a head contact portion disposed on the printing head 2 to be electrically connected to a heater (electrothermal converting element) portion in the printing head 2, reference characters 31a and 31b denote locating holes formed through the head contact portion 31, and reference character 31c denotes a stopper contact portion at which an end surface of the stopper 29 comes in contact with the head contact portion 31.

The printing head 2 is pressed in the a arrow-marked direction as seen in FIG. 3 by the resilient force of the head holder spring 25 shown in FIG. 2 with the aid of a lever (not shown), and the position of the printing head 2 is definitely determined by, the engaged state of with the locating pins 28 relative to the foregoing holes, and the interfered state of the printing head 2 relative to the stoppers 29. With this construction, the printing head 2 is mechanically connected to the carrier 1.

In addition, a plurality of electrical contacts are disposed at predetermined positions not only on the head contact portion 31 provided on the printing head 2 but also on an end surface of the flexible cable 11, and when these two sets of the electrical contacts are pressed against each other with predetermined pressing force, the printing apparatus body is electrically connected to the printing head 2 via these electrical contacts. At this time, since it is necessary that the electrical contacts are simultaneously pressed against each other, the flexible cable pad 30 molded of an elastic material is provided on a pressing portion of the carrier 1 so as to enable the electrical contacts to be uniformly pressed. Usually, the flexible cable pad 30 is molded of silicon rubber and includes a plurality of projections at the positions corresponding to the electrical contacts, causing a predetermined intensity of pressing force to be concentrated applied to the respective electrical contacts with the aid of the foregoing projections. Incidentally, each of the electrical contacts disposed on the flexible cable 11 may be designed in a projection-shaped contour in order to assure that they are reliably electrically connected to the recording head 2 with a more concentratedly applied pressing force.

Since the reactive force arising when the electrical contacts of the printing head 2 are pressed against the pressing portion of the carrier 1 is set to be much smaller than the resilient force of the head holder spring 25 adapted to press the recording head 2 against the carrier 1, there does not arise a malfunction that the printing head 2 is dislocated from the original position due to the reactive force arising from the flexible cable pad 30.

The carrier 1, the flexible cable pad 30, the flexible cable 11, the head contact portion 31, and the head cartridge 4 are required to be exactly positioned relative to each other in order to maintain reliable electrical connection therebetween and perform each recording operation at a high quality. To meet this requirement, the following measures are taken.

More specifically, while two locating pins 28 of the carrier 1 are taken as reference, one of the locating pins 28a is commonly fitted through the locating holes 30a, 11a, and 31a and the other locating pin 28b is likewise commonly fitted through the locating holes 30b, 11b, and 31b, whereby each of them is exactly positioned in both the a arrow-marked and b arrow-marked directions as seen in FIG. 4.

In addition, the end surface of the stopper 29 is pressed in the a arrow-marked direction as seen in FIG. 3 until it comes in contact with the stopper contact portion 31c of the head contact portion 31, whereby also the position of the printing head 2 in the a arrow-marked direction as seen in FIG. 4 is exactly determined.

Figure 5:
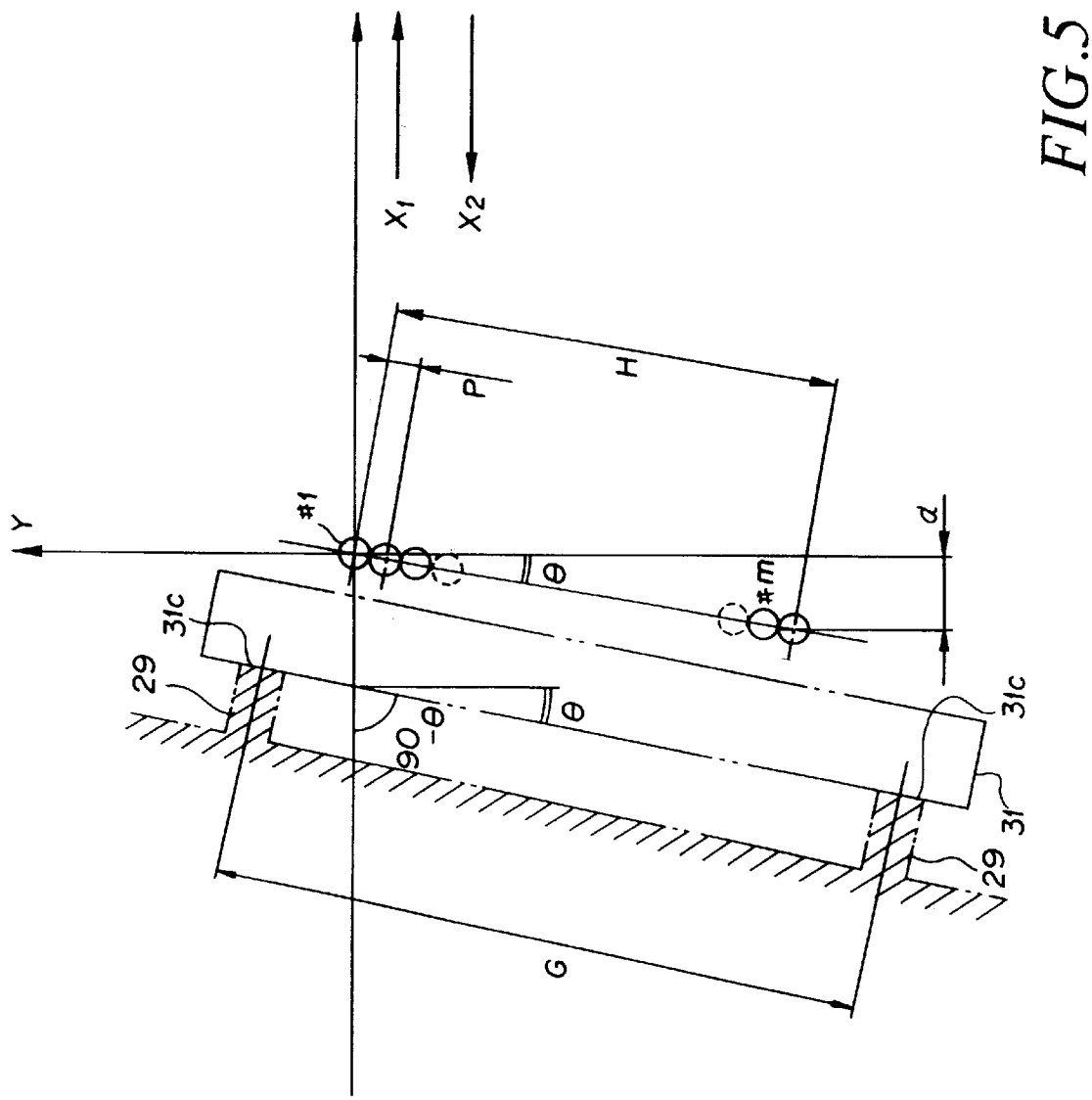
FIG. 5 is a schematic view illustrating a positioning method between the carrier portion and the head cartridge portion of the embodiment.

Also, as shown in FIG. 5, the stoppers 29 are formed so that arrangement line of these stoppers is inclined by a predetermined angle $\theta$ with respect to the transportation directions $X_1$ and $X_2$ of the carrier 1 whereby when the printing head 2 is positioned on the carrier 1, nozzles #1 to #m (a nozzle may also be referred to as "an ejecting orifice" or simply "orifice") disposed at a constant pitch P in the printing head 2 is so arranged to have a gradient of a predetermined length d with respect to the length of nozzle arrangement H. Further, in order to keep the accuracy of the afore-mentioned predetermined length d, the distance between the stoppers 29 is designed on the larger side with respect to the length of nozzle arrangement H.

Next, with regard to an information processing apparatus equipped with the afore-mentioned ink jet printing apparatus, the construction and the electrical circuit thereof will be described in detail.

Figure 6:
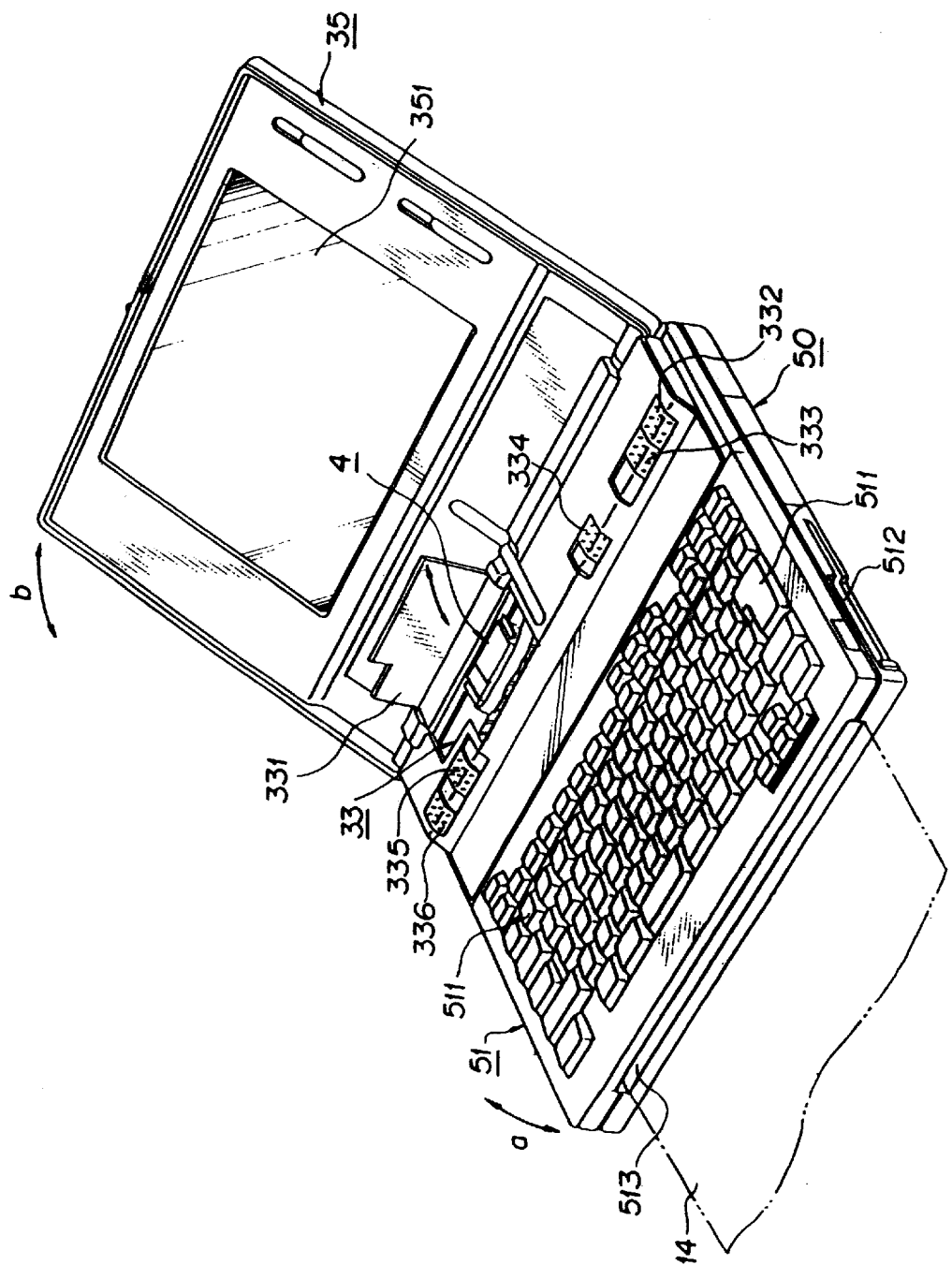
FIG. 6 is a perspective view showing an information processing apparatus with the ink jet printing apparatus of the embodiment incorporated.

FIG. 6 is a schematic perspective view showing the appearance of an information processing apparatus 50 in which the ink jet printing apparatus according to the embodiment of the present invention is installed. The information processing apparatus 50 of the instant embodiment is a so-called personal computer and is of a handy type incorporated with the afore-mentioned ink jet printing apparatus. In FIG. 6, reference numeral 33 denotes a printer portion including the ink jet printing apparatus described above, reference numeral 51 denotes a key board portion including keys 511 for inputting characters, numerals, or the like thereinto and keys 512 for inputting various kinds of commands, and reference numeral 35 denotes a display for indicating processing information. The display has a display image plane 351.

In the printer portion 33, a window 33 is formed from a transparent plastic so that the movements of the head cartridge 4 or the like can be seen through the window 331. The window 331 is constructed so that it may open and close in cases of exchange of the ink tank and the like. Keys 332, 333, and the like are provided for individually indicating operations in the printer such as an ejection recovery operation or paper feeding. An installation and removal mouth 512 for a floppy disk is provided at the lower side portion of the key board portion 51.

The display 35 can rotatably be folded in the b arrow-marked direction as shown in FIG. 6 so as to be integrated with the key board portion 51 in such a case of carrying thereof. Also, the key board portion 51 can be rotated in the a arrow-marked direction as shown in the figure in such a case of setting up of the printing paper 14 to the printer section 33.

Figure 7B:
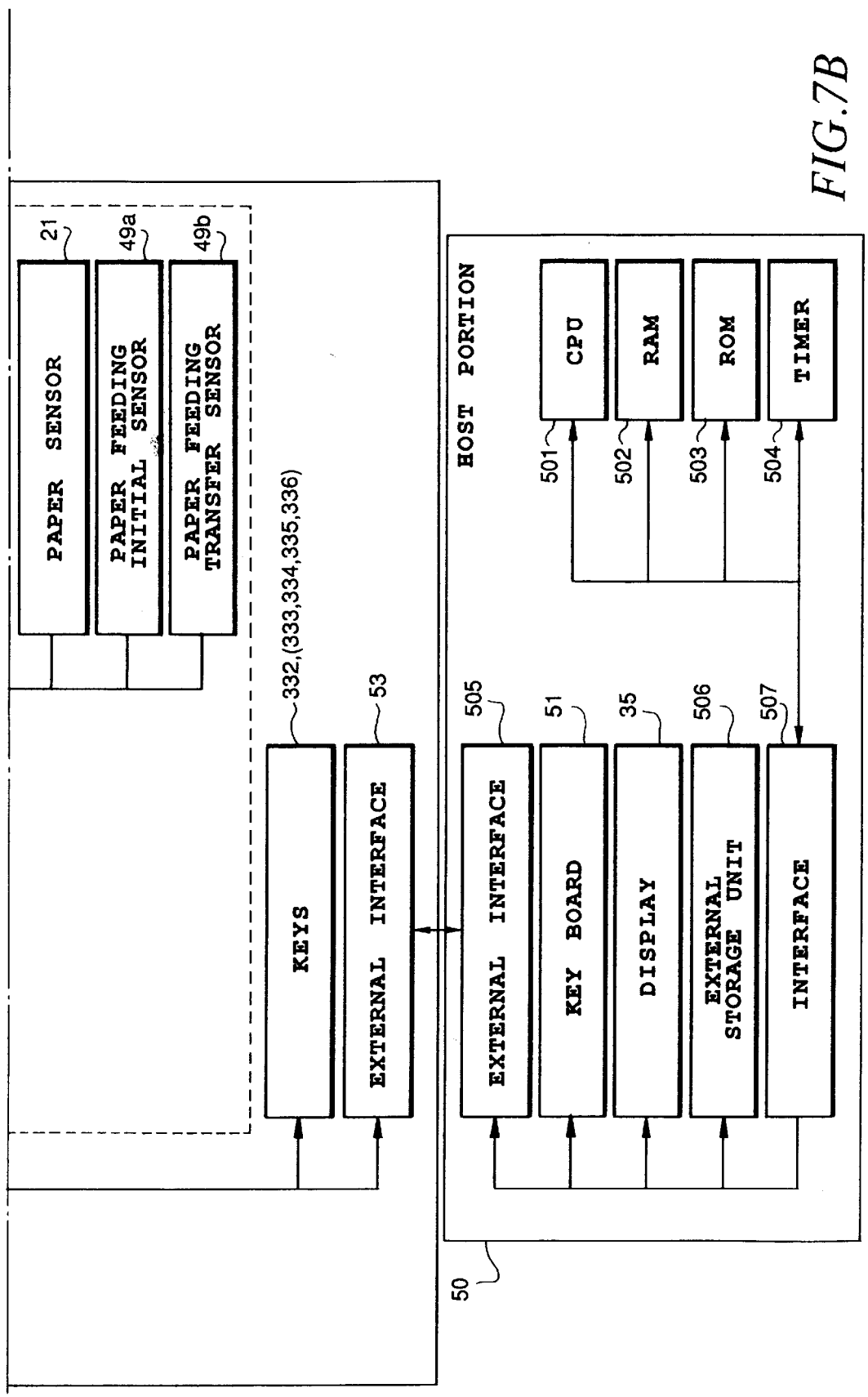

FIG. 7 is a block diagram showing respective control circuit constructions of the information processing apparatus 50 and the printer portion 33 described above.

At first, the construction of control circuit of the printer section 33 will be explained in detail. In FIG. 7, reference numeral 36 denotes a controller for executing main control, reference numeral 37 denotes a central processing unit (CPU) designed, for example, in the form of microcomputer, which executes the processing procedure at the printer side as will be described later, reference numeral 38 denotes a random access memory (RAM) including a working area or the like in the processing procedure described above, reference numeral 39 denotes a read only memory (ROM) storing a program corresponding to the processing procedure described above, reference numeral 40 denotes a timer for governing an execute cycle for CPU 37 and for generating a timing relationship required when a printing operation is performed in the printer portion 33, and reference numeral 41 denotes an interface portion communicating signals from the CPU 37 with a host apparatus.

Further, reference numeral 42 denotes a driving portion of the printer portion 33. In the driving portion 42, reference numeral 43 denotes a printing head detection section for detecting information related to the printing head 2. More specifically, as the information related to the printing head 2, there are information such as an output value of a sensor for detecting the presence of the printing head 2, that of a sensor for detecting the kind thereof, that of a sensor for detecting the temperature of the printing head 2, and further an output of a sensor for detecting the presence of ink in the ink tank 3. Reference numeral 44 denotes a line buffer for storing printing data of the printing head 2, and reference numeral 45 denotes a head driver for supplying driving signals and electric power to the printing head 2. Reference characters 46a, 46b, and 46c denote motor drivers for supplying driving signals and electric power required for driving a carrier motor 9, a paper feed motor 17, and an automatic paper feeding motor 48, respectively. Reference numeral 47 denotes sensor detection portion for detecting respective outputs from sensors such as a home position 22, a paper sensor 21, a paper feeding initial sensor 49a, and a paper feeding transfer sensor 49b.

Next, an information processing apparatus as the host portion 50 includes a CPU 501 for executing the processing at the host portion side. A ROM 503 stores processing procedure and font data and a RAM 502 has an area for developing text data and image data in addition to a working area thereof.

The CPU 501 performs a predetermined indication on a display portion 35 while performing sending/receiving of signals between the printer portion 33.

Additionally, reference numeral 506 denotes an external storage unit such as a floppy disc drive (FDD), a head disc drive (HDD), a random access memory card (RAM card), or the like, and reference numeral 505 denotes an external interface portion for making communication with another information processing unit or controlling peripheral equipment while making connection directly to buses disposed inside of each peripheral equipment.

Incidentally, in addition to these apparatuses and units described above there is provided a power source section (but not shown in FIG. 7) for supplying electric power to the afore-mentioned control circuits. The power source section includes, for example, a rechargeable battery, a disposable dry cell, or an AC power supply transformer which is used when the information processing apparatus body is fixed in place.

With the control circuit constructions described above, the printing on the recording medium 14 (recording paper) is performed in the printer portion (the ink jet printing apparatus). With reference to a timing chart in FIG. 8, the outline of ejection control in the printing head will be described below.

FIG. 8 is a timing chart illustrating timing of ink ejection from the printing head 2, while scanning the carrier 1 in the $X_1$ direction (see FIGS. 1 and 5).

The ink ejection is successively performed in the order of nozzles #1 to #m of the printing head 2. In FIG. 8, symbol $t_1$ denotes a time difference between respective initiation of ink discharge from the nozzles #1 and #2, symbol $t_{m-1}$ ejection a time difference between respective initiation of ink ejection from the nozzles #1 to #m−1, and symbol $t_{cycle}$ denotes an ejection interval of the same nozzle. Usually, the time difference between respective initiation of ink ejection from adjacent nozzles should preferably be held constant. That is, then $$t_{m-1} = (m-1) \times t_1$$

Here, by performing ink ejection with the time difference $t_{m-1} = d \times t_{cycle}/R$, while transporting the carrier 1 in the $X_1$ direction at a speed $R/t_{cycle}$, the effects of both the gradient d of nozzles (see FIG. 5) and the time difference $t_{m-1}$ of ink discharge from nozzles are offset. As a result, this makes it possible to perform printing without inclination.

Hereinafter, with reference to FIGS. 9 to 12 exchanges of the printing head and ink tank in the ink jet printing apparatus will be described in detail.

Figure 9:
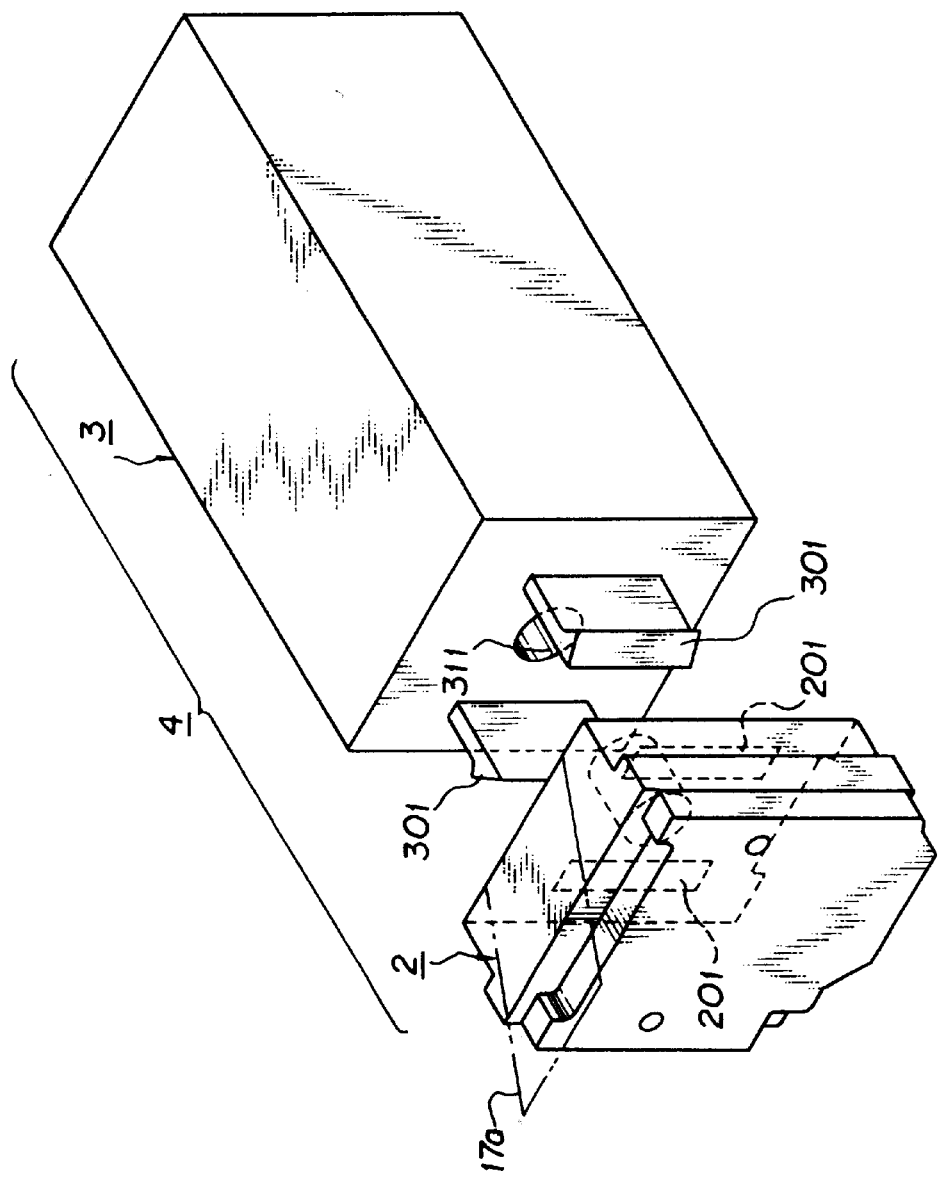
FIG. 9 is a perspective view for explaining connection between the printing head and an ink tank in the head cartridge of the embodiment.

FIG. 9 is a schematic perspective view showing the printing head and ink tank described above.

In FIG. 9, a connection pawl 301 is disposed at the ink tank 3 side and a guide groove 201 is disposed at the recording head 2 side opposing to the connection pawl 301. Reference numeral 17a denotes a head tab for easily performing a taking-out operation when the printing head 2 is taken out of the carrier 1. The ink tank 3 has no guide groove for guiding the ink tank.

Figure 10:
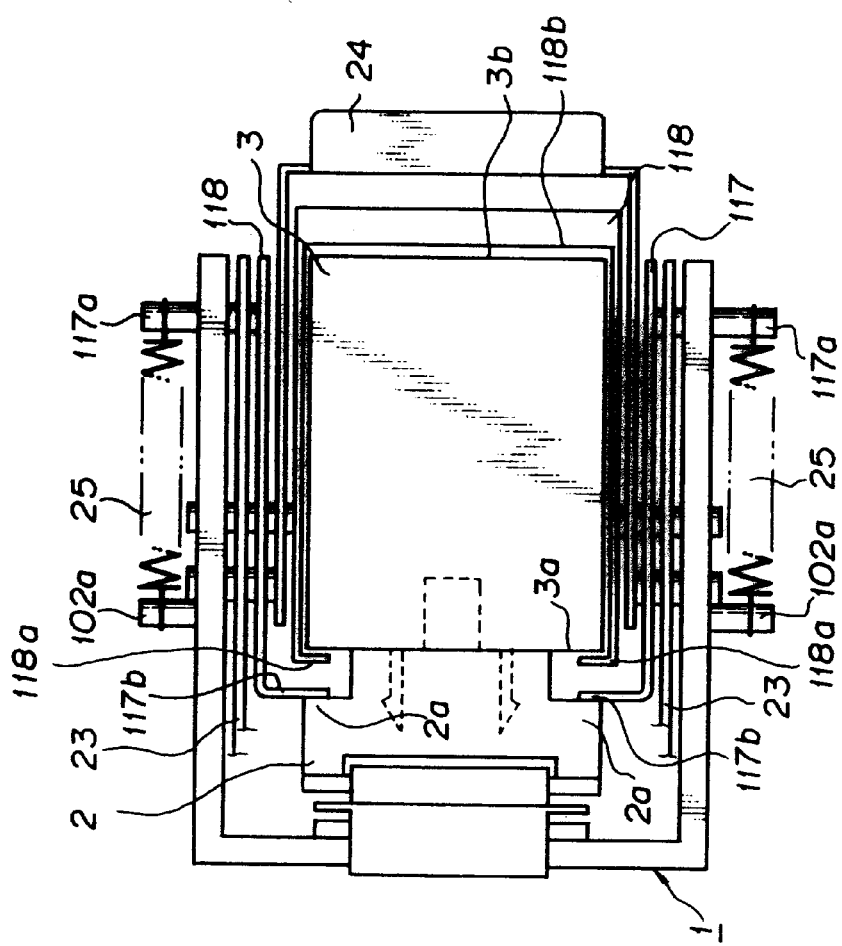
FIG. 10 is a top plan view for explaining connection between the printing head and the ink tank in the head cartridge of the embodiment.

FIG. 10 is a schematic top plan view showing a head cartridge portion and a carrier portion in the case where the printing head and ink tank as shown in FIG. 9 are used.

In FIG. 10, reference numeral 1 denotes the carrier which is provided for holding the printing head 2 and the ink tank 3 and for performing scanning operation therewith as aforementioned, reference numeral 23 denotes a head lever used for performing hold, attachment, or detachment of the printing head 2, reference numeral 24 denotes an ink tank lever used for performing attachment or detachment of the ink tank 3, reference numeral 117 denotes a head holder for exerting pressing force to the printing head 2. A shaft portion 117a of the head holder 117 and a shaft portion 102a of the carrier 1 corresponding thereto are connected with a head pressing spring 25. The pressing force by the head pressing spring 25 is applied to a pressure-receiving portion 2a of the printing head 2 via a pressing portion 117b of the head holder 117. Reference numeral 118 denotes an ink tank holder which acts on the ink tank 3 to shift the position thereof when the ink tank lever 24 is operated. The ink tank holder 118 includes a front end action portion 118a which acts on an end portion 3a of the ink tank 3 located on the printing head 2 side and a rear end action portion 118b which acts on an end portion 3b of the ink tank 3 opposite the printing head 2.

Exchange of the Recording Head

Figure 11:
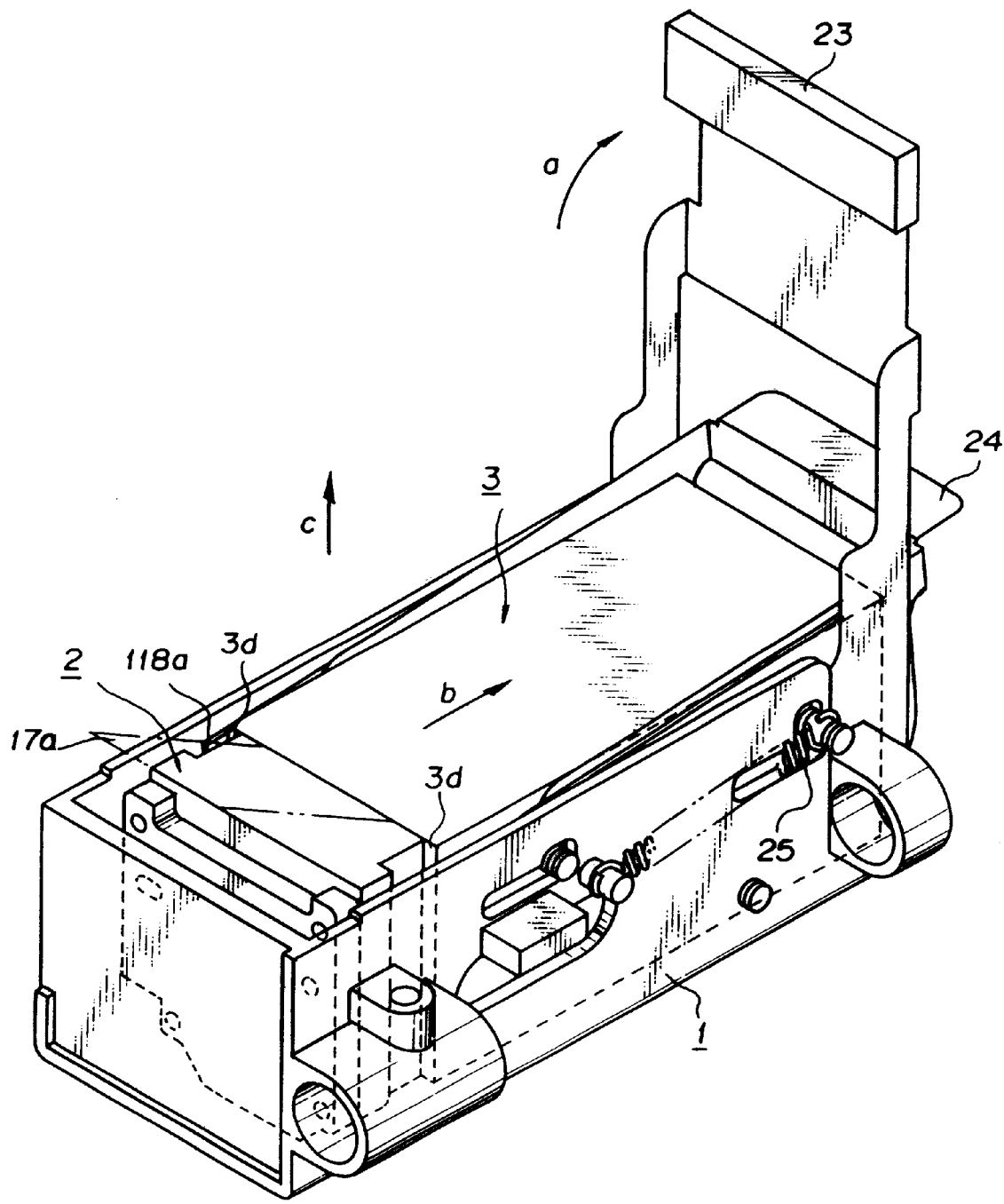
FIG. 11 is a perspective view for explaining attachment and removal of both the printing head and the ink tank.

FIG. 11 is a perspective view illustrating the case that an assembly of the printing head and the ink tank as shown in FIG. 9 is taken out of the carrier 1 as an integrated unit.

In this case, the head lever 23 is turned in the a arrow-marked direction to the position where it stands upright as shown in FIG. 11, so that a cam disposed on the head lever shifts the head holder (not shown) in the b arrow-marked direction in the figure, whereby the pressing force by the head thrusting spring 25 which is applied to the printing head 2 via the head holder and serves to press the recording head 2, is released. The head lever also shifts the ink tank holder 118 in the b arrow-marked in the figure. At this time, since the front end action portion 118a of the ink tank holder 118 is engaged with the end portion 3a of the ink tank 3 located on the printing head 2 side and shifted therewith, the assembly of the printing head 2 and the ink tank 3 is shifted as an integrated unit in the b arrow-marked direction in the figure. In this state, the printing head 2 and the ink tank 3 can be shifted as an integrated unit in the c arrow-marked direction in the figure. At this time, the head tab 17a secured to the printing head 2 is seized with a user's fingers and then it is raised up so that the integrated unit can be taken out of the carrier 1 to assume an off-carrier state. By performing operations with the order reverse to the afore-mentioned operations, the printing head 2 and the ink tank 3 can be connected to and held to the carrier 1.

Exchange of the Ink Tank

Figure 12:
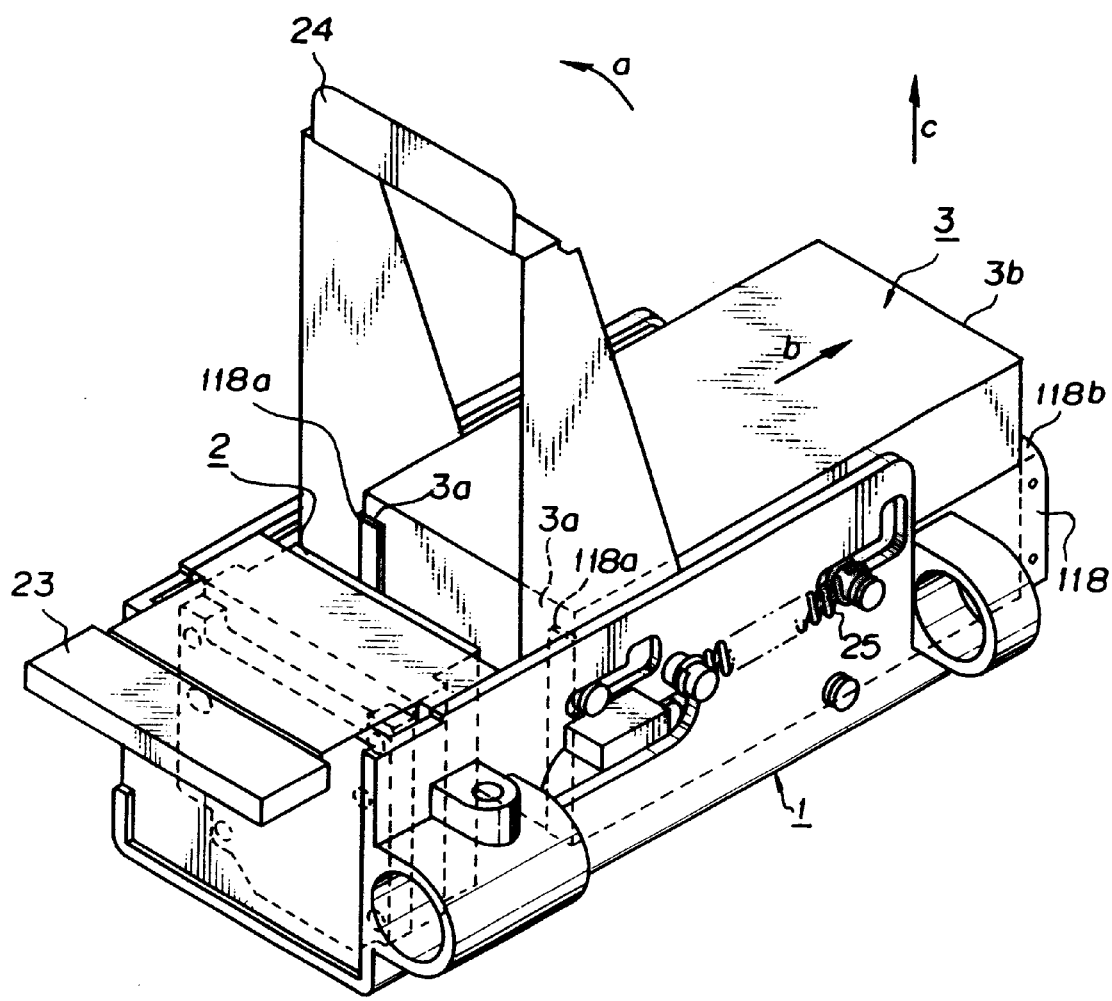
FIG. 12 is a perspective view for explaining attachment, and removal of both the ink tank and the printing head.

FIG. 12 is a perspective view illustrating the case that the printing head 2 and the ink tank 3 as shown in FIG. 9 is disconnected from each other on the carrier 1.

In this case, a cam (not shown) disposed on the tank lever 24 serves for shifting the ink tank holder 118 in the b arrow-marked direction shown in FIG. 12 by turning the ink tank lever 24 in the a arrow-marked direction to reach a predetermined position where it stands upright. However, the head holder 117 is not shifted at all so that the head pressing spring 25 remains in a state pressing the printing head 2. At this time, since the front end action portion 118a of the ink tank holder 118 is engaged with the end portion 3a of the ink tank 3 located on the printing head 2 side and shifted therewith, the engagement state between the ink tank 3 and the printing head 2 is released and thus the ink tank 3 is shifted in the b arrow-marked direction in the figure. In this state, the ink tank 3 can be shifted in the c arrow-marked direction in the figure, whereby the ink tank 3 can be raised up to take out of the carrier 1 and to assume an off-carrier state. On the contrary, in a case where the ink tank 3 is installed to the ink tank holder 118, the cam disposed on the tank lever 24 serves for shifting the ink tank holder 118 in the direction counter to the b arrow-marked direction in FIG. 12 by turning the ink tank lever 24 in the direction counter to the a arrow-marked direction. In this case, since the rear end action portion 118b of the ink tank holder 118 is engaged with the end portion 3b of the ink tank 3 located on the opposite side thereof with respect to the printing head 2 and shifted therewith, the ink tank 3 is shifted in the direction counter to the b arrow-marked direction in the figure to be engaged-state with the printing head 2. By performing the operation described above, the ink tank 3 and the printing head 2 can be connected and held to the carrier 1.

Referring to flowcharts in FIGS. 13 to 26, processing procedure in the above described printer portion 33 or the ink jet printing apparatus will be described below.

Figure 13:
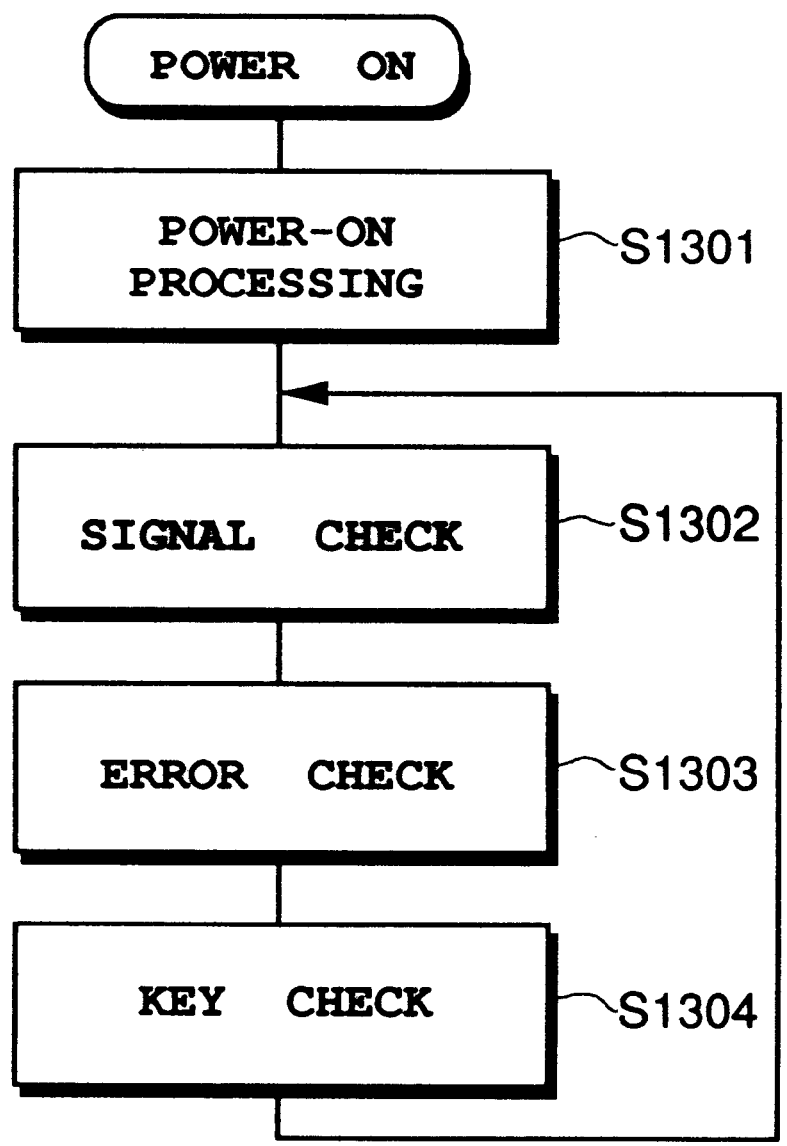
FIG. 13 is a flowchart showing the processing procedure in a printer portion of the embodiment.

FIG. 13 is a flowchart showing the outline of processing procedure executed after the power source of the above described printer portion 33 is turned on.

When the power source is turned on, predetermined "power-on processing" is performed in step S1301. Subsequently, "signal check processing", "error check processing" and "key check processing" are performed in this sequence in steps S1302, S1303 and S1304. While the power source of the printer portion 33 is turned on, these three proceedings are repeated.

Figure 14:
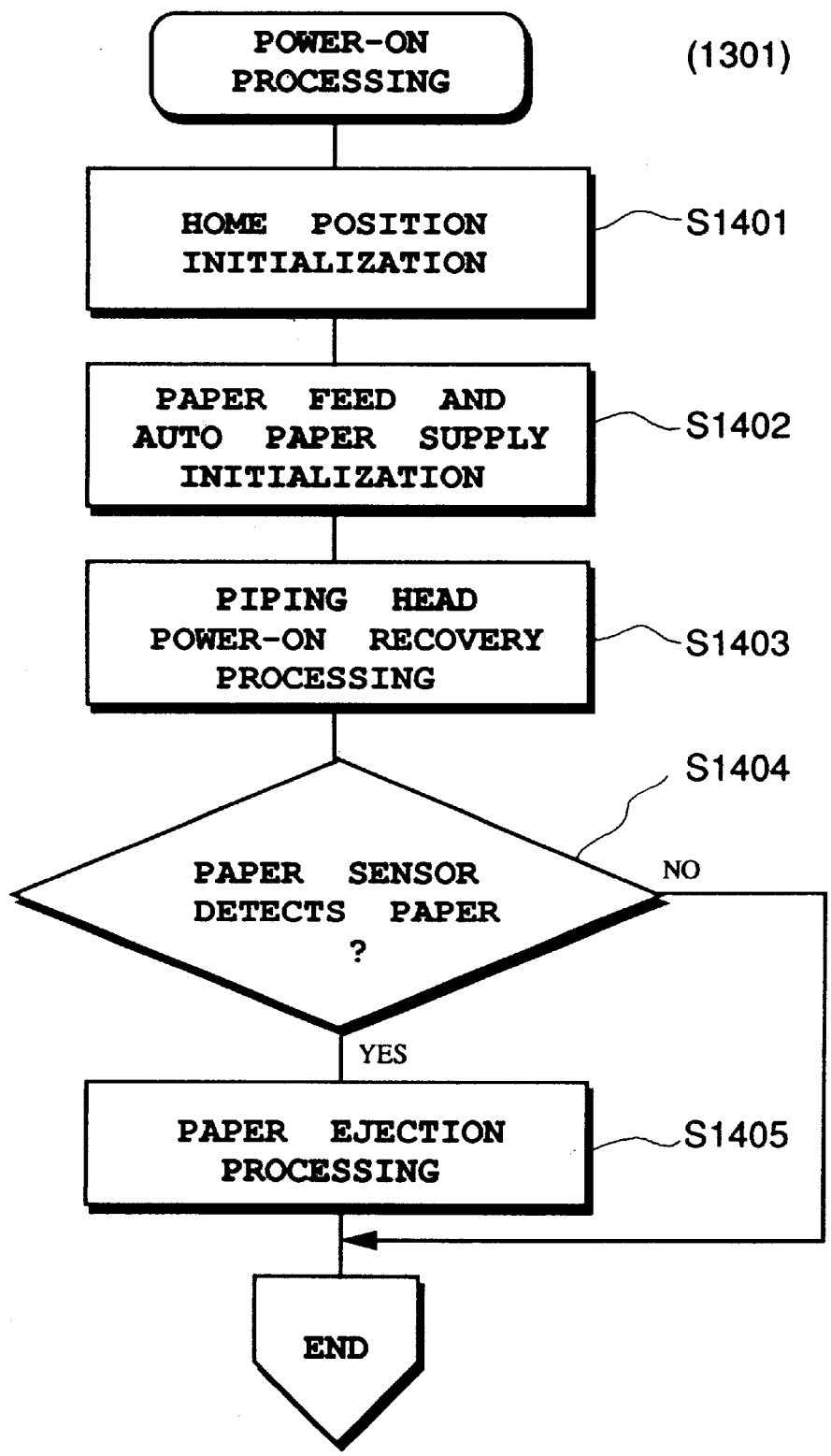
FIG. 14 is a flowchart showing the processing procedure in the printer portion of the embodiment.

FIG. 14 is a flowchart showing the procedure of the above-described "power-on processing".

When this processing procedure is activated, the carrier 1 is moved in step S1401 and the home position is initialized based on a detected signal of the home position sensor 22. Next, paper feed operation, or feed amount data or the like in automatic paper feed operation is initialized in step S1402, and recovery operation processing at power-on time of the printing head is performed in step S1403. In this processing of step S1403, the recording head 2 is moved to a cap position to perform preliminary ejection, and then an orifice-disposed surface of the printing head 2 is wiped while the printing head 2 is moved relative to a blade and the printing head 2 is capped to terminate the ejection recovery operation processing at power-on time.

Next, it is judged whether the paper sensor detects presence of paper or not in step S1404. When the judgment is affirmative, after printing paper remaining in a transport path is ejected, the power-on processing procedure is terminated. Otherwise, the power-on processing procedure is terminated immediately.

Figure 15:
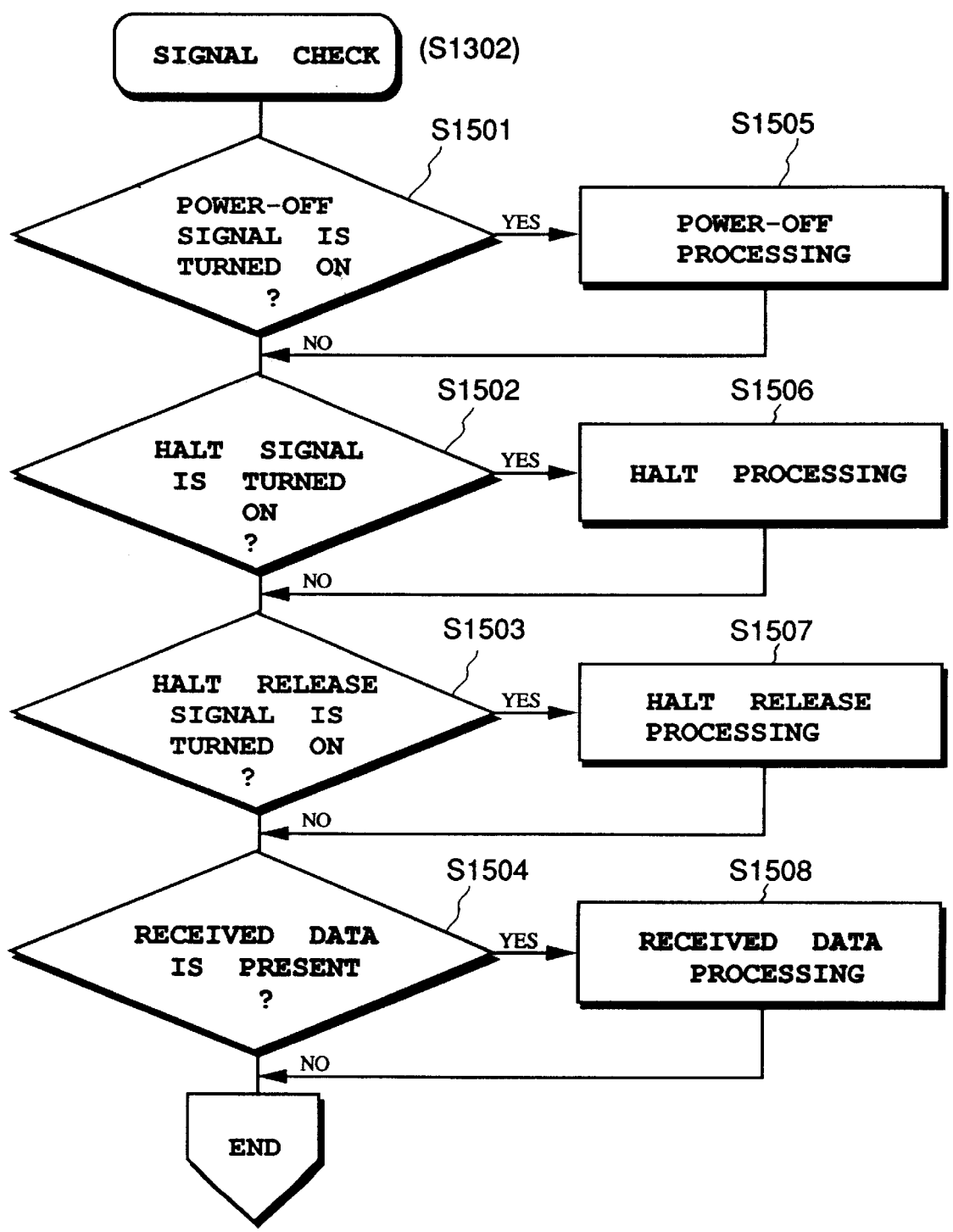
FIG. 15 is a flowchart showing the processing procedure in the printer portion of the embodiment.

FIG. 15 is a flowchart showing the procedure of "signal-check processing" shown in step S1302 of FIG. 13. This processing procedure is provided for monitoring each input signal inputted into the printer portion 33. When any input signal is detected, control is immediately passed to processing corresponding to this detected input signal.

More specifically, a power-off signal of the printing apparatus, a halt signal of a printing operation, a release signal of this halt signal and data received from the host apparatus 50 are monitored in steps S1501, S1502, S1503 and S1504, respectively. When each of these signals or the data is inputted, "power-off processing", "halt processing", "halt release processing" and "received data processing" are performed in steps S1505, S1506, S1507 and S1508, respectively.

Figure 16:
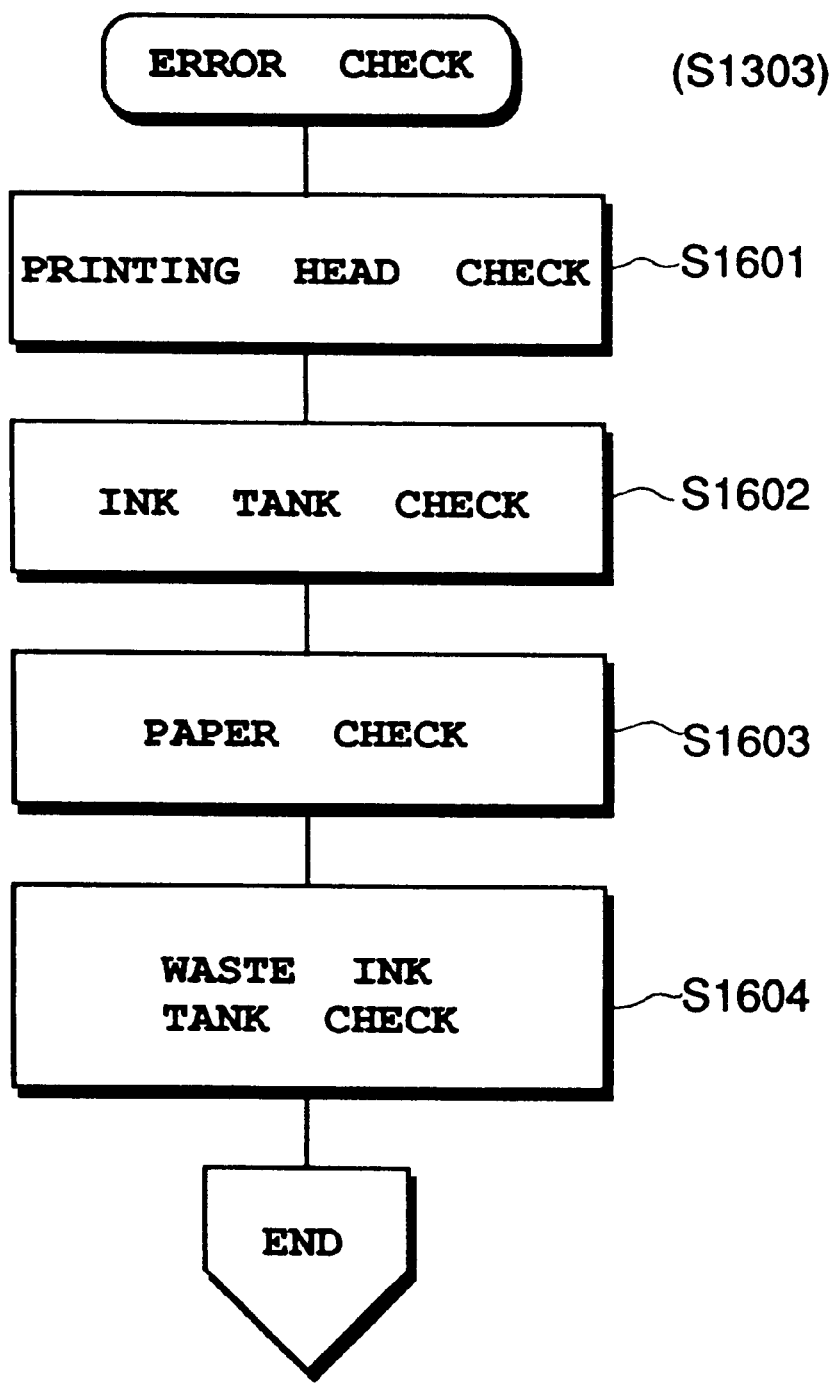
FIG. 16 is a flowchart showing the processing procedure in the printer portion of the embodiment.

FIG. 16 is a flowchart showing the procedure of "error check processing" shown in step S1303 of FIG. 13. In this processing procedure, various checks of the printing head, the ink tank, the recording paper and a waste ink tank are made.

First, the printing head is checked in step S1601. In step S1601, processing is performed such as judging whether the printing head 2 is mounted on the carrier 1 or not and reading data of the kind of printing head and ejection properties is performed. In step S1602, an ink amount remaining in the ink tank, whether to mount the ink tank or not, the kind of ink in the ink tank and the like are checked. Subsequently, it is checked whether printing paper is present or not in step S1603, next, a waste ink amount in the waste ink tank is measured in step S1604 as described later.

Figure 17:
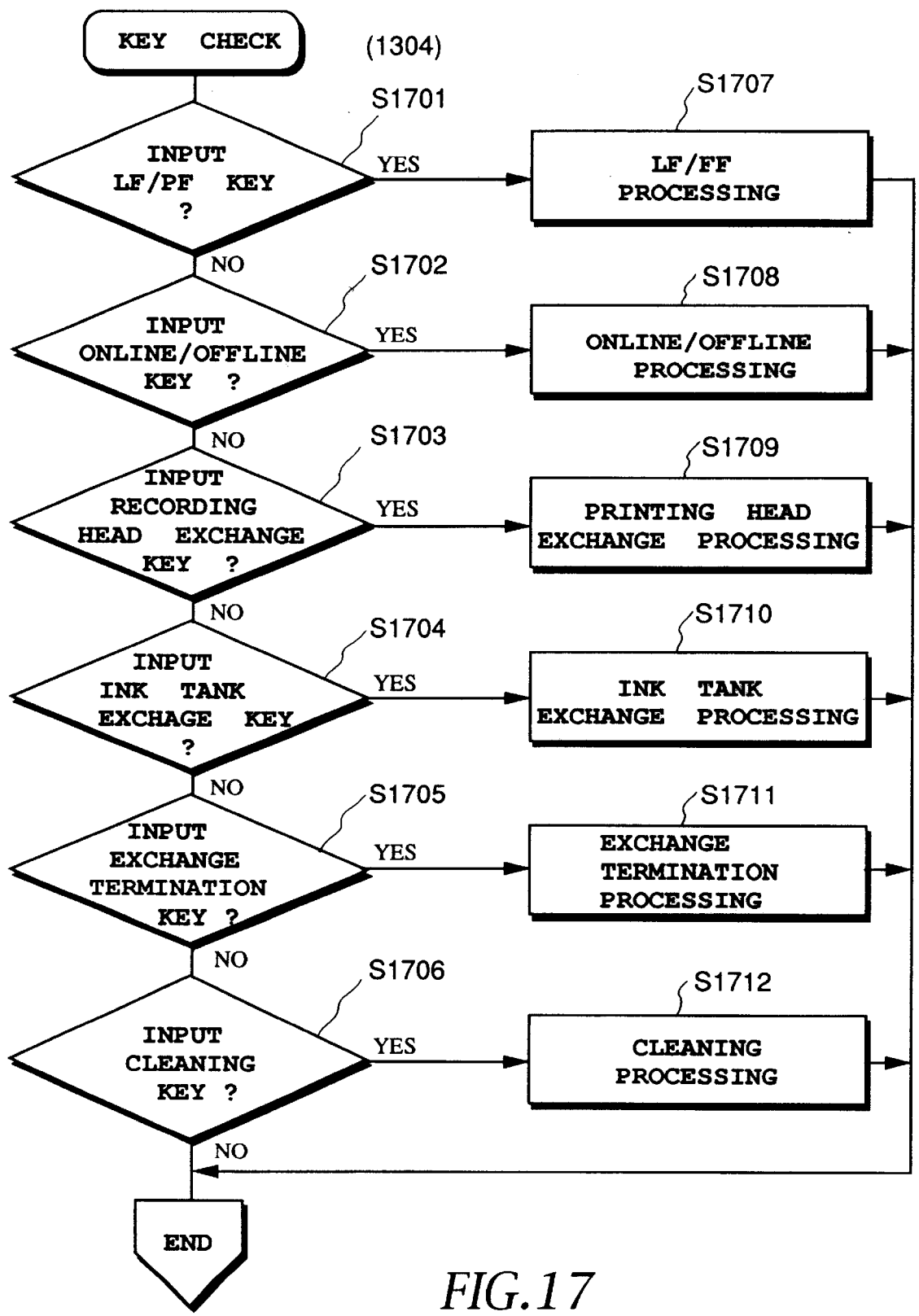
FIG. 17 is a flowchart showing the processing procedure in the printer portion of the embodiment.

FIG. 17 is a flowchart of the procedure of "key check processing" shown in step S1304 of FIG. 13. This processing procedure is processing for monitoring a key input using each of keys 332 to 336 of the printer portion 33. In this processing, when the key input is detected, control is passed to processing corresponding to the key input immediately.

More specifically, in steps S1701, S1702, S1703, S1704, S1705 and S1706, it is monitored whether "LF/FF key" relating to recording paper feed, "ONLINE/OFFLINE key" relating to connection to the host apparatus 50 for receiving data, "RECORDING HEAD EXCHANGE key", "INK TANK EXCHANGE key", "EXCHANGE TERMINATION key" and "CLEANING key" are inputted or not, respectively. When each key input is detected, processing corresponding to each key input is performed in each of steps S1707, S1708, S1709, S1710, S1711 and S1712, respectively.

Figure 18:
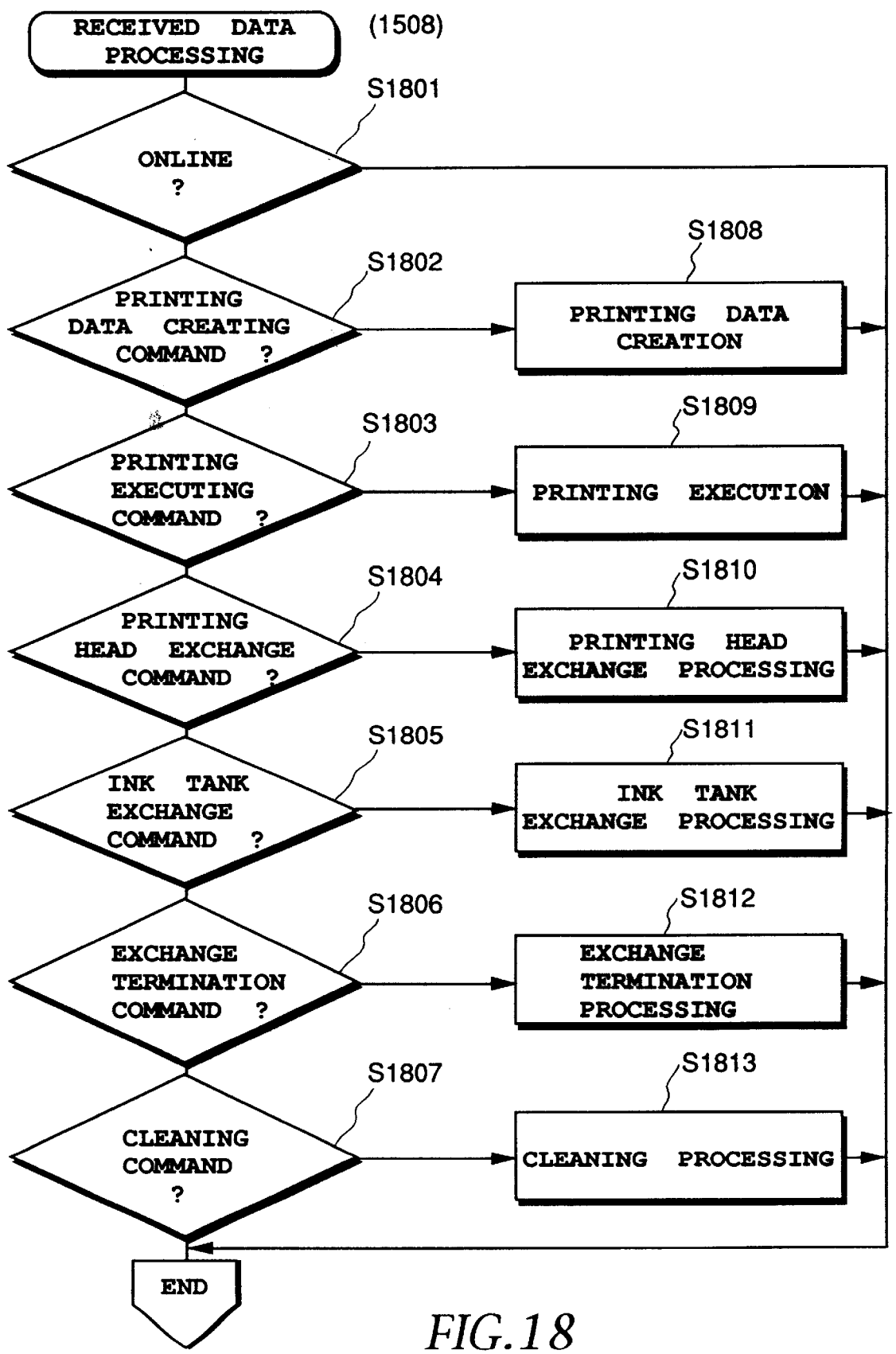
FIG. 18 is a flowchart showing the processing procedure in the printer portion of the embodiment.

FIG. 18 is a flowchart showing the details of "received data processing" (step S1508) in "signal check processing" shown in FIG. 15. The received data processing is started when the printer portion 33 receives predetermined data from the host apparatus 50. For example when the printer portion 33 performs printing, or a user exchanges the printing head by viewing a display screen 351 of the host apparatus 50 as described later and the like, the processing is started.

First, it is judged whether the printer portion 33 is connected to the host apparatus 50 in the online state or not. When the judgment is negative, the received data processing procedure is terminated. When the judgment is affirmative, it is judged whether the currently received data is a command for creating printing data or not in step S1802. When the data is the creating command, data for driving the printing head is created on the basis of printing data transmitted from the host apparatus 50.

When the judgment is negative in step S1802, it is judged whether the received data is a printing executing command or not in step S1803. When the judgment is affirmative, "printing execution processing" is executed in step S1809. When the judgment is negative, it is judged whether the command is a printing head exchange command or not in step S1804. When the judgment is affirmative, "printing head exchange processing" is performed in step S1810 as described later. When the judgment is negative, it is judged whether the currently received data is an ink tank exchange command or not in step S1805. When the judgment is affirmative, "ink tank exchange processing" described later is performed in step S1811. When the judgment is negative in step S1805, it is judged whether the command is a command for exchange termination processing or not in step S1806. When the judgment is affirmative, processing described later is performed in step S1812. When the judgment is negative, it is judged at last whether the command is a command for cleaning or not in step S1807. When the judgment is affirmative, cleaning processing is performed in step S1813. When the judgment is negative, the received data processing procedure is terminated.

Figure 19:
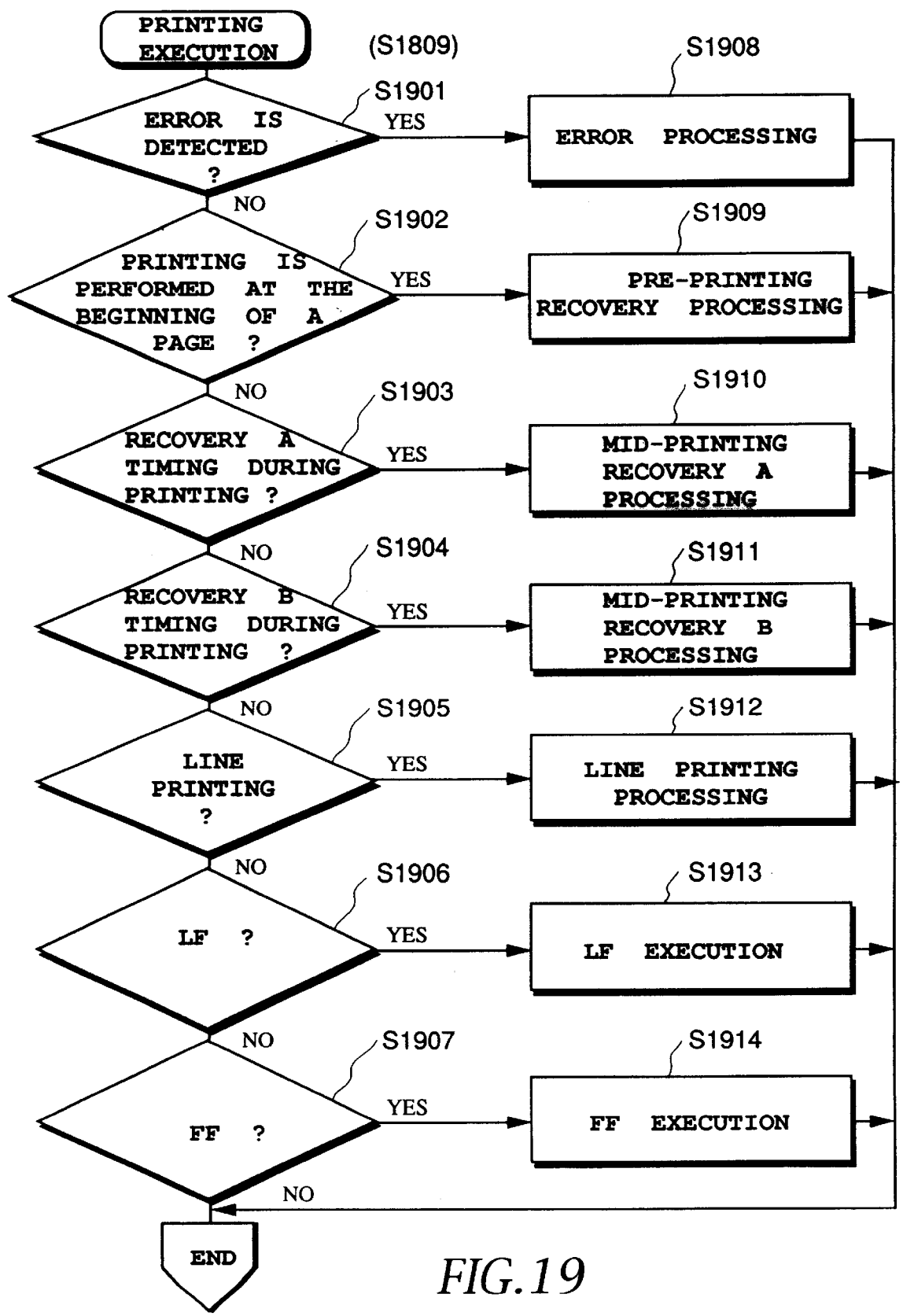
FIG. 19 is a flowchart showing the processing procedure in the printer portion of the embodiment.

FIG. 19 is a flowchart showing the details of "printing execution processing" (step S1809) in "received data processing" shown in FIG. 18.

In "printing execution processing", it is judged whether an error is detected in each processing shown in FIG. 16 or not in step S1901. When the error is detected, predetermined error processing is performed in step S1908. When the error is not detected, it is judged whether printing is performed at the beginning of a page or not in step S1902. When the judgment is affirmative, "pre-printing recovery processing" described later is performed in step S1909. When the judgment is negative, it is judged whether timing is for recovery processing A executed at predetermined constant intervals during printing or not in step S1903. Similarly, it is also judged whether timing is for recovery processing B different from the recovery processing A or not in step S1904. In these judgments, when each of timing A and timing B is judged, respectively, each ejection recovery processing is performed in each of steps S1910 and S1911. In step S1905, it is judged whether the state for printing one line is good or not. When the judgment is affirmative, printing of one line is performed by moving the carrier 1 and ejecting ink from the printing head 2 in step S1911.

In step S1906, it is judged whether the state for feeding paper by a distance corresponding to one line is obtainable after recording of one line has been finished or the like or not. When the judgment is affirmative, paper is fed by the distance corresponding to one line in step S1912. Moreover, it is judged whether the state for discharging paper is obtainable or not after recording of one page has been finished or the like in step S1907. When the judgment is affirmative, paper is discharged in step S1913.

Figure 20:
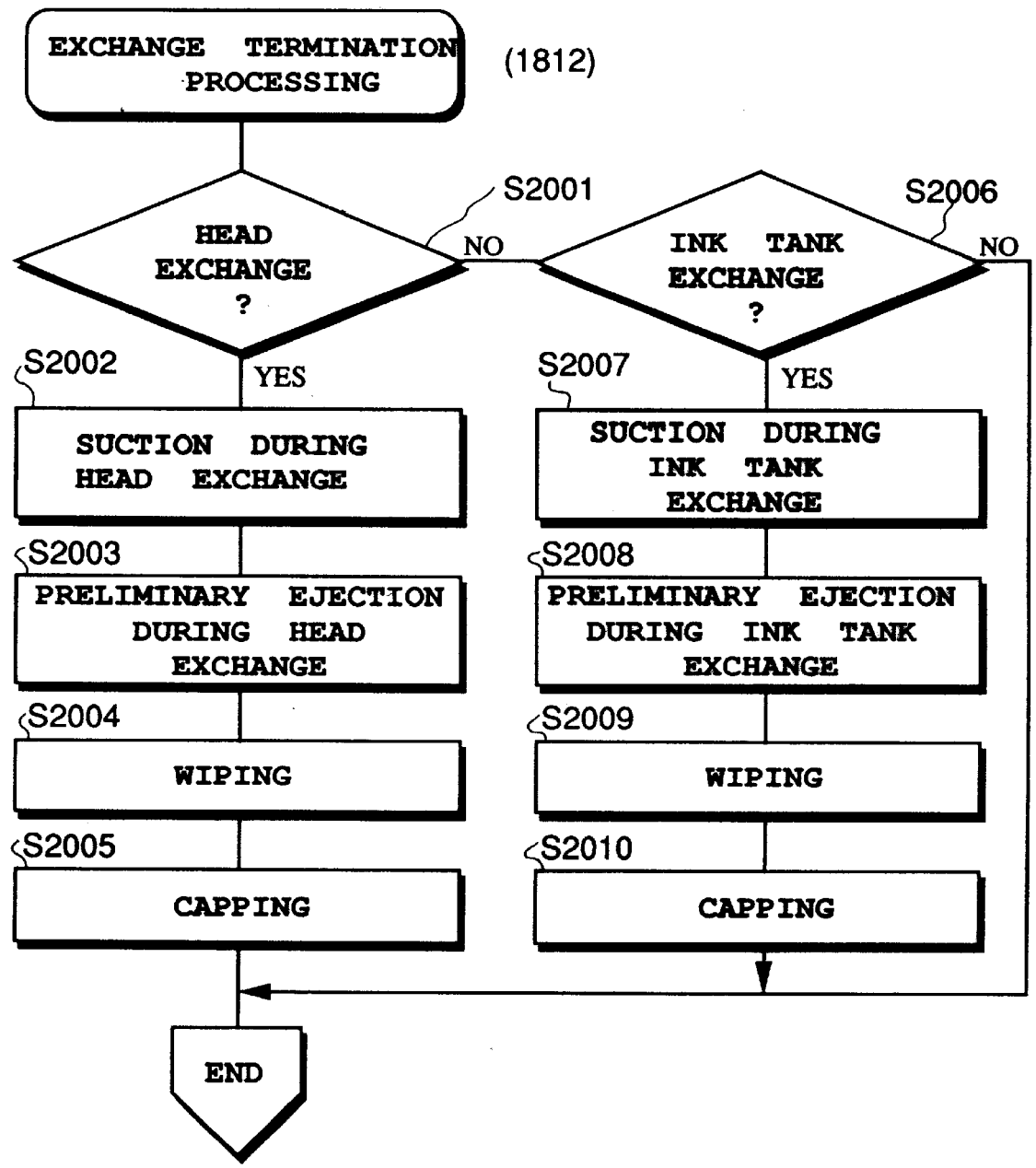
FIG. 20 is a flowchart showing the processing procedure in the printer portion of the embodiment.

FIG. 20 is a flowchart showing the details of "exchange termination processing" (step S1812) in "received data processing" shown in FIG. 18. This exchange termination processing procedure is one of ejection recovery processing procedures for the printing head 2 performed when the printing head 2 or the ink tank 3 is exchanged. It is a main purpose of this exchange termination processing to remove bubbles having entered an ink supplying path etc. from a connection portion at exchanging the recording head 2 or the ink tank 3.

In step S2001, first it is judged whether the printing head is exchanged or not, and whether the printing head is mounted on the basis of flag state or not and whether the waste ink tank overflows or not, further, it is judged the basis of the results of "error check" shown in FIG. 16.

When each judgment is affirmative in step S2001, a sequence of the ejection recovery processing operation is performed in steps S2002 to S2005. That is, suction of the printing head 2 in the capping state by a suction pump is performed in step S2002 and then the cap is released and the preliminary ejection is repeated some times in step S2003. Then, after wiping of the printing head 2 is performed in step S2004, capping thereon is performed in step S2005 to terminate the exchange termination processing.

In step S2006, when it is judged that the ink tank 3 is exchanged, an error check of mounting of the recording head 2 etc. is made similarly to step S2001 and similar ejection recovery processing is performed in steps S2007 to S2010.

But, this ejection recovery processing of steps S2007 to S2010 is lighter than that of steps S2002 to S2005. Namely, the number of repeated frequencies for suction and preliminary ejection is decreased.

Figure 21:
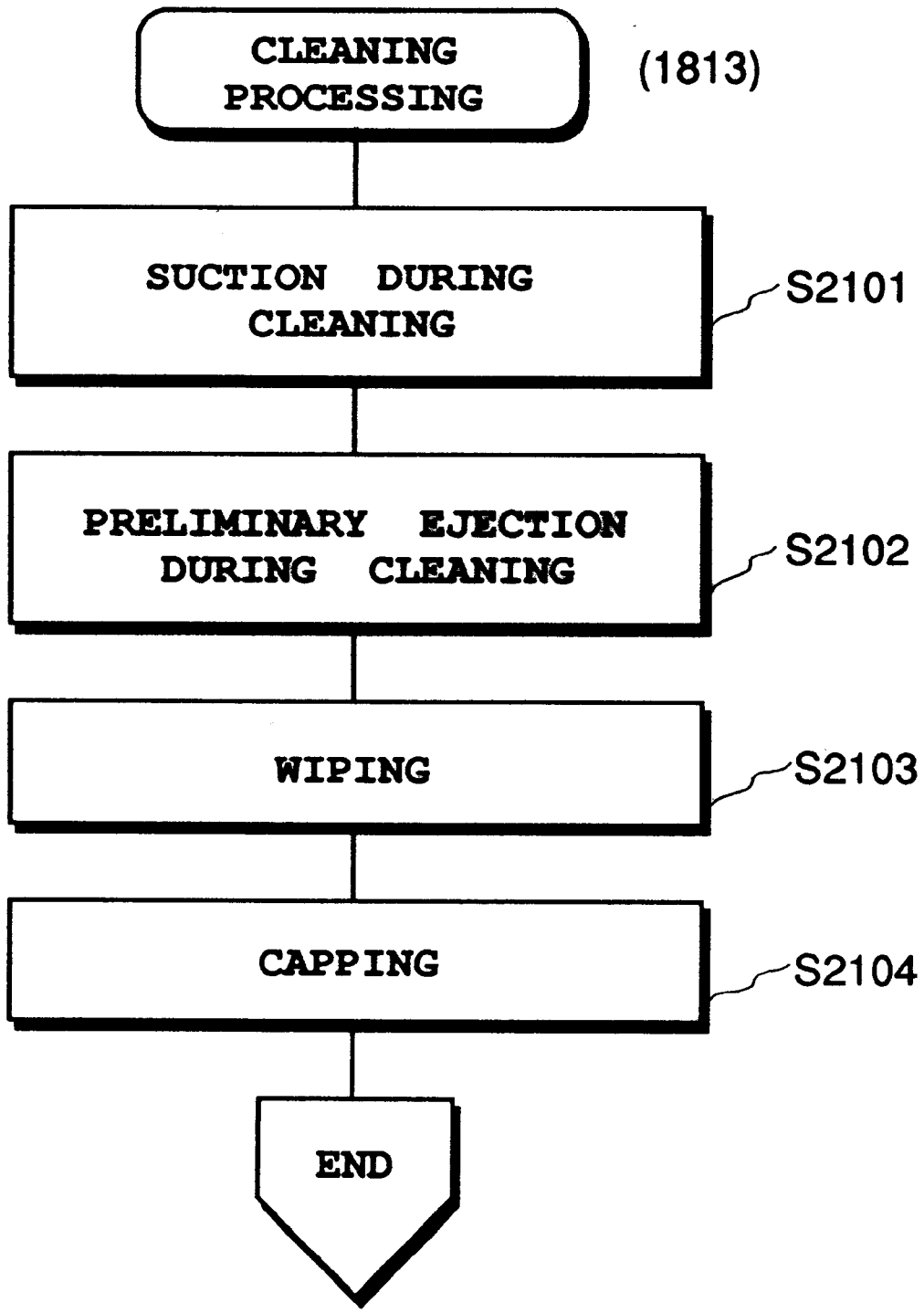
FIG. 21 is a flowchart showing the processing procedure in the printer portion of the embodiment.

FIG. 21 is a flowchart showing the details of "cleaning processing" (step S1813) in "received data processing" shown in FIG. 18.

In the cleaning processing, a sequence of "suction", "preliminary ejection" and "wiping" are also performed in steps S2101 to S2103. Suction and preliminary ejection of the cleaning processing are far smaller in amount than those when the printing head 2 or the ink tank 3 is exchanged in FIG. 20.

Figure 22:
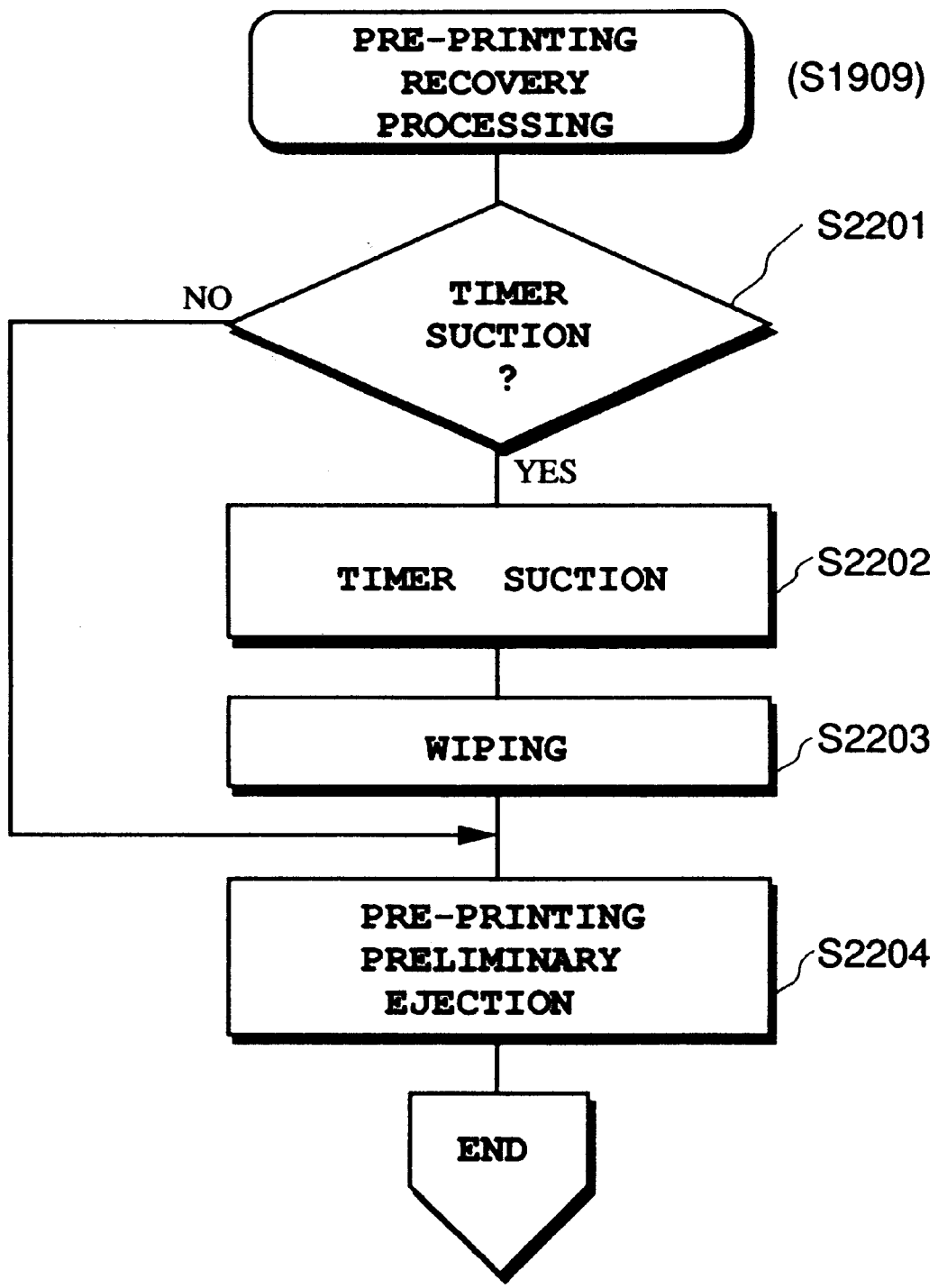
FIG. 22 is a flowchart showing the processing procedure in the printer portion of the embodiment.

FIG. 22 is a flowchart showing the details of "pre-printing recovery processing" (step S1909) in "printing execution processing" shown in FIG. 19. First, in step S2201, it is judged whether three days have passed or not after the previous suction processing (including the suction processing other than that in this pre-printing recovery processing) was executed. When the judgment is affirmative, the suction processing of a predetermined amount is executed in step S2202, and then wiping is executed in step S2203. The reason for the suction operation and wiping operation is that discharge impeding factors described below are removed. When the state continues in which ink is not ejected from the printing head for a long time, ink viscosity may increase or bubbles may enter ink.

When three days have not passed yet or the wiping operation in step S2203 has been finished, pre-printing preliminary discharge is performed in step S2204 to terminate the cleaning processing.

Figure 23:
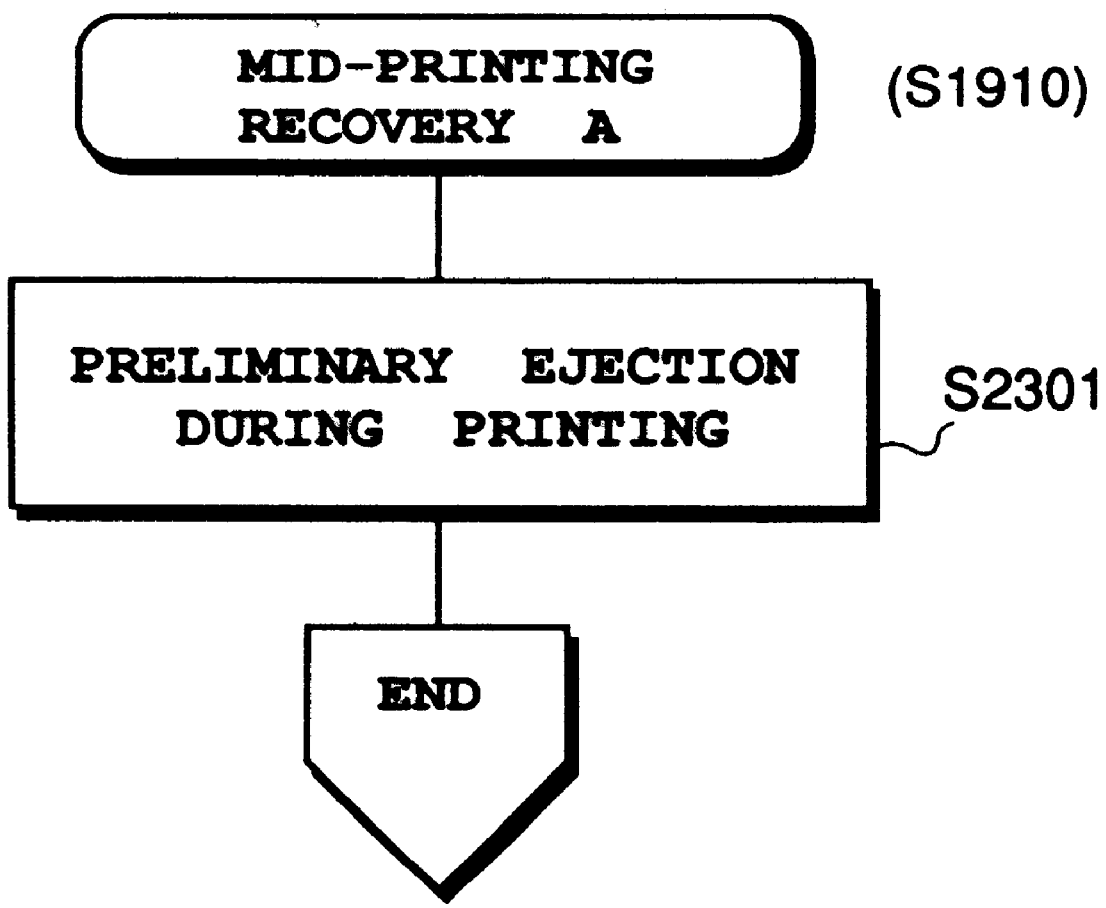
FIG. 23 is a flowchart showing the processing procedure in the printer portion of the embodiment.

FIG. 23 is a flowchart showing "mid-printing recovery A processing" (step S1910) in "printing execution processing" shown in FIG. 19. This processing is started at every 12 seconds after printing is started and relatively lighter preliminary ejection is executed in this processing.

Figure 24:
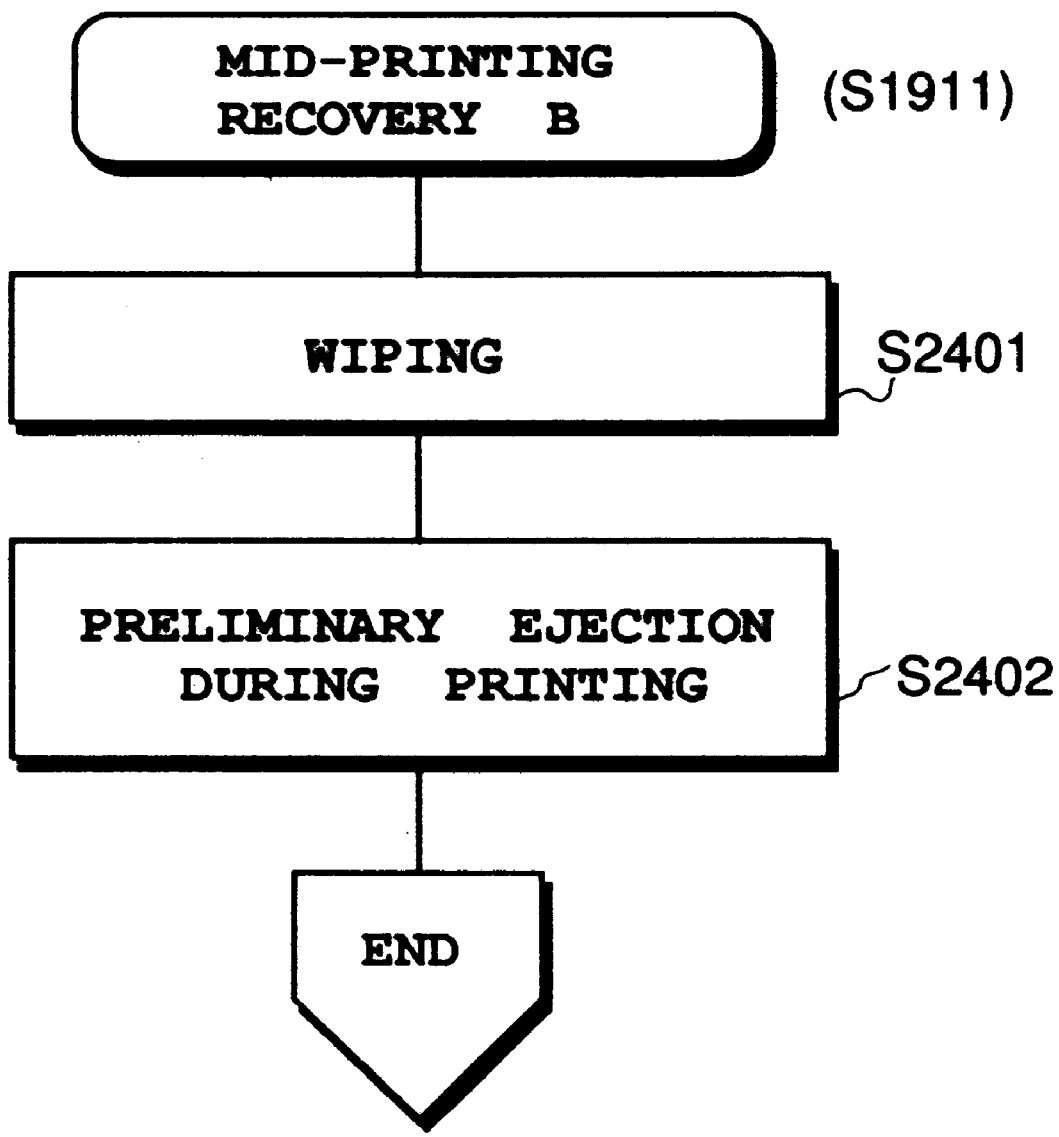
FIG. 24 is a flowchart showing the processing procedure in the printer portion of the embodiment.

Similarly, FIG. 24 is a flowchart showing "mid-printing recovery B processing" (step S1911) shown in FIG. 19.

This processing is started every five times of the preliminary ejection operation in the above "mid-printing recovery A processing". After wiping is executed in step S2401, the preliminary ejection during printing is executed in step S2402.

Figure 25:
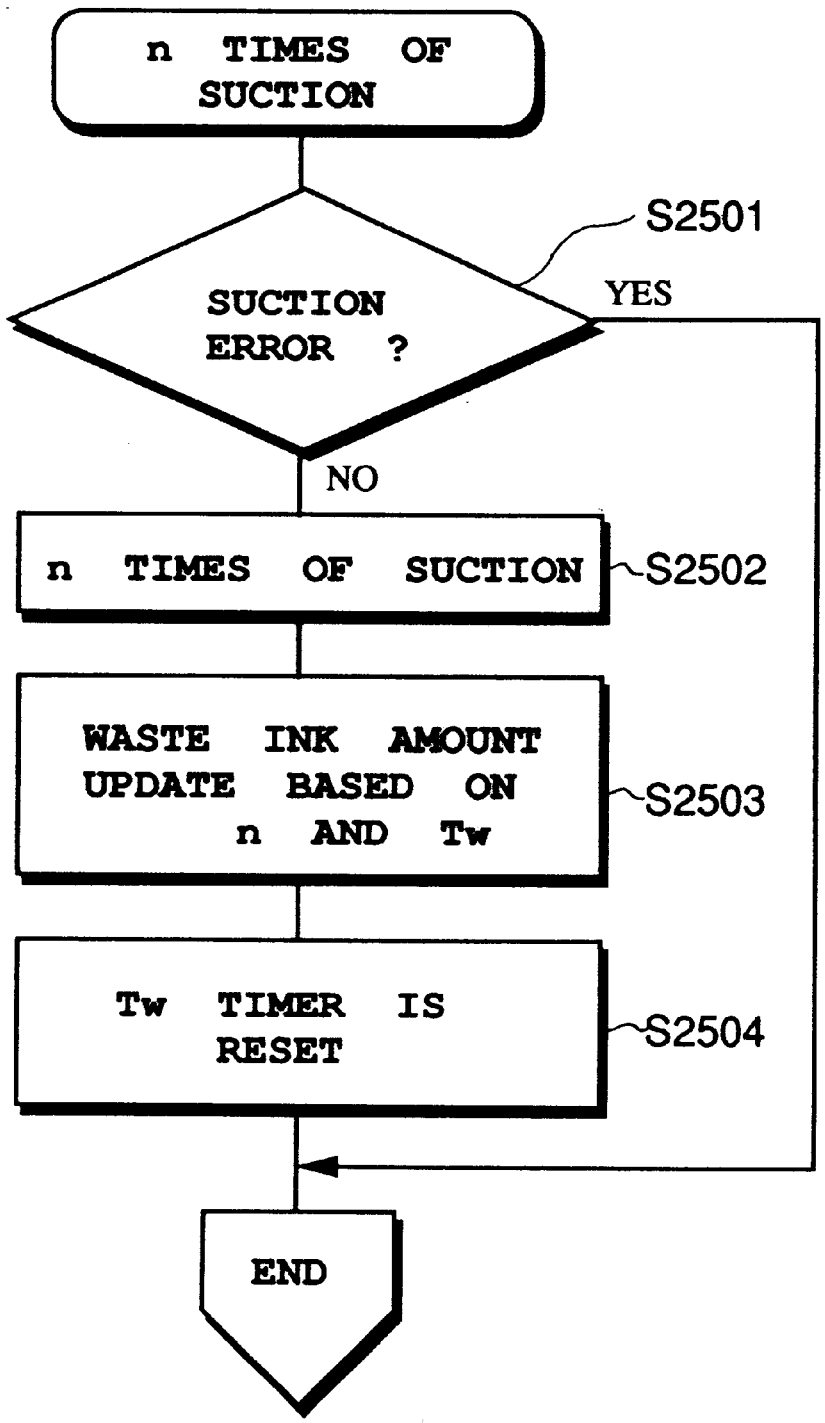
FIG. 25 is a flowchart showing the processing procedure in the printer portion of the embodiment.
Figure 26:
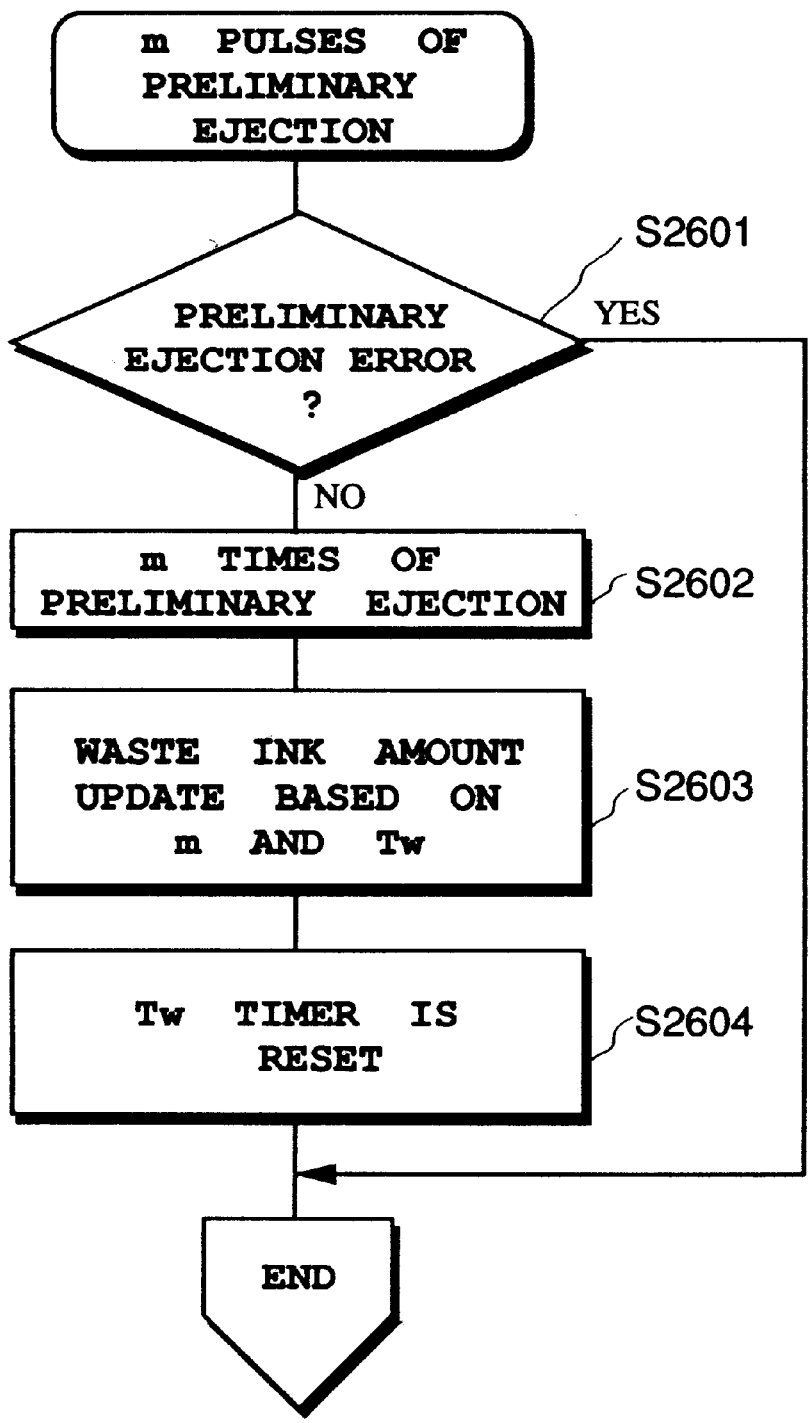
FIG. 26 is a flowchart showing the processing procedure in the printer portion of the embodiment.

FIGS. 25 and 26 are flowcharts showing the detailed procedures of the suction processing and the preliminary ejection processing executed in each processing described above, respectively.

When the suction operation or the preliminary ejection operation is executed, processing is first executed such as judgment in which it is judged whether the printing head is mounted or not on the basis of the error check shown in FIG. 16 in step S2501 or S2601 and then the suction or the preliminary ejection operation is performed for n or m times in steps S2502 or S2602, respectively. Then, as described later, the current waste ink amount stored in the waste ink tank is calculated on the basis of an amount to be discharged from the printing head in the suction processing or the preliminary ejection processing, i.e., it is calculated on the basis of (a suction amount Wpump at each time when a suction pump works)×n or (an ejection amount of one time Wheat)×m, the previously calculated waste ink amount, and the elapsed time Tw passing from the previous calculation time (step S2503 or S2603). The calculation equations will be stated later. The calculated value is used for making an error check of the waste ink tank shown in FIG. 16. Finally, the above elapsed time is reset (step S2504 and S2604) and each processing is terminated.

Moreover, the discharge amount of ink in the suction or preliminary ejection processing can be measured directly with a flow meter or a weighing instrument.

Next, processing in one embodiment of the present invention will be described below. This processing relates to both processings on the printer portion 33 side described above with reference to FIGS. 13 to 26 and processing on the host portion 50 side. This processing enables a user of the information processing apparatus of the embodiment to perform an operation such as printing head exchange operation of the printer portion while the user views displayed information on a display screen 351.

Figure 27B:
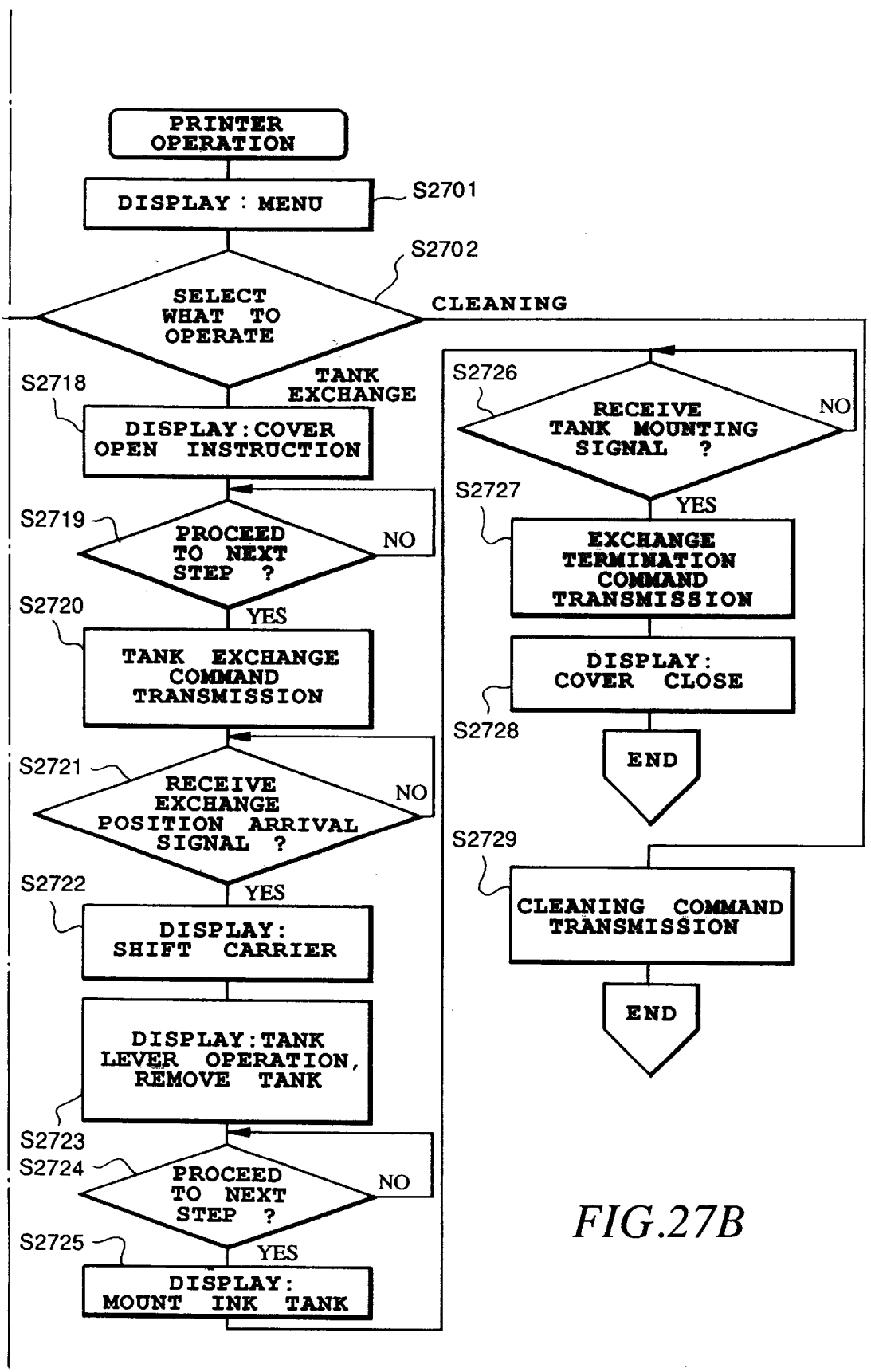
Figure 28:
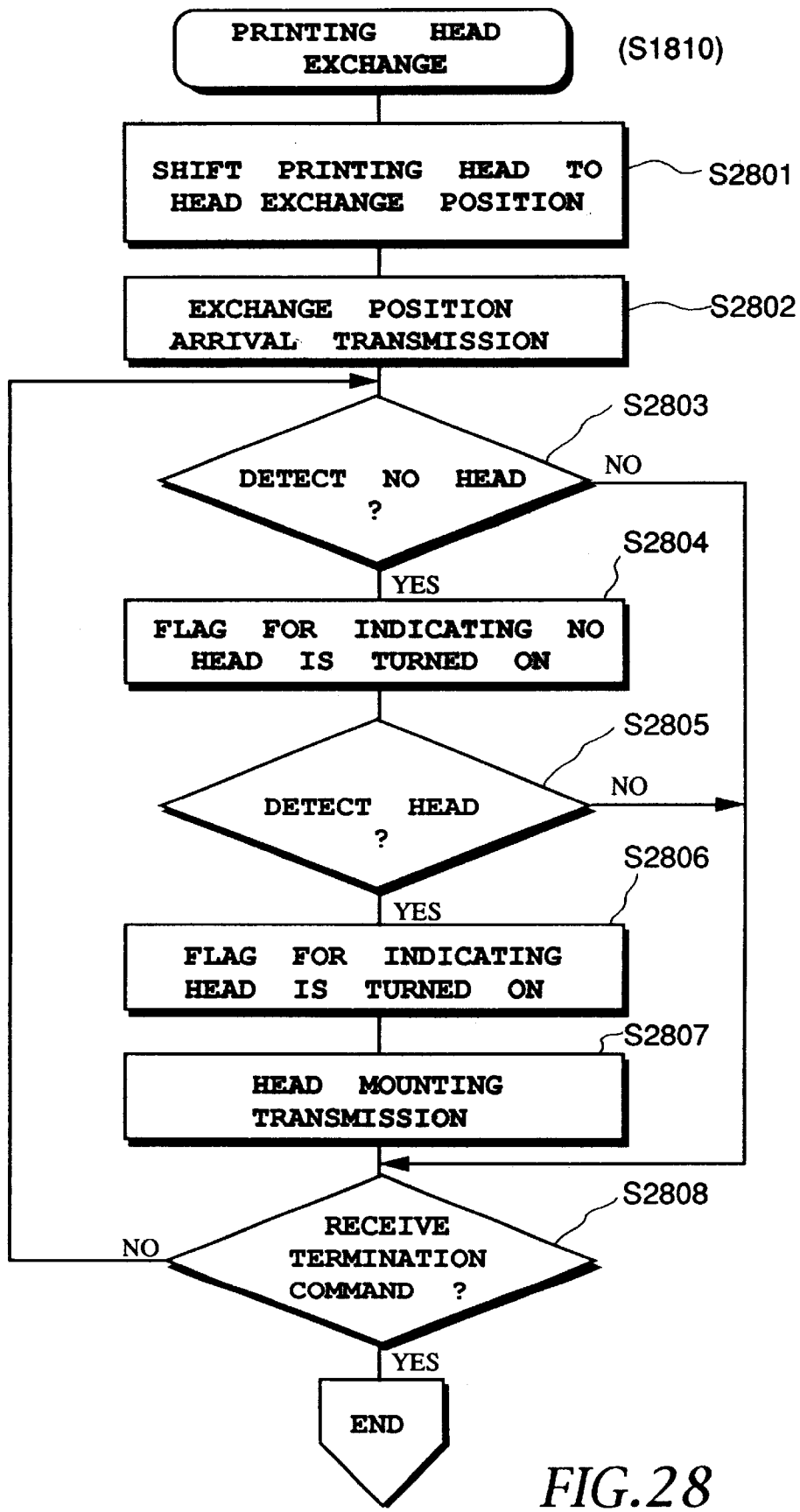
FIG. 28 is a flowchart showing the processing procedure in the printer portion in the printer operation processing.
Figure 29:
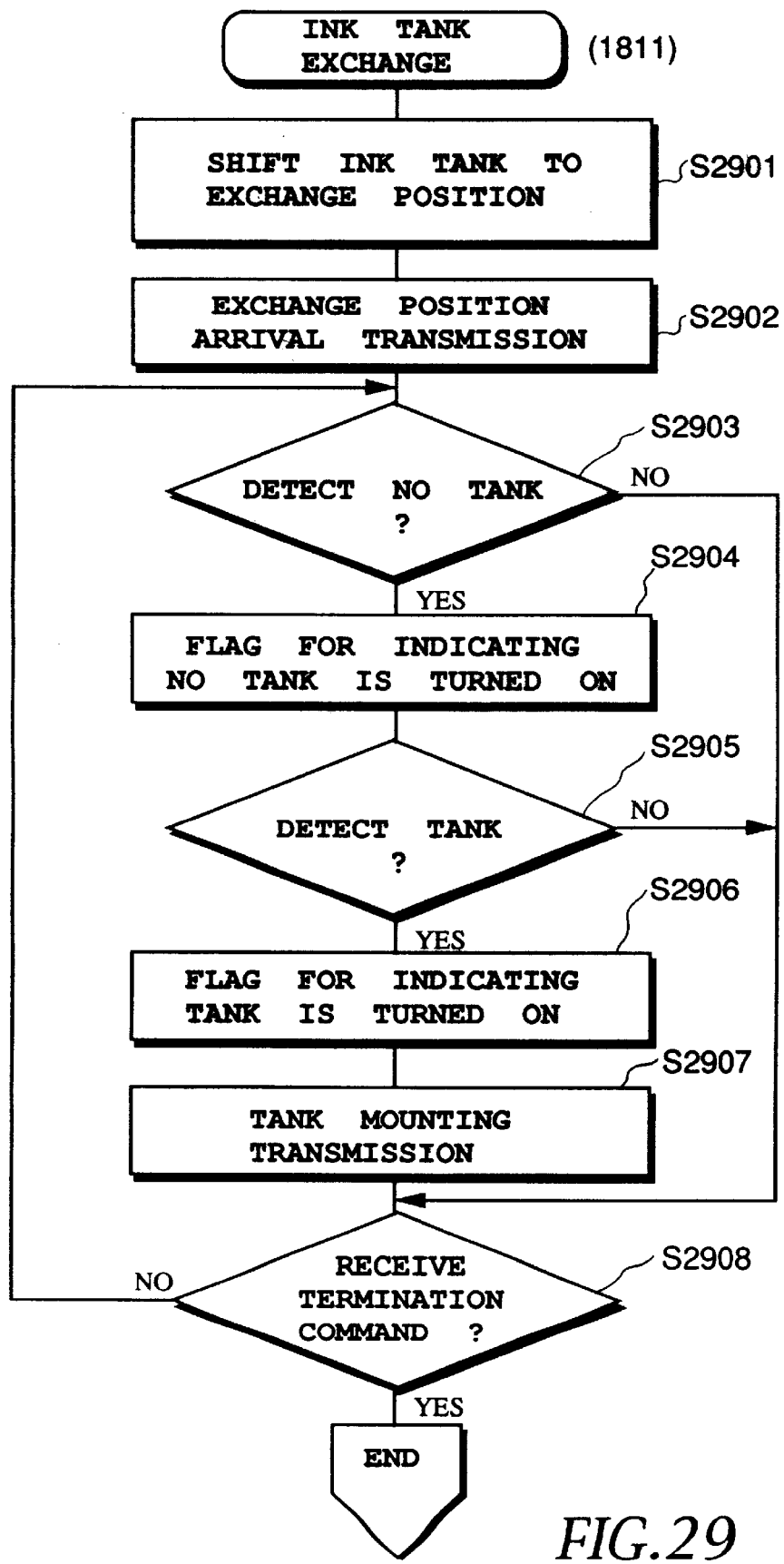
FIG. 29 is a flowchart showing the processing procedure in the printer portion in the printer operation processing.

FIG. 27 is a flowchart showing a processing procedure executed in the host portion 50 and FIGS. 28 and 29 are flowcharts showing processing procedures executed in the printer portion 33 corresponding to the above-stated processing procedure executed in the host portion 50. Additionally, the processing procedures of the printer portion 33 shown in FIGS. 28 and 29 are identified with the "recording head exchange processing" (step S1810) and the "ink tank exchange processing" (step S1811) in "received data processing" shown in FIG. 18, respectively.

When a user of the present information processing apparatus selects an application program of "printer operation", processing of the host portion 50 shown in FIG. 27 is started and an operation menu is displayed in step S2701. While viewing this operation menu, the user selects a desired operation by a predetermined key on a keyboard 51, a mouse or the like. This selection is judged in step S2702. For example, when it is judged that printing head exchange is selected, control goes to processing of step S2703.

Figure 30:
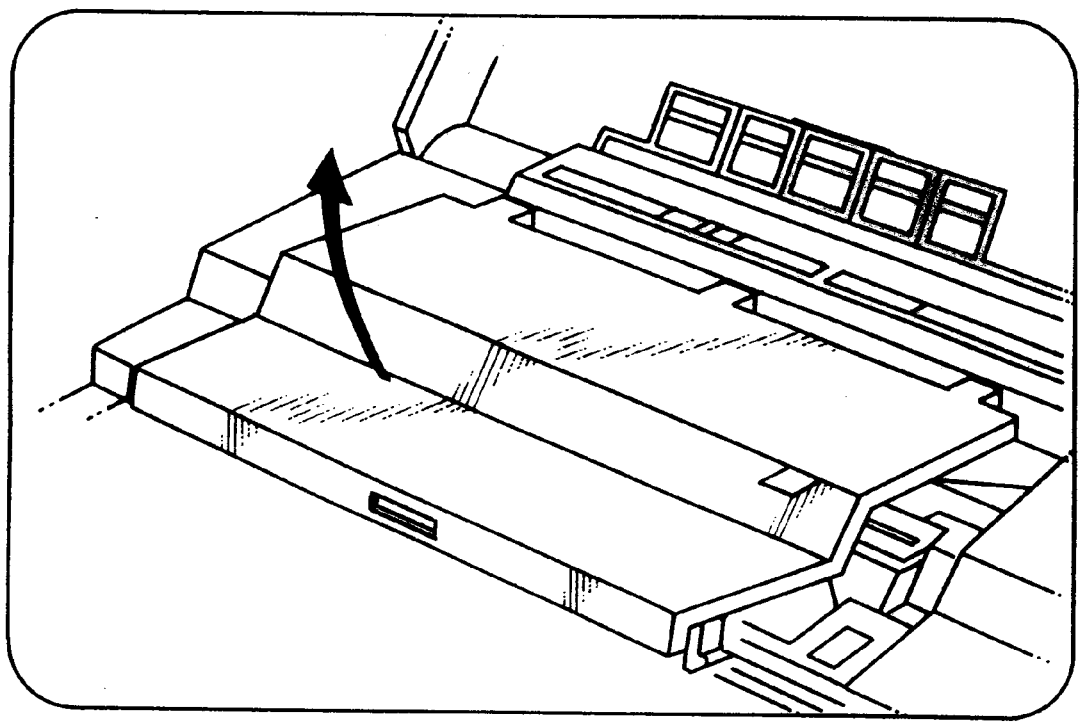
FIG. 30 is a view illustrating an example of a display in the printer operation processing.

In step S2703, for example, there is displayed an instruction such that a cover 331 (window) should be opened as shown in FIG. 30. Then, the user opens the cover 331 according to this instruction, and next, inputs indication that this operation is terminated by keys or the like. In the host portion 50, the input by the user, that is, the termination of the operation is judged in step S2704 and control goes to the next processing. In step S2705, the printing head exchange command is transmitted to the printer portion 33.

In the printer portion 33, this command is received, printing head exchange processing shown in FIG. 28 (step S1810 of FIG. 18) is started and the carrier 1 is moved so as to shift the recording head 2 to a position at which the printing head 2 is exchanged (step S2801). When the carrier 1 arrives at the exchange position, a signal that the carrier 1 arrives at the exchange position is transmitted to the host portion 50 (step S2802).

In the host portion 50, when this signal is detected in step S2706, there is displayed indication that the carrier 1 arrives at the exchange position (step S2707). Next, there is displayed an instruction that the printing head 2 should be removed by handling a head lever 23 (step S2708). When the user removes the printing head according to this instruction and inputs the termination of the printing head 2 removal by a predetermined key etc., the host portion 50 judges the termination (step S2709) and displays an instruction that the printing head 2 should be mounted (step S2710).

In the meantime, in the printer portion 33, printing head absence is detected due to removing of the printing head 2 (step S2803), then a flag for indicating no printing head is turned on (step S2804). When this flag remains to be turned off, for example, in step S2007 of "exchange termination processing" shown in FIG. 20 the printing head absence is judged and recovery processing is bypassed. When a flag for indicating no ink tank is turned on in processing shown in FIG. 29, the recovery processing is also bypassed.

When the recording head 2 is mounted by the user, the printing head 2 presence is detected in step S2805, a flag for indicating a printing head presence is turned on and a signal indicating that the printing head is mounted is transmitted to the host portion 50 (steps S2806 and S2807).

When the signal indicating that the printing head is mounted is received in the host portion 50 (step S2711), there is displayed an instruction that a head holder attached to the printing head 2 is removed and then displayed an instruction that the ink tank should be mounted. When the user manipulates operations according to the above instructions and inputs the fact indicating that these operations have been finished, the host portion 50 transmits the exchange termination command to the printer portion 33 (steps S2712, S2713, S2714, S2716). Subsequently, there is displayed an instruction that the cover should be closed. Thus, the recording head exchange processing of the host portion 50 is terminated. In addition, step S2711 may be omitted and the fact that the printing head is mounted may be confirmed in the next step following step S2712, which also causes the similar effect.

When the exchange termination command is transmitted from the host portion 50, the recording head exchange processing is terminated (step S2808) in the printer portion 33, and there is started the exchange termination processing as shown in step S1812 in FIG. 18 (the details are shown in FIG. 20).

In FIG. 27, when it is judged that the ink tank 3 exchange operation is selected in step S2702 in processing of the host portion 50, processing of steps S2718 to S2728 similar to the above processing is executed, and in the printer portion 33, processing corresponding to the above processing shown in FIG. 29 is executed. Because this processing is similar to the printing head exchange processing explained already referring to FIGS. 27 and 28, the explanation will be omitted.

When judging that a cleaning operation of the printing head 2 is selected in step S2702, the host portion 50 transmits the cleaning command in step S2729 to terminate the printer operation processing procedure.

In the printer portion 33, "cleaning processing" of step S1813 in FIG. 18 (the details are shown in FIG. 21) is started in response to the above-stated cleaning command.

Moreover, in "printer operation processing" described above, presence or absence (mount or un-mount) of the printing head or the ink tank is mostly detected by sensors. However, it is possible to judge the presence or absence from the normal time necessary for user's key input or operation.

Figure 31B:
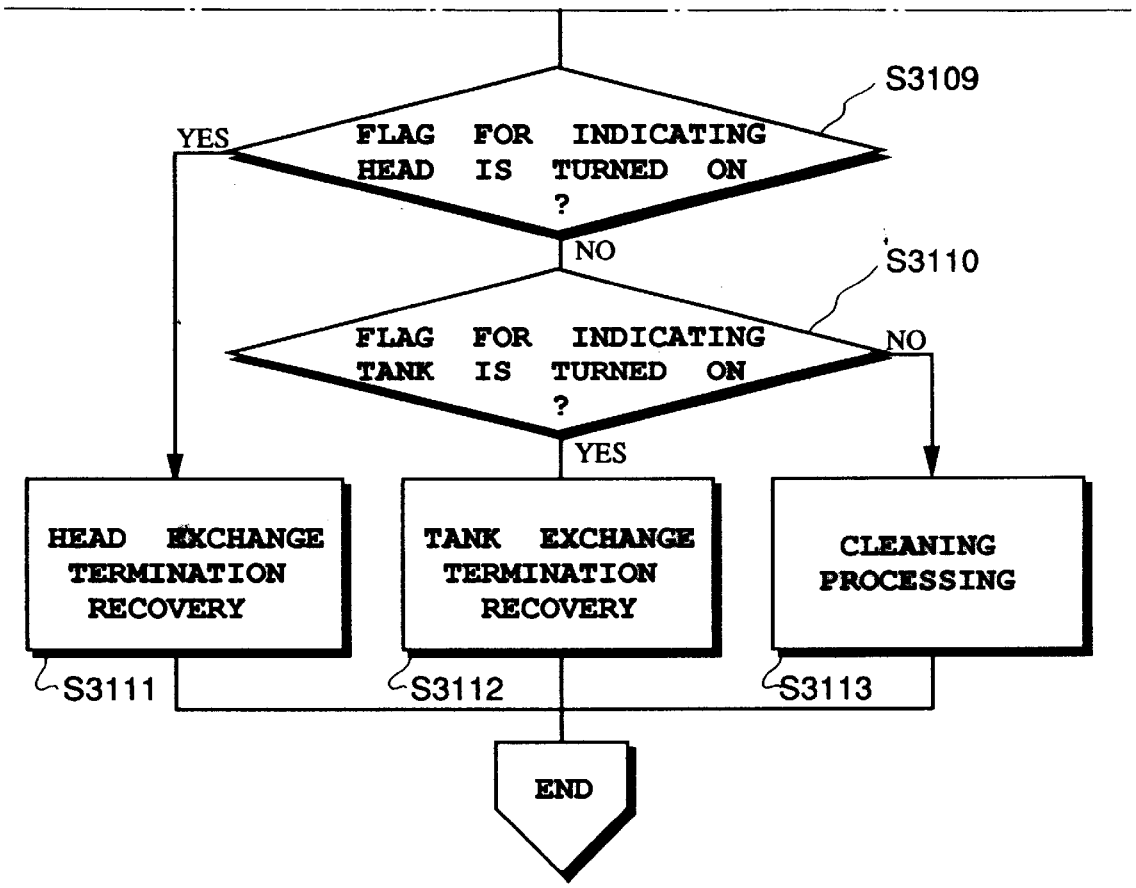

FIG. 31 is a flowchart showing exchange and ejection recovery processing which are executed by the printer portion 33 itself independently of the host portion 50. Namely, the exchange and the ejection recovery processing are started by manipulating keys 332 to 336 provided on the printer portion 33 by the user.

When this processing is started, the carrier 1 is shifted to the exchange position in step S3101 and processing of steps S3102 to S3105 is executed in this sequence with the printing head exchange operation by the user. Moreover, in step S3106, when it is judged that the predetermined time has elapsed after the processing was started, it is assumed that the ink tank has been exchanged and the flag for indicating presence of the ink tank is turned on (step S3107).

When it is judged that the user inputs a termination key (step S3108), any one of printing head termination recovery processing (step S3111), ink tank exchange termination recovery processing (step S3112) and cleaning processing (step S3113) is executed according to turning on/off of both the flags for indicating presence of the printing head and the flag for indicating presence of the ink tank. The processing of steps S3111 and S3112 corresponds to "exchange termination processing" (step S1711) shown in FIG. 17 and the processing of step S3113 corresponds to "cleaning processing" (step S1712) in FIG. 17.

Next, a waste ink tank of one embodiment according to the present invention will be described. The waste ink tank of the embodiment makes it possible to prevent overflow etc. in spite of its smaller capacity by controlling an ink amount held in the waste ink tank more precisely than in conventional waste ink tanks.

In one of conventional controlling methods of the waste ink tank, only ink amount discharged from the printing head in recovery processing is measured and waste ink evaporation is not taken into account. This necessitates a storage portion having a capacity larger than a necessary capacity actually. Moreover, as another controlling method, there is a structure in which a discharged ink amount is measured and constant-rate evaporation is assumed. With this method, in the case that recovery processing is repeated at a relatively short time interval, overflow may occur. As still another controlling method, there is a structure in which an ink amount stored in the waste ink tank is known by detecting a change in the waste ink tank weight. However, this structure can not cope with a change in an attitude of the waste ink tank taken according to a printer-installed location etc. Moreover, problems such as the increased fabrication cost and a disadvantage of miniaturization of the waste ink tank occur. The control of the waste ink tank according to the present invention can solve these problems of conventional structures.

Figure 32:
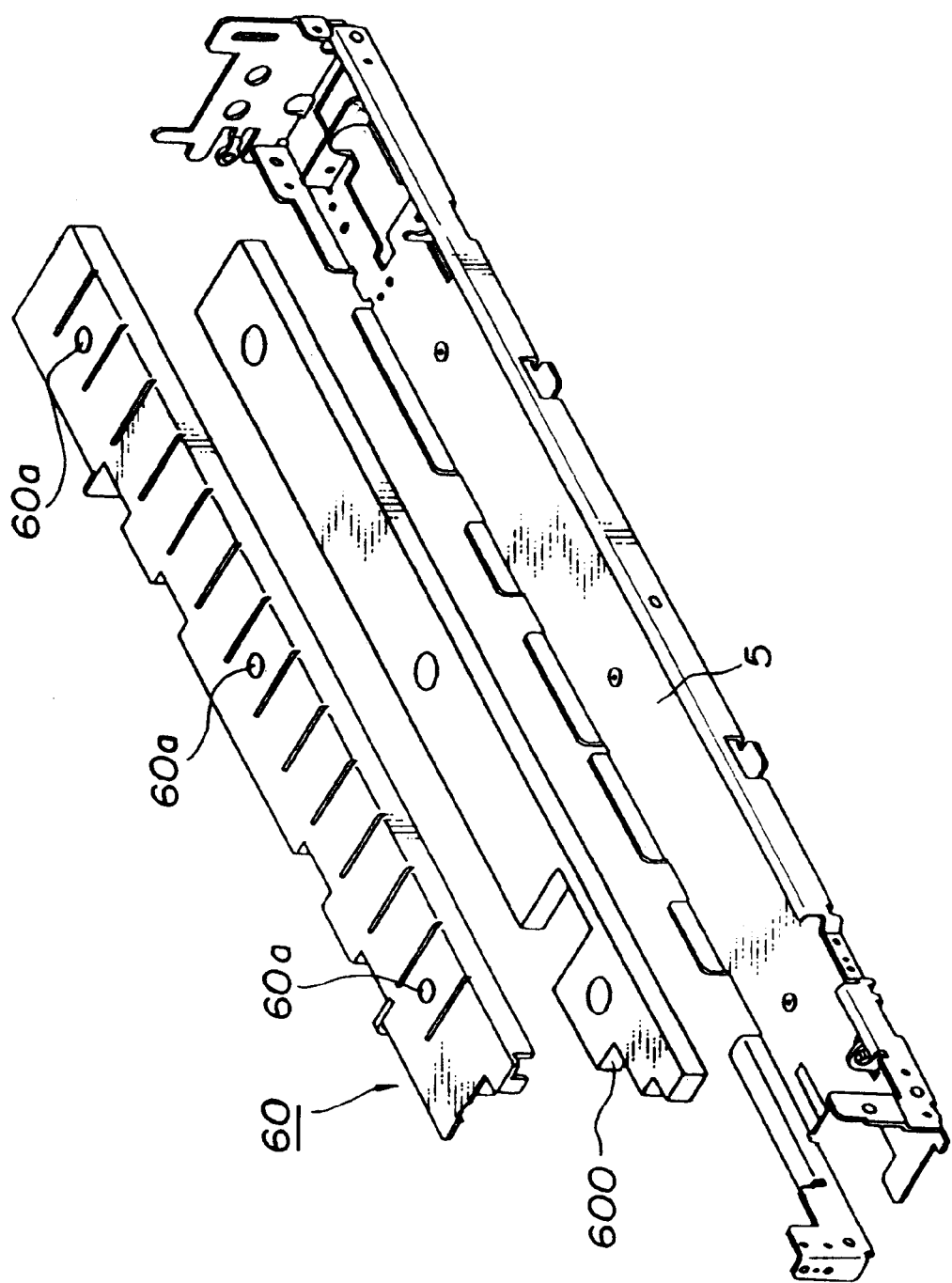
FIG. 32 is an exploded perspective view for explaining mounting of an waste ink absorber of the embodiment.
Figure 33:
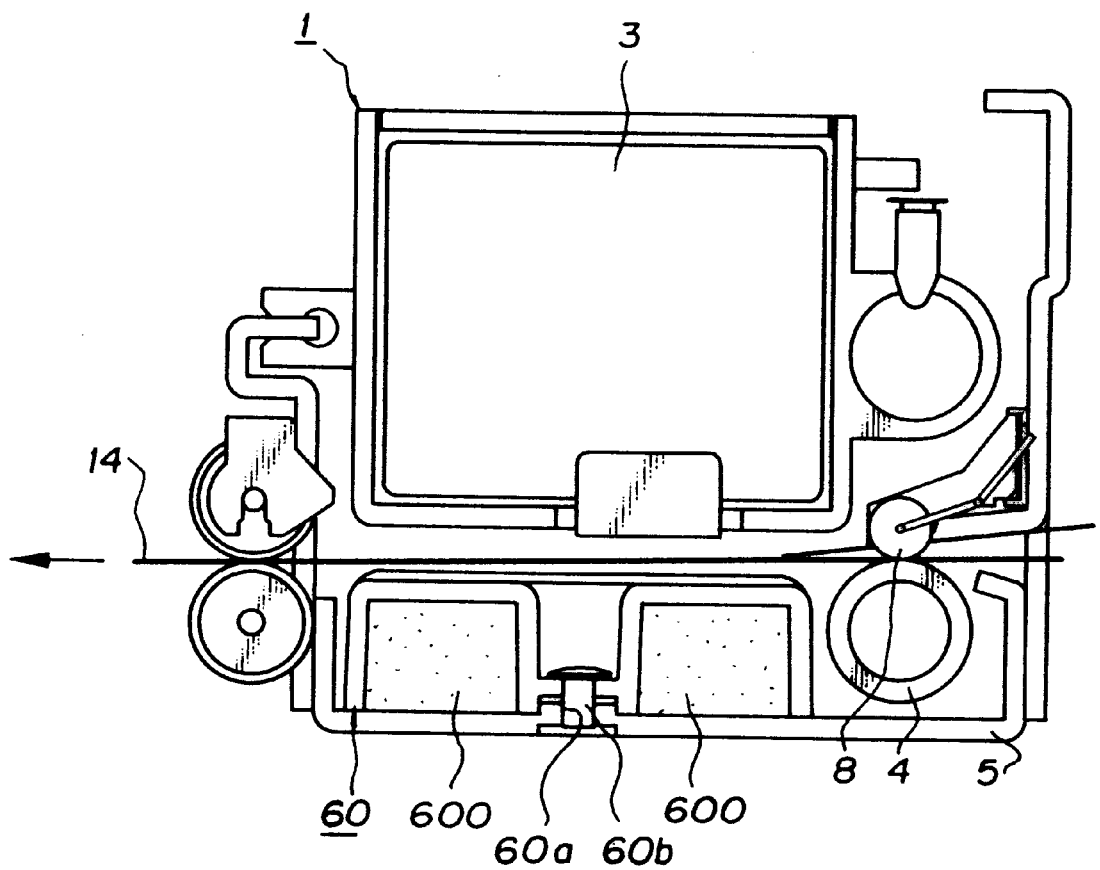
FIG. 33 is a cross-sectional view for explaining mounting of the waste ink absorber of the embodiment.

FIGS. 32 and 33 show an exploded perspective view and a cross-sectional view of a waste ink storage portion formed on the bottom of the ink jet printing apparatus shown in FIG. 1, respectively.

As shown in FIGS. 32 and 33, there is disposed an ink absorber 600 formed by piling up sheets of ink absorbing paper as multilayer on a chassis 5 of the apparatus. In this state, a cover 60 covers the absorber 600. This cover 60 is fixed on the chassis 5 by a screw 60b via a hole 60a, whereby the ink absorber 600 is fixed. The absorbing capacity of the ink absorber 600 can be minimized by the waste ink control described below.

Figure 34:
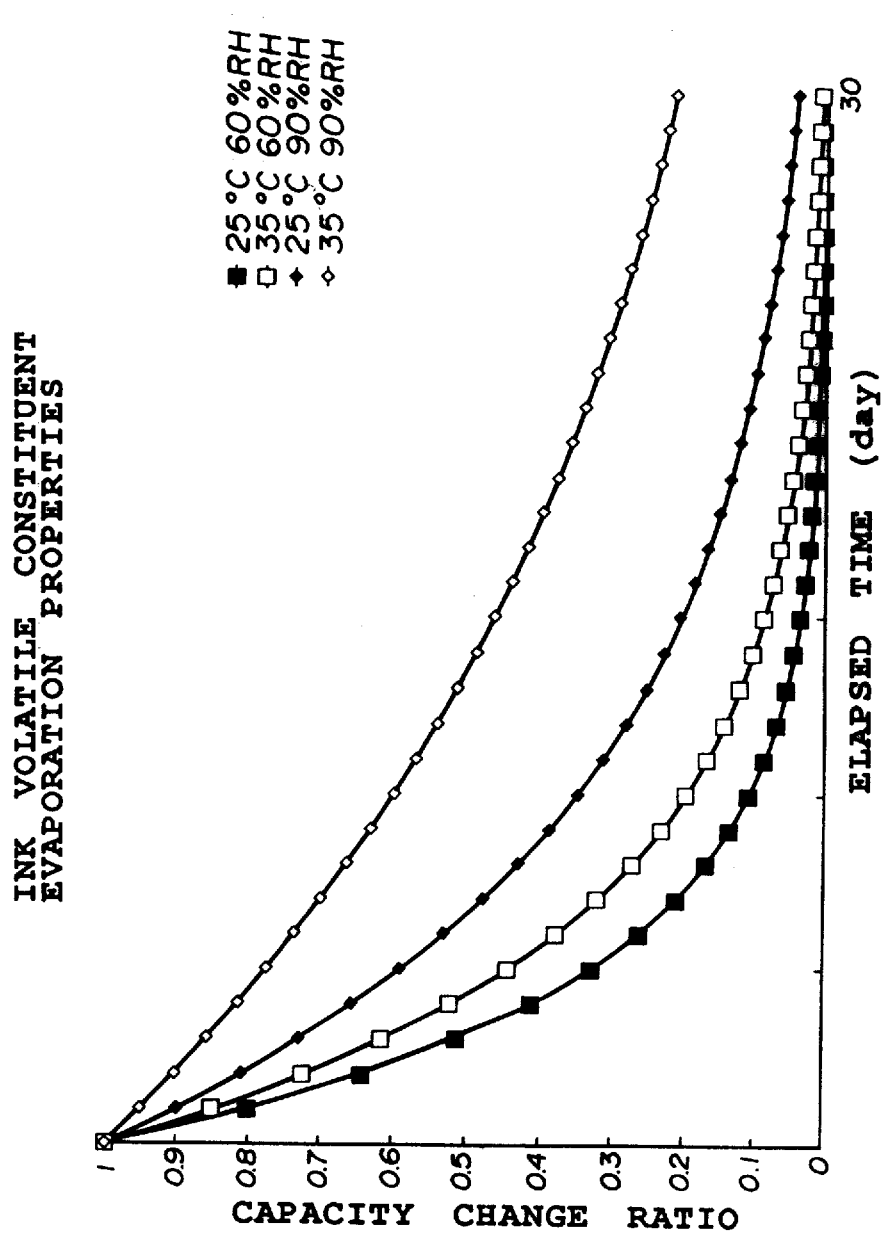
FIG. 34 is a graph illustrating ink volatile constituent evaporation properties used in the embodiment.
Figure 35:
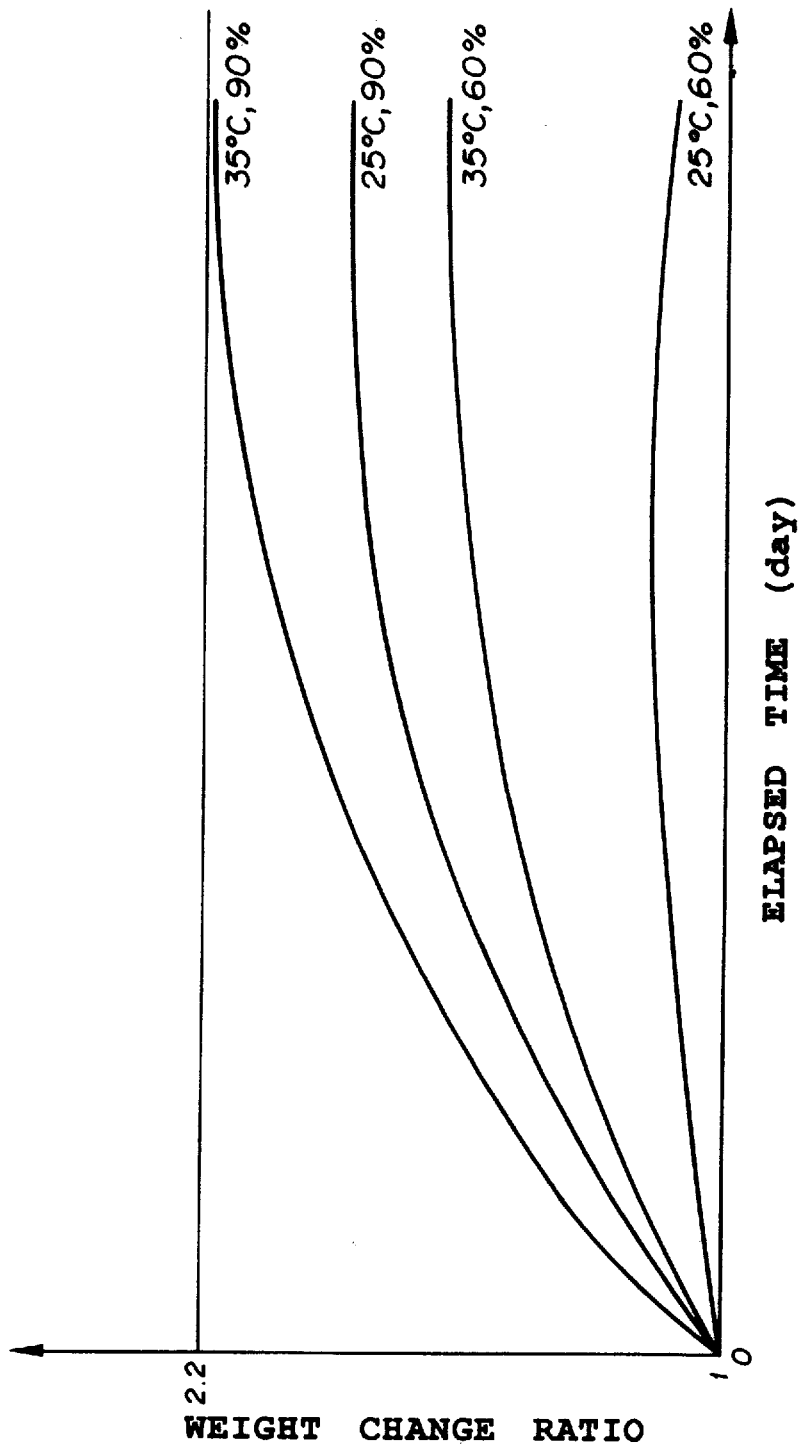
FIG. 35 is a graph illustrating ink non-volatile constituent moisture absorption properties used in the embodiment.

FIG. 34 is a graph of the vaporization properties of volatile constituent of ink used in this embodiment obtained experimentally. FIG. 35 is a graph of the moisture absorbing properties of non-volatile constituent of the same ink obtained experimentally. In either experiment, environmental temperatures and humidities are varied.

As seen from FIGS. 34 and 35, the most strict conditions for the ink absorber 600 are an environmental temperature of 35° C. and an environmental humidity of 90% in either properties. In this embodiment, the evaporation coefficient η is determined under the above most strict conditions.

The evaporation coefficient η (Tw) is set as a function of elapsed time Tw from the previous ejection recovery processing in consideration of the properties shown in FIG. 34 and stored in a table shown in FIG. 36.

In the embodiment, the waste ink control is performed based on the evaporation coefficient η as follows. That is, as described above in FIGS. 25 and 26, at each time when suction or preliminary ejection is performed, a discharged ink amount is obtained by the following equation:

$$W(\text{current discharged amount}) = W_{pump} \times n \text{ and/or } W_{heat} \times m$$

Where previously updated waste ink amounts are W(volatile (old)) and W(non-volatile (old) ), a waste ink amount shown in the following equation (1) is updated:

$$W(\text{volatile (new)})=W(\text{current discharged amount})\times R(\text{volatile constituent ratio})+W(\text{volatile (old)})\times \eta(Tw)$$

$$W(\text{non-volatile (new)})=W(\text{current discharged amount})\times R(\text{non-volatile constituent ratio})+W(\text{non-volatile (old)}) \quad (1)$$

The volatile constituent obtained from the equation (1), i.e., a total amount obtained by updating non-volatile constituent, W(volatile)+W(non-volatile (new)) can be made a current waste ink amount held by the ink absorber 600. Moreover, a waste ink amount after the recovery processing is an amount obtained by multiplying a waste ink amount (volatile (old)) by evaporation coefficient $\eta(Tw)$ according to the elapsed time Tw. Thus, the waste ink amount after the recovery processing can be monitored. For example, when the waste ink amount decreases below the caution value stated later by evaporation etc., processing such as releasing the caution can be performed. In addition, in the above equation, R(volatile constituent ratio) and R(non-volatile constituent ratio) are the ratio of ink volatile constituent and the ratio of ink non-volatile constituent, for example, they are 80% and 20%, respectively.

According to the above calculated result of the waste ink amount, the following processing can be performed:

The upper equation in the above equation (1) can be rewritten as follows:

$$W(\text{volatile (new)})=W(\text{current discharged amount})\times R(\text{volatile constituent ratio})\times n(0)+W(\text{volatile (old)})\times \eta(Tw)$$

W(volatile (new)) is a function of both a discharged ink amount and the elapsed time.

In the waste ink tank check of step S1604 in FIG. 16, the waste ink amount shown in the following equations (2) and (2') is checked on the basis of an updated volatile constituent amount and an updated non-volatile constituent amount obtained by the equation (1).

$$W=W(\text{volatile})\times \eta(Tw)+W(\text{non-volatile}) \quad (2)$$

$$W'=W(\text{non-volatile})\times (1+\Phi) \quad (2')$$

where 1+Φ is 2.2 in the embodiment of FIG. 35.

When W or W'≧limit 1, the caution is informed.

When W or W'≧limit 2, suction operation and preliminary ejection operation are stopped or the printer operation is stopped. That is, a suction error, a preliminary ejection error or a printing error are generated.

Figure 37:
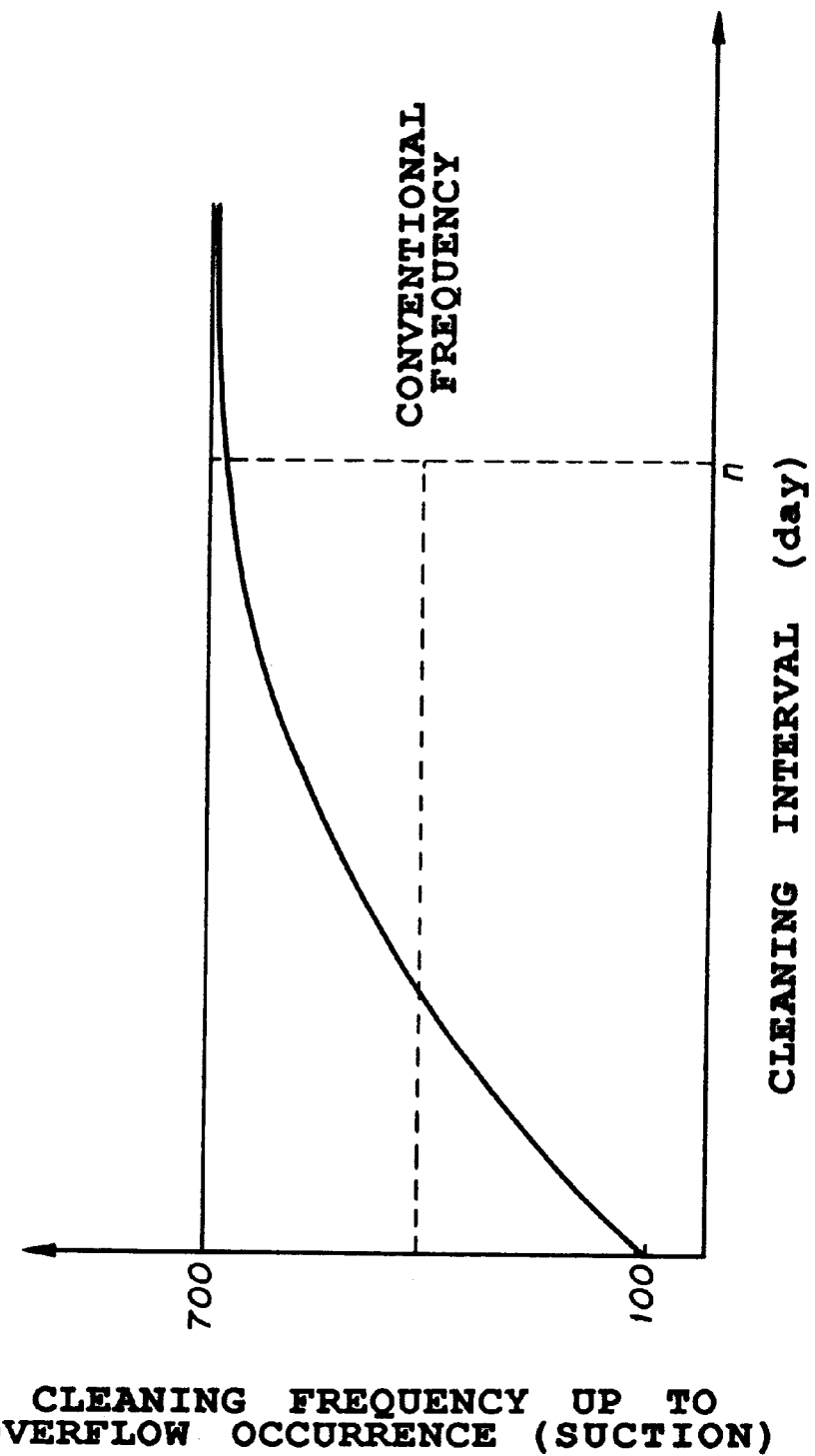
FIG. 37 is a diagram for explaining the effect of the waste ink amount control.

The waste ink amount held in the waste ink tank can be known more precisely by controlling the waste ink amount as described above. Therefore, as shown in FIG. 37, the restriction of the cleaning frequency is conventionally set to a low value, while in the embodiment the cleaning frequency can be set to a high value near the actual restriction value of the ink absorber 600.

Moreover, the above waste ink amount control can prevent overflow and further reduce an extra volume unnecessary for holding waste ink, resulting in miniaturization of the apparatus or the like.

Figure 38:
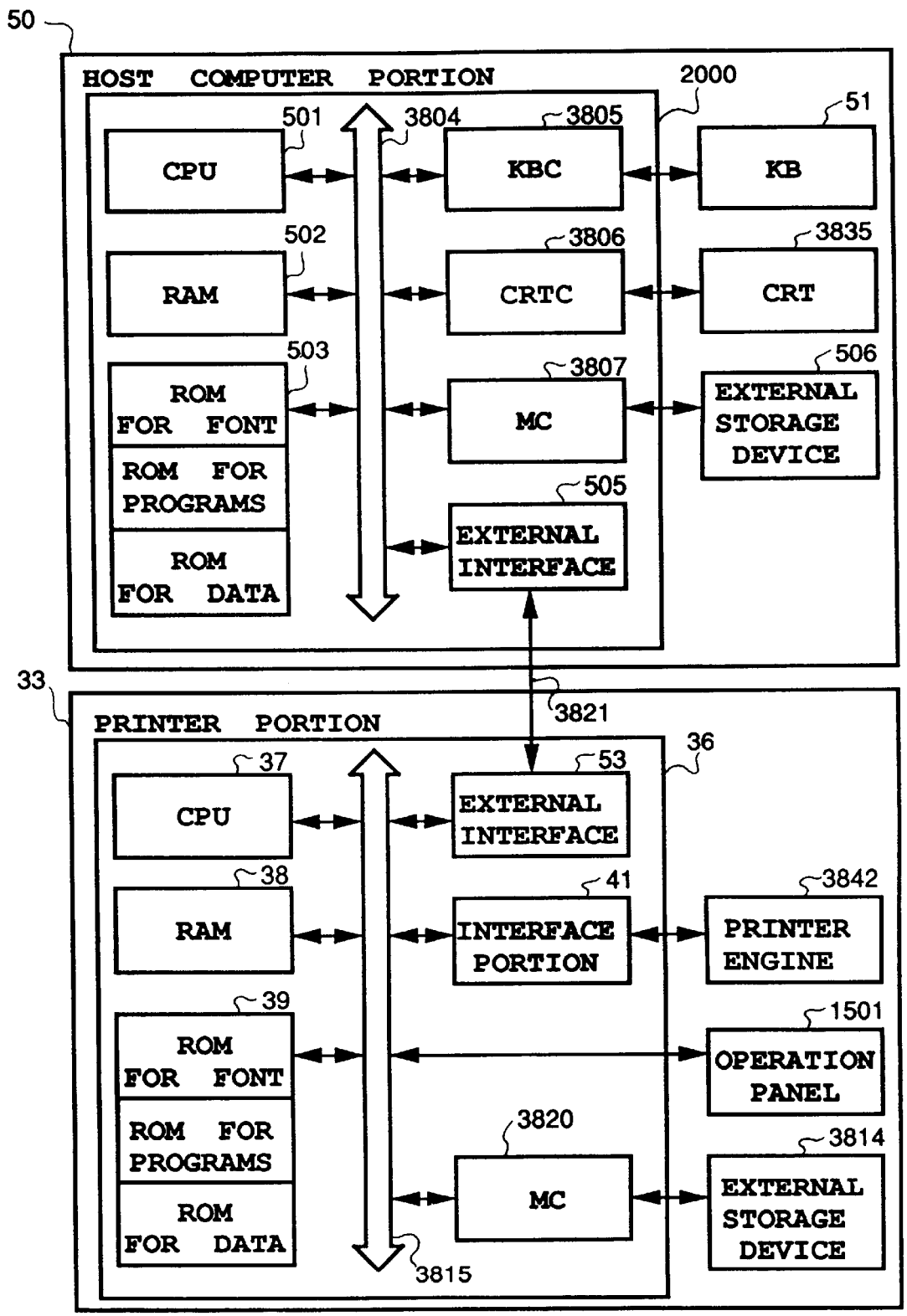
FIG. 38 is a block diagram illustrating a printer and an information processing system using the printer according to another embodiment of the present invention.

Moreover, in the above embodiment, as shown in FIG. 6, the operation of the information processing system in the information processing apparatus 50 with the ink jet printing apparatus of this embodiment incorporated is specifically described. The present invention is not limited to this embodiment wherein the host portion 50 and the printer portion 33 are built in one body as shown in FIG. 7. For example, as shown in FIG. 38, the host computer portion 50 and the printer portion 33 are formed as separate bodies and data are transmitted and received mutually via a bidirectional interface 3821. Therefore, it goes without saying that the present invention can be applied to a plurality of kinds of embodiments.

Figure 39:
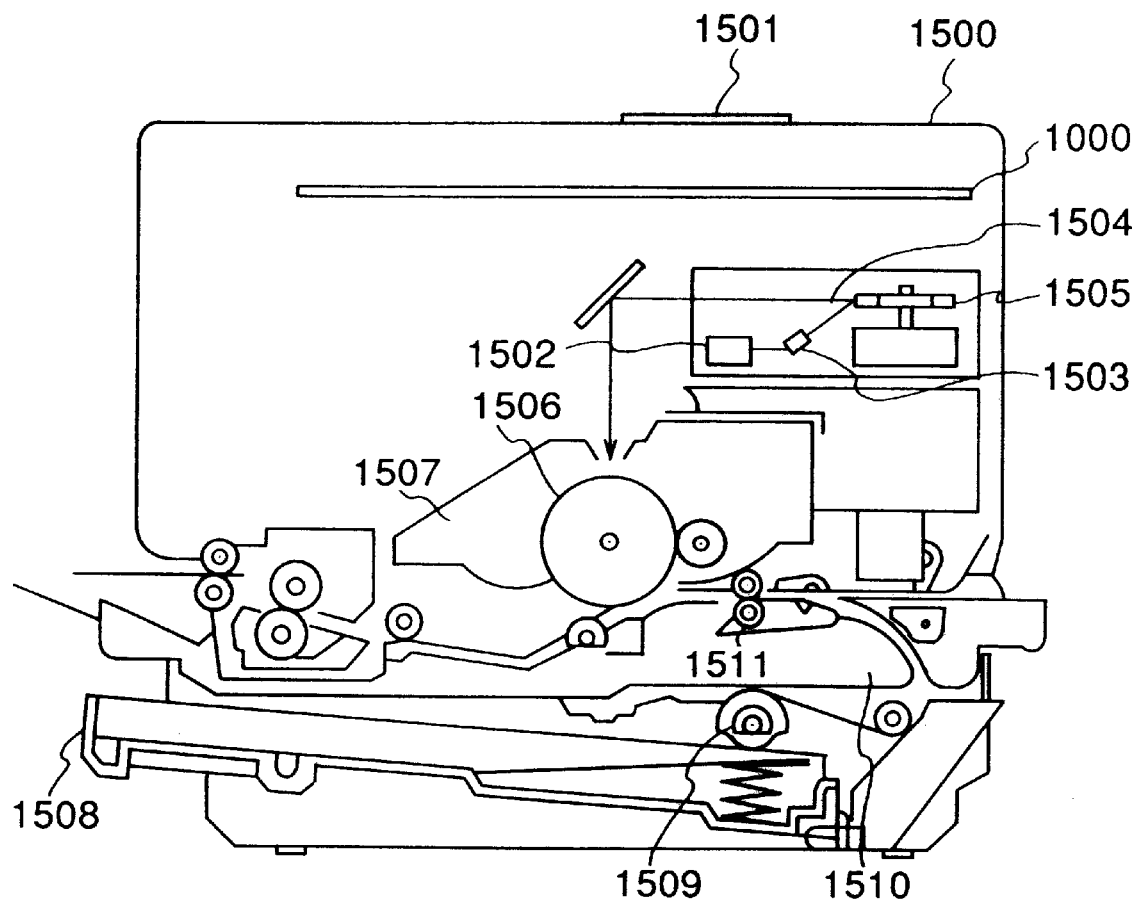
FIG. 39 is a cross-sectional view showing another embodiment of a printing apparatus to which the present invention can be applied.

Moreover, with respect to the printer portion 33, the present invention can be applied not only to the ink jet printing apparatus but to printers of other printing methods such as a laser beam printer shown in FIG. 39. Referring to FIGS. 38 and 39, the general structure will be described below.

FIG. 38 is a block diagram for explaining the structure of the printer control system of the embodiment according to the present invention. Here, a laser beam printer (FIG. 39) is used as the printer. The structure will be explained below.

Moreover, as long as the function of the present invention is executed, it goes without saying that the present invention can be applied to a single apparatus, a system made up of a plurality of apparatuses or a system in which processing is performed via a network such as a LAN.

In FIG. 38, reference numeral 50 designates a host computer provided with the above stated CPU 501 which performs processing of documents including figures, images, characters and tables (including table calculation etc.) etc. on the basis of a document processing program stored in a ROM for programs on the above stated ROM 503. This CPU 501 controls each device connected through system bus 3804 comprehensively.

Moreover, a ROM for programs on ROM 503 stores a control program for CPU 501 etc. shown as the above flowchart in FIG. 27 and the like. A ROM for font on ROM 503 stores font data etc. used in the above document processing. A ROM for data on ROM 503 stores various data used in the above document processing etc. Reference numeral 502 designates the above stated RAM which functions as a main memory, a working area, etc. for CPU 501. Reference numeral 3805 designates a keyboard controller (KBC) which controls the keyboard 51 and key inputs from a pointing device (not shown). Reference numeral 3806 designates a CRT controller (CRTC) which controls display on a CRT display 35 (the above stated display portion). Reference numeral 3807 designates a memory controller (MC) which controls access to the above stated external storage device 506 such as a hard disc (HD) and a floppy disc (FD) for storing a boot program, various kinds of application programs, font data, user files, compiling files and the like. Reference numeral 505 designates the above stated external interface which is connected to the printer portion 33 (for example, a laser beam printer stated later in FIG. 39) via a predetermined bidirectional interface 3821 (interface) to perform communication control processing with the printer portion 33.

Moreover, CPU 501 performs, for example, development processing (raster processing) of outline font on a display information RAM provided on the above stated RAM 502 and makes it possible to make WYSIWYG. Moreover, CPU 501 opens various kinds of cataloged windows on the basis of a command instructed by a mouse cursor, etc. (not shown) to perform various kinds of data processing.

In the printer portion 33, reference numeral 37 designates the above stated CPU, which controls access to various kinds of devices connected to a system bus 3815 on the basis of control programs etc. stored in the ROM for programs on the ROM 39 or in an external storage device 3814 comprehensively, and outputs image signals to a printer engine 3842 connected via the interface portion 41 as output information. Additionally, the ROM for programs on ROM 39 stores control programs etc. of CPU 37 shown by flowcharts in FIGS. 13 to 26 or the like. The ROM for font on ROM 39 stores font data etc. used for generating the above output information, and the ROM for data on ROM 39 stores information etc. used on the host computer when there is a printer without the external storage device 3814 such as a hard disc. CPU 37 can perform communication processing with the host computer portion 50 via an external interface 53 and is arranged so that information etc. in the printer (for example, error information) or the like can be transmitted to the host computer portion 50. Reference numeral 38 designates a RAM functioning as a main memory, a working area, etc. of CPU 37, which is arranged so that memory capacity can be increased using optional RAMs connected to an additional I/O port (not shown). RAM 38 is also used as an output information developing area, an environmental data storing area, an NVRAM, etc. Accessing of the external storage device 3814 such as the hard disc (HD) and an IC card can be controlled by a memory controller (MKC) 3820. The external storage device 3814 is connected optionally so as to store font data, emulation programs, form data, etc. Reference numeral 1501 designates an operation panel on which switches, LED indicators, etc. for an operation are arranged.

Moreover, at least one or more external storage devices may be provided and may be formed so that a plurality of external memories can be connected so as to store an optional font card and a program for interpreting a printer control language different from the present language system besides the built-in font. Furthermore, the external storage devices may have NVRAMs (not shown) to store printer mode setting information transmitted from the operation panel 1501.

Moreover, as an embodiment of the present invention, information such as operation manuals and command references of plural kinds of printers connected to the host computer portion 50 is stored in memories in the printers or an external storage device so as to control the plural kinds of printers by the host computer comprehensively. On the basis of this information in the memories or information in the external storage device attached to the host computer or the printers, for example, a desired error preventive method, a desired operation procedure, etc. are retrieved automatically to be displayed on the display portion of the host computer, whereby time and labor consumption can be removed for retrieving a desired part in the operation manuals, the command references, etc. conventionally by a user so as to proceed to the next operation.

FIG. 39 is a cross-sectional view showing a structure of another printing apparatus to which the present invention is applicable, for example, a laser beam printer (LBP).

In FIG. 39, reference numeral 1500 designates a body of the LBP. In the LBP, print information (character codes etc.), form information, microinstructions or the like supplied from the host computer connected externally is inputted and stored, the corresponding character patterns, form patterns and the like are generated according to the above information and then images are printed on recording paper etc. as a recording medium. Reference numeral 1501 designates an operation panel on which switches, LED indicators, etc. for operations are arranged, reference numeral 1000 designates a printer control unit which controls the whole body of LBP 1500 and analyzes character information etc. supplied from the host computer. The printer control unit 1000 mainly converts character information into video signals of the corresponding character patterns so as to output these video signals to a laser driver 1502. The laser driver 1502 is a circuit for driving a semiconductor laser 1503 so as to turn on or off laser beams 1504 emitted from the semiconductor laser 1503 according to the inputted video signals. The laser beams 1504 are swung right and left by a rotary polyhedral mirror 1505 to be exposed for scanning an electrostatic drum 1506. This creates an electrostatic latent image of a character pattern on the electrostatic drum 1506. After having been developed by a development unit 1507 disposed on the periphery of the electrostatic drum 1506, this developed image is transcribed on recording paper. A cut sheet is used as recording paper. This cut sheet is housed in a sheet cassette 1508 mounted on LBP 1500, taken into the apparatus by a paper feed roller 1509, a transport roller 1510 and a transport roller 1511, and then supplied to the electrostatic drum 1506. At least one or more card slots (not shown) are provided in the body of LBP 1500 so as to connect an optional font card, a control card of the different language system (emulation card) in addition to the built-in font.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of termperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can also be changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A computer connected with a printer through an interface to supply printing data to the printer, said computer comprising:
   a display unit for displaying the first of a sequence of operation steps to be performed by a user of the printer in an operating procedure;
   a judging unit for judging whether or not input instructions, which are associated with the operation steps displayed by said display unit and are from an operation section, are inputted; and
   a control unit for, when said judging unit judges that the input instructions are inputted, providing a control signal to the printer based on the input instructions to cause the printer to execute an operation and for causing said display unit to display a subsequent operation step in the operating procedure based on the input instructions.

2. A computer according to claim 1, wherein said display unit displays operation steps of the operating procedure for exchange of a consumable item used by the printer.

3. A computer according to claim 1, wherein said control unit responds to whether confirmation information indicating completion of an operation step displayed by said display unit has been judged by said judging unit to have been inputted.

4. A computer according to claim 1, further comprising means for inputting information from the printer indicative of a state of the printer after completion of the first operation step, wherein said control unit causes said display unit to display the subsequent operating step in the operating procedure also on the basis of the input information from the printer.

5. A computer according to claim 1, wherein said control unit transmits an exchange termination command to the printer.

6. A computer according to claim 1, further comprising said printer, wherein said printer is disposed in the body of said computer.

7. A computer according to claim 6, wherein said control unit transmits a printing head exchange command to said printer when said printer is an ink jet printer which includes a printing head for ejecting ink and an ink tank for storing ink.

8. A computer according to claim 7, wherein the printing head exchange command is a command for moving a carrier in said printer so as to shift the printing head to a position at which the printing head is exchangeable.

9. A computer according to claim 7, wherein said control unit transmits an ink tank exchange command to the printer.

10. A computer according to claim 1, wherein the interface is a bi-directional interface.

11. A printer for performing printing based on printing data received from a computer, said printer comprising:
   a receiving unit for receiving a control signal for executing an operation, the computer outputting the control signal when instructions, which are associated with operation steps displayed by a display unit of the computer and are from an operation section, are inputted;

an executing unit for executing the operation based on the control signal received by said receiving unit; and an output unit for outputting an instruction for causing the computer to display a subsequent operation step, based on execution of the operation.

12. A printer according to claim 11, wherein said printer is a laser jet printer.

13. A printer according to claim 11, wherein said output unit comprises a sensor.

14. A printer according to claim 11, wherein said printer is an ink jet printer and includes a printing head for ejecting ink and an ink tank for storing ink.

15. A printer according to claim 14, wherein the printing head generates thermal energy to create a bubble in the ink to eject the ink therefrom.

16. A printer according to claim 11, further comprising a bi-directional interface.

17. An apparatus comprising a computer and a printer, said computer connected with said printer through an interface to supply printing data to the printer, said computer comprising:

a display unit for displaying the first of a sequence of operation steps to be performed by a user of said printer in an operating procedure;

a judging unit for judging whether or not input instructions, which are associated with the operation steps displayed by said display unit and are from an operation section, are inputted; and a control unit for, when said judging unit judges that the input instructions are inputted, providing a control signal to said printer based on the input instructions to cause said printer to execute an operation and for causing said display unit to display a subsequent operation step in the operating procedure based on the input instructions;

said printer comprising:

a receiving unit for receiving the control signal for executing the operation from said computer;

an executing unit for executing the operation based on the control signal received by said receiving unit; and an output unit for outputting an instruction for causing said computer to display the subsequent operation step, based on execution of the operation.

18. An apparatus according to claim 17, wherein said computer and said printer are connected to each other with a two-way interface.

19. An apparatus according to claim 17, wherein said printer is integrated with said computer and is contained therewith in the same housing.

20. A display method for a computer connected with a printer through an interface to supply printing data, said method comprising the steps of:

displaying the first of a sequence of operation steps to be performed by a user of the printer in an operating procedure;

judging whether or not input instructions, which are associated with the operation steps displayed in said displaying step and are from an operation section, are inputted; and providing, when judged in said judging step that the input instructions are inputted, a control signal to the printer based on the input instructions to cause the printer to execute an operation and causing the display of a subsequent operation step in the operating procedure based on the input instructions.

21. A method according to claim 20, wherein said control signal providing step controls the display of operation steps of the operating procedure for a process of exchanging a consumable item which is used by the printer.

22. A method according to claim 20, further comprising a step of discriminating whether or not confirmation information indicating completion of an operation step according to the operating procedure displayed in said displaying step has been judged in said judging step to have been input or not.

23. A method according to claim 22, wherein said control signal providing step controls the display of a subsequent operation step of the operating procedure in said displaying step based on a result from said discriminating step and state information indicating the operational state of the printer after completion of the first operation step of the operating procedure.

24. A method according to claim 20, wherein said control signal providing step comprises transmitting a printing head exchange command to the printer.

25. A method according to claim 24, wherein the printing head exchange command is a command for moving a carrier so as to shift the printing head to a position at which the printing head is exchangeable.

26. A method according to claim 20, wherein said control signal providing step comprises transmitting an ink tank exchange command to the printer.

27. A method according to claim 20, wherein said control signal providing step comprises transmitting an exchange termination command to the printer.

28. A method according to claim 20, wherein the interface is a bi-directional interface.

29. A method of using a printer for performing printing based on printing data received from a computer, said method comprising the steps of:

receiving a control signal for executing an operation, the computer outputting the control signal when instructions, which are associated with operation steps displayed by a display unit of the computer and are from an operation section, are inputted;

executing the operation based on the control signal received in said receiving step; and outputting an instruction for causing the computer to display a subsequent operation step, based on execution of the operation.

30. A method according to claim 29, wherein said outputting step outputs state information to control the display of the operation steps of an operating procedure when the operating procedure is a process for exchanging a consumable item which is used by the printer.

31. A method according to claim 30, wherein the state information comprises instruction information which instructs a second operation step of the operating procedure to be displayed.

32. A method according to claim 29, further comprising the step of ejecting ink to form an image.

33. A method according to claim 32, further comprising the step of generating thermal energy to create a bubble in the ink to eject the ink.

34. A method according to claim 29, further comprising transmitting data through a bi-directional interface.

35. A method for controlling a computer and a printer, the computer connected with the printer through an interface to supply printing data to the printer, said method comprising the steps of:

displaying the first of a sequence of operation steps to be performed by a user of the printer in an operating procedure;

judging whether or not input instructions, which are associated with the operation steps displayed in said displaying step and are from an operation section, are inputted;

providing, when judged in said judging step that the input instructions are inputted, a control signal to the printer based on the input instructions to cause the printer to execute an operation and causing the display of a subsequent operation step in the operating procedure based on the input instructions;

receiving the control signal for executing the operation from the computer;

executing the operation based on the control signal received in said receiving step; and outputting an instruction for causing the computer to display the subsequent operation step, based on execution of the operation.

36. A program having processor implementable instructions for controlling a processor to carry out a method for controlling a printer through an interface, the processor connected with the printer to supply printing data to the printer, said method comprising the steps of:

displaying the first of a sequence of operation steps to be performed by a user of the printer in an operating procedure;

judging whether or not input instructions, which are associated with the operation steps displayed in said displaying step and are from an operation section, are inputted; and providing, when judged in said judging step that the input instructions are inputted, a control signal to the printer based on the input instructions to cause the printer to execute an operation and causing the display of a subsequent operation step in the operating procedure based on the input instructions.

37. A program having processor implementable instructions for controlling a processor to carry out a method of using a printer for performing printing based on printing data received from a computer, said method comprising the steps of:

receiving a control signal for executing an operation, the computer outputting the control signal when instructions, which are associated with operation steps displayed by a display unit of the computer and are from an operation section, are inputted;

executing the operation based on the control signal received in said receiving step; and outputting an instruction for causing the computer to display a subsequent operation step, based on execution of the operation.

38. A storage medium storing processor implementable instructions for controlling a processor to carry out a method for controlling a printer through an interface, the processor connected with the printer to supply printing data to the printer, said method comprising the steps of:

displaying the first of a sequence of operation steps to be performed by a user of the printer in an operating procedure;

judging whether or not input instructions, which are associated with the operation steps displayed in said displaying step and are from an operation section, are inputted;

providing, when judged in said judging step that the input instructions are inputted, a control signal to the printer based on the input instructions to cause the printer to execute an operation and causing the display of a subsequent operation step in the operating procedure based on the input instructions.

39. A storage medium storing processor implementable instructions for controlling a processor to carry out a method of using a printer for performing printing based on printing data received from a computer, said method comprising the steps of:

receiving a control signal for executing an operation, the computer outputting the control signal when instructions, which are associated with operation steps displayed by a display unit of the computer and are from an operation section, are inputted;

executing the operation based on the control signal received in said receiving step; and outputting an instruction for causing the computer to display a subsequent operation step, based on execution of the operation.

40. A computer connected with a printer to supply printing data to the printer, said computer comprising:

a display unit for displaying an operating procedure for the printer;

a judging unit for judging whether or not input instructions, which are associated with the operating procedure displayed by said display unit and are from an operation section, are inputted; and an output unit for, based on judgment by said judging unit that the input instructions are inputted, outputting a command to the printer to cause said printer to execute an operation, and causing said display unit to display a subsequent operating procedure.

41. A method for controlling a computer connected with a printer to supply printing data to the printer, said method comprising the steps of:

displaying an operating procedure for the printer;

judging whether or not input instructions, which are associated with the operating procedure displayed in said displaying step and are from an operation section, are inputted; and based on the judgment in said judging step that the input instructions are inputted, outputting a command to the printer to cause the printer to execute an operation, and causing display of a subsequent operating procedure in said display step.

42. A program having processor implementable instructions for controlling a processor to carry out a method for controlling a computer connected with a printer to supply printing data to the printer, said method comprising the steps of:

displaying an operating procedure for the printer;

judging whether or not input instructions, which are associated with the operating procedure displayed in said displaying step and are from an operation section, are inputted; and based on the judgment in said judging step that the input instructions are inputted, outputting a command to the printer to cause the printer to execute an operation, and causing display of a subsequent operating procedure in said display step.

* * * * *

UNITED STATES PATENT AND TRADEMARK OFFICE
CERTIFICATE OF CORRECTION

PATENT NO. : 6,676,236 B1
APPLICATION NO. : 08/900716
DATED : January 13, 2004
INVENTOR(S) : Uchikata It is certified that error appears in the above-identified patent and that said Letters Patent is hereby corrected as shown below:

ON TITLE PAGE
Item (56), References Cited, Foreign Patent Documents,
"JP   54056847   5/1979
 JP   59123670   7/1984
 JP   59138461   8/1984
 JP   60071260   4/1985"
should read
--JP   54-56847   5/1979
  JP   59-123670   7/1984
  JP   59-138461   8/1984
  JP   60-71260   4/1985--.

COLUMN 1
Line 48, "processing is connected to an infor-" should be deleted.
Line 49, "mation" should read --the--, and "system" should read --is connected to an
        information processing system--.
Line 52, "generations" should read --operations--.
Line 64, "these of" should be deleted.

COLUMN 4
Line 1, "attachment," should read --attachment--.

COLUMN 5
Line 8, "load" should read --lead--.
Line 60, "these of" should be deleted.
Line 67, "then" should be deleted.

COLUMN 7
Line 54, "by," should read --by--, and "with" should be deleted.

COLUMN 8
Line 7, "concentrated" should read --concentratedly--.

COLUMN 10
Line 34, "#1 to #m" should read --$\#_1$ to $\#_m$--.
Line 36, "#1 and #2," should read --$\#_1$ and $\#_2$,--.
Line 38, "#1 to #m-1," should read --$\#_1$ to $\#_{m-1}$,--.

UNITED STATES PATENT AND TRADEMARK OFFICE
CERTIFICATE OF CORRECTION

PATENT NO. : 6,676,236 B1
APPLICATION NO. : 08/900716
DATED : January 13, 2004
INVENTOR(S) : Uchikata It is certified that error appears in the above-identified patent and that said Letters Patent is hereby corrected as shown below:

COLUMN 12
Line 19, "above described" should read --above-described--.
Line 22, "above" should read --above- --.

COLUMN 16
Line 34, "indication" should read --an indication--.

COLUMN 18
Line 27, "can not" should read --cannot--.

COLUMN 21
Line 20, "(MKC)" should read --(MC)--.

Signed and Sealed this

Thirty-first Day of October, 2006

JON W. DUDAS
*Director of the United States Patent and Trademark Office*